(12) United States Patent
Tour et al.

(10) Patent No.: US 12,012,336 B2
(45) Date of Patent: Jun. 18, 2024

(54) METHODS OF FABRICATING LASER-INDUCED GRAPHENE AND COMPOSITIONS THEREOF

(71) Applicants: William Marsh Rice University, Houston, TX (US); B.G. Negev Technologies and Applications Ltd. at Ben-Gurion University, Beer Sheva (IL)

(72) Inventors: James M. Tour, Bellaire, TX (US); Yieu Chyan, Houston, TX (US); Christopher John Arnusch, Midreshet Ben-Gurion (IL); Swatantra Pratap Singh, Midreshet Ben-Gurion (IL); Yilun Li, Sugar Land, TX (US); Duy X. Luong, Houston, TX (US); Carter Kittrell, Houston, TX (US); Ruquan Ye, Houston, TX (US); Jordan Miller, Houston, TX (US); Ian Kinstlinger, Houston, TX (US); Savannah Cofer, Gahanna, OH (US)

(73) Assignees: William Marsh Rice University, Houston, TX (US); B.G. NEGEV TECHNOLOGIES AND APPLICATIONS, LTD. AT BEN-GURION UNIVERSITY, Beer Sheva (IL)

( * ) Notice: Subject to any disclaimer, the term of this patent is extended or adjusted under 35 U.S.C. 154(b) by 0 days.

(21) Appl. No.: 17/516,430

(22) Filed: Nov. 1, 2021

(65) Prior Publication Data

US 2022/0267153 A1 Aug. 25, 2022

Related U.S. Application Data

(63) Continuation of application No. 16/347,451, filed as application No. PCT/US2017/060238 on Nov. 6, 2017, now Pat. No. 11,161,744.

(Continued)

(51) Int. Cl.
 *C01B 32/184* (2017.01)
 *H01S 3/00* (2006.01)

(52) U.S. Cl.
 CPC .......... *C01B 32/184* (2017.08); *H01S 3/0007* (2013.01); *H01S 3/005* (2013.01);
 (Continued)

(58) Field of Classification Search
 CPC ... C01B 32/184; C01B 32/182; H01S 3/0007; H01S 3/005; C01P 2002/01;
 (Continued)

(56) References Cited

U.S. PATENT DOCUMENTS 11,161,744 B2 11/2021 Tour et al.
2009/0068471 A1* 3/2009 Choi ............... B82Y 40/00
 428/408

(Continued)

FOREIGN PATENT DOCUMENTS

CN 102448880 A 5/2012
CN 103508450 A 1/2014
(Continued)

OTHER PUBLICATIONS

Perreault, et al., Environmental applications of graphene-based nanomaterials, Chem. Soc. Rev. 2015; 44: 5861-5896 (Year: 2015).*

(Continued)

*Primary Examiner* — Daniel C. McCracken
(74) *Attorney, Agent, or Firm* — Dickinson Wright PLLC; Ross Spencer Garsson

(57) ABSTRACT

Methods that expand the properties of laser-induced graphene (LIG) and the resulting LIG having the expanded properties. Methods of fabricating laser-induced graphene from materials, which range from natural, renewable precursors (such as cloth or paper) to high performance polymers (like Kevlar). With multiple lasing, however, highly (Continued)

conductive PEI-based LIG could be obtained using both multiple pass and defocus methods. The resulting laser-induced graphene can be used, inter alia, in electronic devices, as antifouling surfaces, in water treatment technology, in membranes, and in electronics on paper and food Such methods include fabrication of LIG in controlled atmospheres, such that, for example, superhydrophobic and superhydrophilic LIG surfaces can be obtained. Such methods further include fabricating laser-induced graphene by multiple lasing of carbon precursors. Such methods further include direct 3D printing of graphene materials from carbon precursors. Application of such LIG include oil/water separation, liquid or gas separations using polymer membranes, anti-icing, microsupercapacitors, supercapacitors, water splitting catalysts, sensors, and flexible electronics.

14 Claims, 73 Drawing Sheets

Related U.S. Application Data

(60) Provisional application No. 62/537,512, filed on Jul. 27, 2017, provisional application No. 62/487,821, filed on Apr. 20, 2017, provisional application No. 62/418,202, filed on Nov. 6, 2016.

(52) U.S. Cl.
CPC ...... *C01P 2002/01* (2013.01); *C01P 2002/82* (2013.01); *C01P 2004/03* (2013.01)

(58) Field of Classification Search
CPC ............. C01P 2002/82; C01P 2004/03; B01D 2323/34; B01D 67/0039; B01D 67/006; B01D 71/021; Y02E 60/10; Y02E 60/13; H01G 11/36; H01G 11/44; H01G 11/86; H01M 4/583; H01M 4/625
See application file for complete search history.

(56) References Cited

U.S. PATENT DOCUMENTS

| 2010/0247801 | A1 | 9/2010 | Zenasni | |
| 2014/0234200 | A1 | 8/2014 | Tour et al. | |
| 2015/0010701 | A1* | 1/2015 | Hong | C23C 16/56 |
| | | | | 427/178 |
| 2016/0137507 | A1 | 5/2016 | You et al. | |
| 2016/0339160 | A1* | 11/2016 | Bedworth | B01D 67/0072 |
| 2019/0330064 | A1 | 10/2019 | Tour et al. | |
| 2022/0267153 | A1 | 8/2022 | Tour et al. | |

FOREIGN PATENT DOCUMENTS

| CN | 103796766 | A | 5/2014 |
| CN | 105692581 | A | 6/2016 |
| WO | 2011162727 | A1 | 12/2011 |
| WO | 2015175060 | A2 | 11/2015 |
| WO | 2015176220 | A1 | 11/2015 |
| WO | 2018085789 | A1 | 5/2018 |

OTHER PUBLICATIONS

Wang, et al., High-Performance Capacitive Deionization Disinfection of Water with Graphene Oxide-graft-Quaternized Chitosan Nanohybrid Electrode Coating, ACS Nano 2015; 9(10): 10142-10157 (Year: 2015).*
Definition of "induce," accessed online at https://www.merriam-webster.com/dictionary/induced on Jan. 27, 2024 (Year: 2024).*
Srinivasan, et al., "Ultraviolet laser irradiation of the polyimide, PMDA-ODA (Kapton™), to yield a patternable, porous, electrically conducting carbon network", Synthetic Metals, 1994, 66, 301-307 ("Srinivasan 1994").
Tsai, "The decomposition products of sulfur hexafluoride (SF6): Reviews of environmental and health risk analysis", J. Fluorine Chem. 2007, 128, 1345 ("Tsai 2007").
Wang, et al., "High-Performance Capacitive Deionization Disinfection of water with Graphene Oxide-graft-Quaternized Chitosan Nanohybrid Electrode Coating"; ACS Nano; 2012, vol. 9, No. 10, 10142-10157, 16 pages.
Wang, et al., "Heteroatom-doped graphene materials: syntheses, properties and applications", Chem. Soc. Rev. 2014, 43, 7067 ("Wang 2014").
Wang, et al., "Passive Anti-Icing and Active Deicing Films", ACS Appl. Mater. Interfaces 2016, 8, 14169 ("Wang 2016").
Wang, et al., "Wettability and Surface Free Energy of Graphene Films", Langmuir 2009, 25, 11078 ("Wang 2009").
Ye, et al., "Converting waste paper to multifuncional graphene-decorated carbon paper: from trash to treasure", J. Mater. Chem. A 2015; 3: 13926-13932 (Year: 2015).
Ye, et al., "In Situ Formation of Metal Oxide Nanocrystals Embedded in Laser-Induced Graphene", ACS Nano 2015, 9, 9244 ("Ye 2015").
Yin, et al., "Functional Free-Standing Graphene Honeycomb Films"; Advanced Functional Materials; 2013, 23, 2972-2978, 7 pages.
Zha, et al., "Superhydrophobic polyvinylidene fluoride/graphene porous materials", Carbon 2011, 49, 5166 ("Zha 2011").
Zhang, et al., "Direct imprinting of microcircuits of graphene oxides film by femtosecond laser reduction", Nano Today 201 O; 5: 15-20 with Supplementary Data (Year: 2010).
Zhang, et al., "Efficient Water-Splitting Electrodes Based on Laser-Induced Graphene", ACS Appl Mater Interfaces 2017 , 9(32), 26840-26847 ("Zhang 2017").
Zhang, et al., "Membrane Characterization by the Contact Angle Technique: II. Characterization of UF-Membranes and Comparison between the Captive Bubble and Sessile Drop as Methods to obtain Water Contact Angles", Desalination 1989, 72, 263 ("Zhang 1989").
Zhang, et al., "Superhydrophobic surfaces: from structural control to functional application", J. Mater. Chem. 2008, 18, 621 ("Zhang 2008").
Zhao, et al., "Fluorinated graphene: facile solution preparation and tailorable properties by fluorine-content tuning", J. Mater. Chem. A 2014, 2, 8782 ("Zhao 2014").
China National Intellectual Property Administration, Office Action for CN Application No. 201780082377.8, dated Jun. 29, 2022; 8 pages, 9 translation pages.
European Patent Office, Office Action for EP Application No. 17808656.7, dated Jan. 29, 2021; 9 pages.
International Bureau; Wittmann-Regis, Agnes; International Preliminary Report of Patentability, PCT/US2017/060238; dated May 16, 2019; 22 pages.
International Searching Authority; Follens, Lana; Written Opinion of the International Search Authority, PCT/US2017/060238; dated Apr. 16, 2018; 23 pages.
International Searching Authority; Kouroussenko, Svetlana; International Search Report and Written Opinion, PCT/US2017/060238; dated Apr. 9, 2018; 10 pages.
Lyons, A., et al., "Direct Writing of Carbon Interconnections," Mat. Res. Soc. Symp. Proc., vol. 101, Jan. 1, 1968, pp. 67-73; 10 pages.
European Patent Office, Office Action for EP Application No. 17808656.7, dated Jan. 12, 2023; 10 pages.
Allen, et al., "Honeycomb Carbon: A Review of Graphene", Chem. Rev. 2009, 110, 132 ("Allen 2009").
Bagri, et al., "Structural evolution during the reduction of chemically derived graphene oxide", Nature Chemistry 2010, 2, 581 ("Bagri 2010").
Baladin, et al., "Superior Thermal Conductivity of Single-Layer Graphene", Nano Lett. 2008, 8, 902 ("Balandin 2008").
Bhushan, et al., "Micro-, Nano- and Hierarchical Structures for Superhydrophobicity, Self-Cleaning and Low Adhesion", Philos. Trans. R. Soc., A 2009, 367, 1631 ("Bhushan 2009").

(56) References Cited

OTHER PUBLICATIONS

Bhushan, et al., "The rose petal effect and the modes of superhydrophobicity", Philos. Trans. R. Soc., A 2010, 368, 4713 ("Bhushan 2010").
Bi et al.; "Spongy Graphene as a Highly Efficient and Recyclable Sorbent for Oils and Organic Solvents", XP-001581902; Advanced Fuctional Materials; 2012, 22, 4421-4425, 5 pages.
Bolotin, et al., "Ultrahigh electron mobility in suspended graphene", Solid State Commun. 2008, 146, 351 ("Bolotin 2008").
Chu, "SF6 Decomposition in Gas-Insulated Equipment", IEEE Trans. Electr. Insul. 1986, 5, 693 ("Chu 1986").
Dai, et al., "Carbon Nanomaterials for Advanced Energy Conversion and Storage", Small 2012, 8, 1130 ("Dai 2012").
Dong, et al., "Superhydrophobic and superoleophilic hybrid foam of graphene and carbon nanotube for selective removal of oils or organic solvents from the surface of water", Chemical Communications 2012, 48, 10660 ("Dong 2012").
Fan, et al., "Multiple roles of graphene in heterogeneous catalysis", Chem. Soc. Rev. 2015, 44, 3023 ("Fan 2015").
Feng, et al., "Superhydrophobic and superoleophilic microwrinkled reduced graphene oxide as a highly portable and recyclable oil sorbent", ACS Appl. Mater. Interfaces 2016, 8, 9977 ("Feng 2016").
Ferrari, et al., "Interpretation of infrared and Raman spectra of amorphous carbon nitrides", Physical Review B, 2003, 67, 155306 1-20 ("Ferrari 2003").
Ferrari, et al., "Raman Spectrum of Graphene and Graphene Layers", Phys. Rev. Lett. 2006, 97, 187401 ("Ferrari 2006").
Gao, et al., "Contact Angle Hysteresis Explained", Langmuir 2006, 22, 6234 ("Gao 2006").
Geim, "Graphene: status and prospects", Science 2009, 324, 1530 ("Geim 2009").
Geim, et al., "The rise of graphene", Nat. Mater. 2007, 6, 183 ("Geim 2007").
Georgakilas, et al., "Functionalization of Graphene: Covalent and Non-Covalent Approaches, Derivatives and Applications", Chem. Rev. 2012, 112, 6156 ("Georgakilas 2012").
Herring, et al., "A Novel Method for the Templated Synthesis of Homogeneous Samples of Hollow Carbon Nanospheres from Cellulose", J. Am. Chem. Soc. 2003; 125: 9916-9917 (Year: 2003).
Hirsch, et al., "Wet Chemical Functionalization of Graphene", Acc. Chem. Res. 2012, 46, 87 ("Hirsch 2012").
Hontoria-Lucas, et al., "Study of oxygen-containing groups in a series of graphite oxides: Physical and chemical characterization", Carbon 1995, 33, 1585 ("Hontoria-Lucas 1995").
Hu, et al., "Compressible carbon nanotube-graphene hybrid aerogels with superhydrophobicity and superoleophilicity for oil sorption", Environ. Sci. Technol. Lett. 2014, 1, 214 ("Hu 2014").
James, et al., "Graphene: Powder, Flakes, Ribbons, and Sheets," Acc. Chem. Res. 2012, 46, 2307 ("James 2012").
Kandola, et al., "Complex char formation in flame-retarded fibre-intumescent combinations—II. Thermal analytical studies", Polymer Degradation and Stability, 1996, 54, 289-303 ("Kandola 1996").
Kokai, et al.; "Laser ablation of polysulfone films: a laser ionization TOF mass spectrometric study"; Applied Physics A, 67, 607-612, 6 pages, Aug. 12, 1998.
Lee, et al., "Fabrication of Hierarchical Structures on a Polymer Surface to Mimic Natural Superhydrophobic Surfaces", Adv. Mater. 2007, 19, 2330 ("Lee 2007").
Lee, et al., "Measurement of the elastic properties and intrinsic strength of monolayer graphene", Science 2008, 321, 385 ("Lee 2008").
Li, et al., "A facile approach to superhydrophobic and superoleophilic graphene/polymer aerogels", J. Mater. Chem. A 2014, 2, 3057 ("Li 2014").
Li, et al., "High-Performance Pseudocapacitive Microsupercapacitors from Laser-Induced Graphene", Adv. Mater. 2015, 28, 838 ("Li 2014").
Li, et al., "Nitrogen-doped carbonized cotton for highly flexible supercapacitors", Carbon 2016, 105, 260 ("Li 2016").
Lin, et al., "Laser-induced porous graphene films from commercial polymers", XP-002774358; Nature Communications, 5:5714, Dec. 10, 2014; 8 pages.
Lin, et al., "100-GHz Transistors from Wafer-Scale Epitaxial Graphene", Science 2010, 327, 662 ("Lin 2010").
Lin, et al., "Superhydrophobic Functionalized Graphene Aerogels", ACS Appl. Mater. Interfaces 2011, 3, 2200 ("Lin 2011").
Liu, et al., "Strategies for chemical modification of graphene and applications of chemically modified graphene", J. Mater. Chem. 2012, 22, 12435 ("Liu 2012").
Ma, et al., "Recent Development of Advanced Materials with Special Wettability for Selective Oil/Water Separation", Small 2016, 12, 2186 ("Ma 2016").
Marcano, et al., "Improved Synthesis of Graphene Oxide", ACS Nano 2010, 4, 4806 ("Marcano 2010").
Mattevi, et al., "A review of chemical vapour deposition of graphene on copper", J. Mater. Chem. 2011, 21, 3324 ("Mattevi 2011").
Nguyen, et al., "Superhydrophobic and superoleophilic properties of graphene-based sponges fabricated using a facile dip coating method", Energy Environ. Sci. 2012, 5, 7908 ("Nguyen 2012").
Novoselov, et al., "A roadmap for graphene", Nature 2012, 490, 192 ("Novoselov 2012").
Park, et al., "Fast growth of graphene patterns by laser direct writing", Applied Physics Letters 2011; 98: 123109-1 to 123109-3 (Year: 2011).
Patel, "Continuous-Wave Laser Action on Vibrational-Rotational Transitions of CO2", Physical Review A, 1964, 136(5A), 1187-1193 ("Patal 1964").
Peng, et al., "Flexible and Stackable Laser-Induced Graphene Supercapacitors", ACS Appl. Mater. Interfaces 2015, 7, 3414 ("Peng I 2015").
Peng, et al., "Flexible Boron-Doped Laser-Induced Graphene Microsupercapacitors", ACS Nano 2015, 9, 5868 ("Peng II 2015").
Pimenta, et al., "Studying disorder in graphite-based systems by Raman spectroscopy", Phys. Chem. Chem. Phys. 2007, 9, 1276 ("Pimenta 2007").
Rafiee, et al., "Superhydrophobic to Superhydrophilic Wetting Control in Graphene Films", Adv. Mater. 2010, 22, 2151 ("Rafiee 2010").
Rahimi, et al,. "Highly Stretchable and Sensitive Unidirectional Strain Sensor via Laser Carbonization," ACS Appl. Mater. Interfaces, 2015, 7(8), 4465-4470 ("Rahimi 2015").
Raimondi, et al., "Quantification of polyimide carbonization after laser ablation", J. Appl. Phys., 2000, 88(6), 3659-3666 ("Raimondi 2000").
Romero, et al., "Chemical Makeup and Hydrophilic Behavior of Graphene Oxide Nanoribbons after Low-Temperature Fluorination", ACS Nano 2015, 9, 7009 ("Romero 2015").
Singh, et al., "Superhydrophobic Graphene Foams", Small 2013, 9, 75 ("Singh 2013").
Srinivasan, et al., "Chemical transformations of the polyimide Kapton brought about by ultraviolet laser radiation", J. Appl. Phys., 1995, 78, 4881-4887 ("Srinivasan 1995").

\* cited by examiner

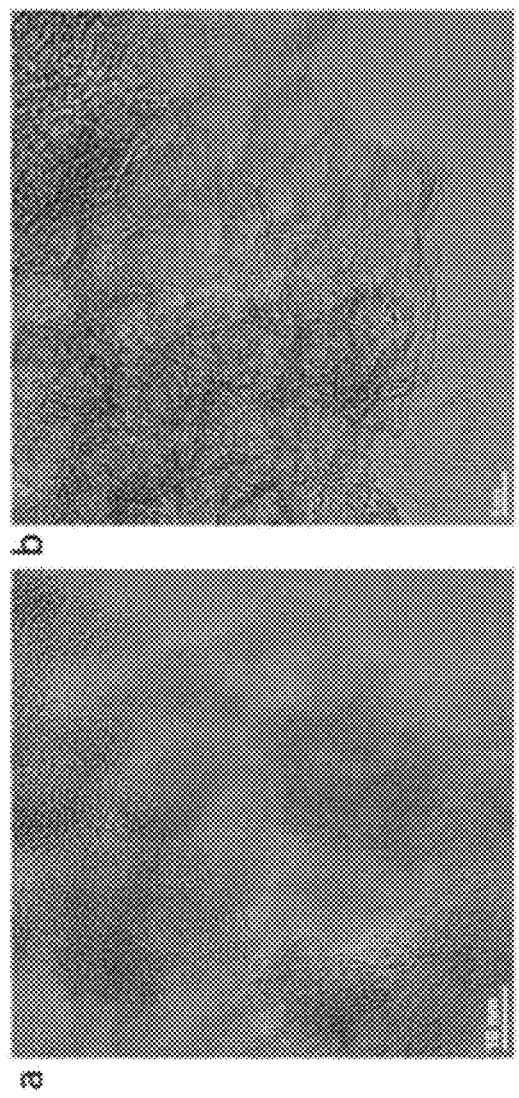
FIG. 4A
FIG. 4B
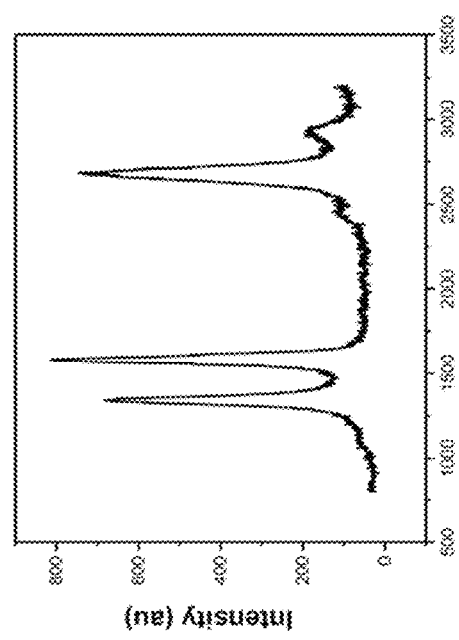
FIG. 4C

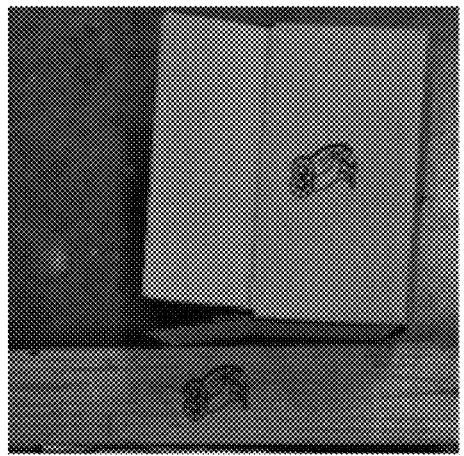
FIG. 9A
FIG. 9B
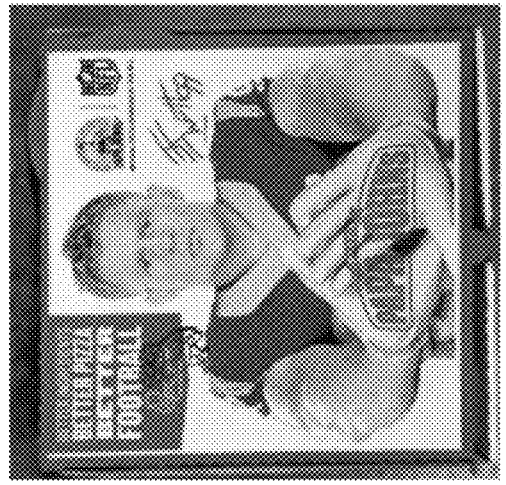
FIG. 9C
FIG. 9D

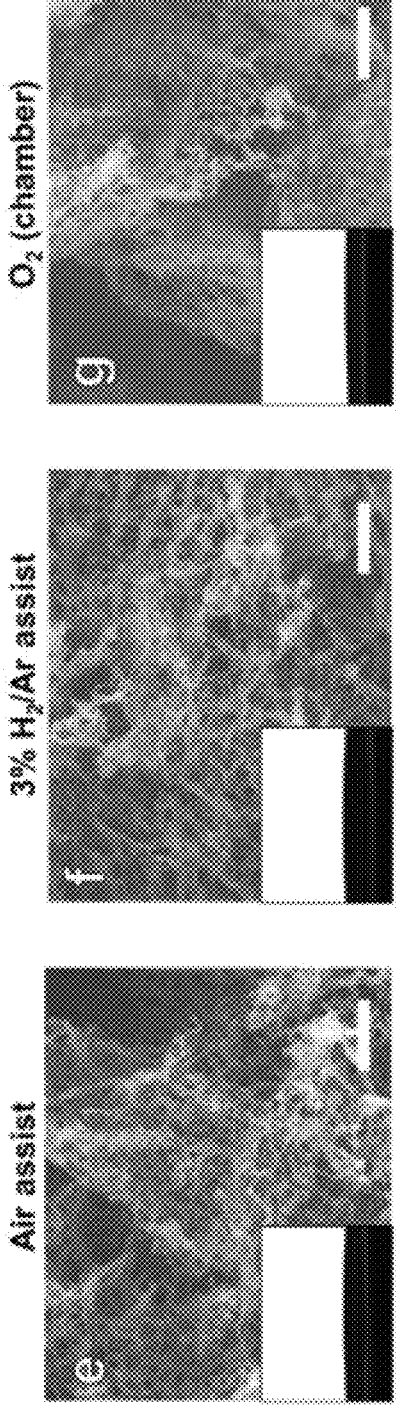

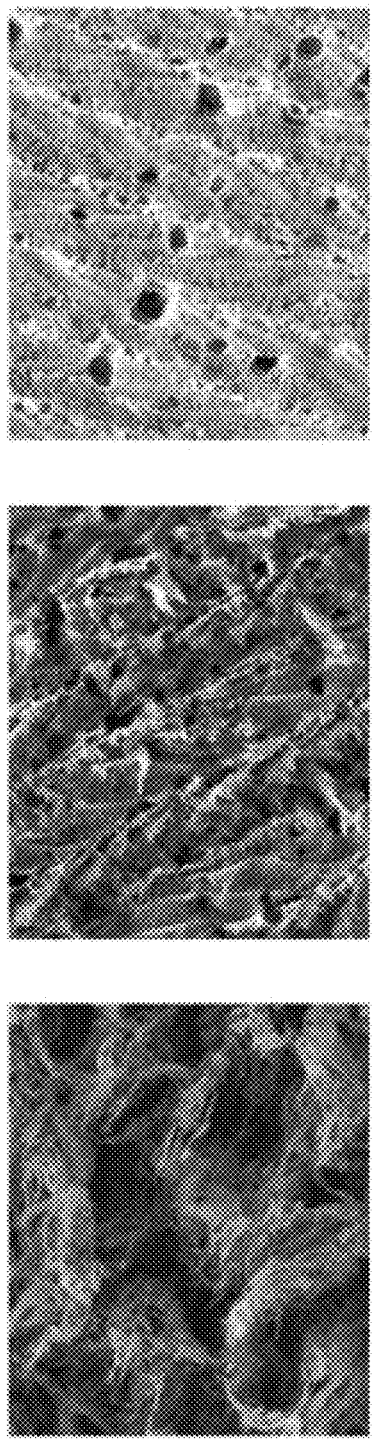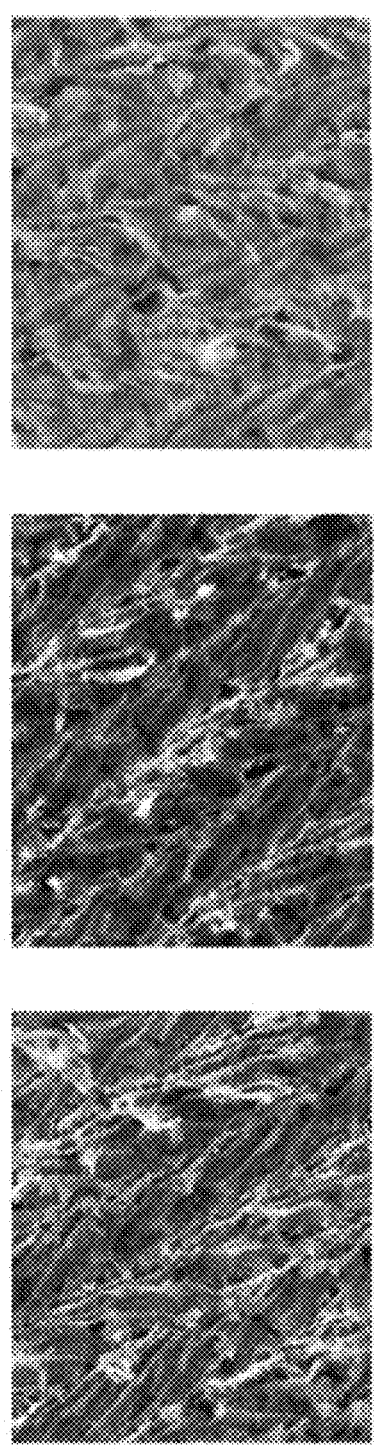

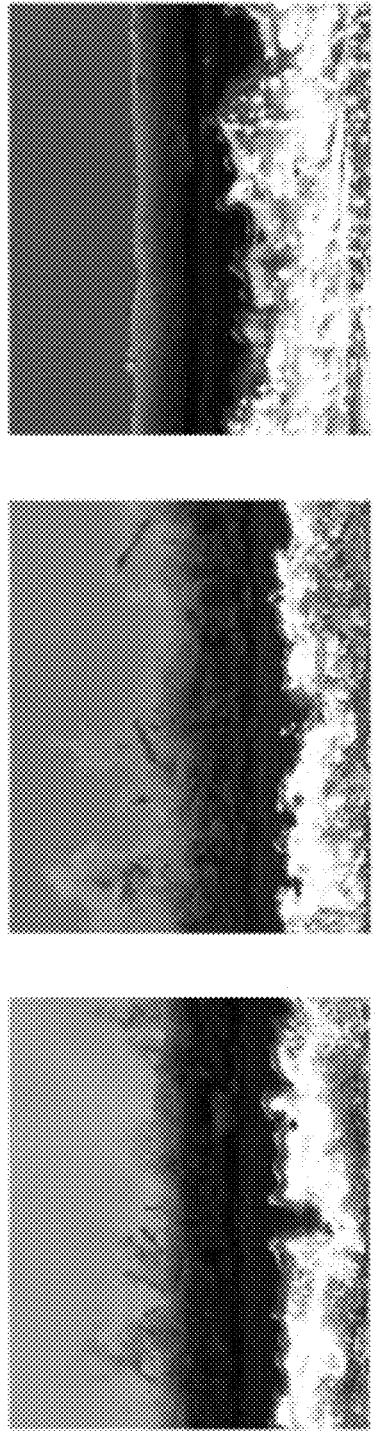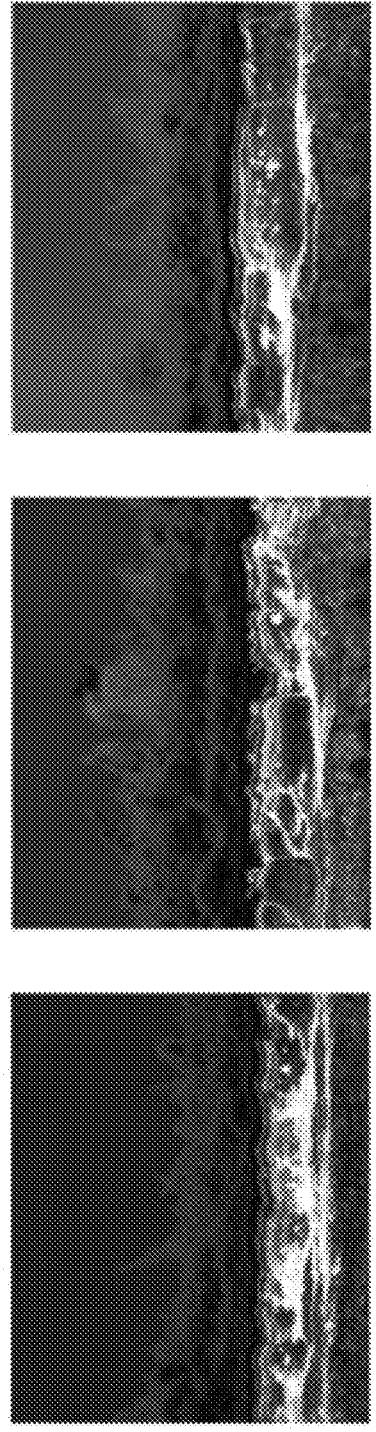

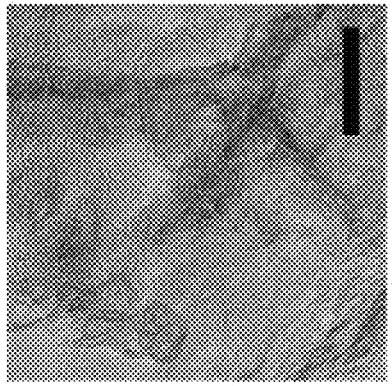
FIG. 19I
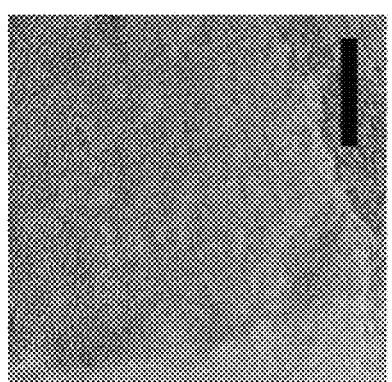
FIG. 19L
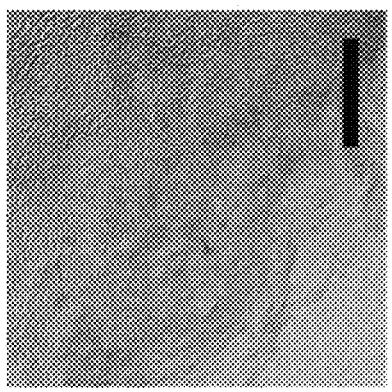
FIG. 19H
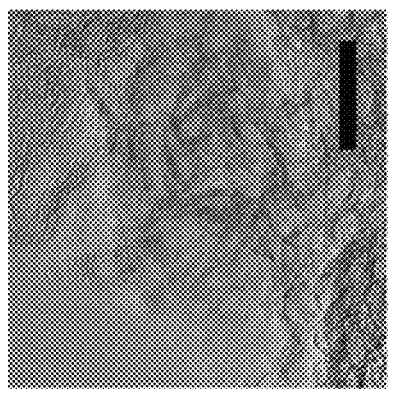
FIG. 19K
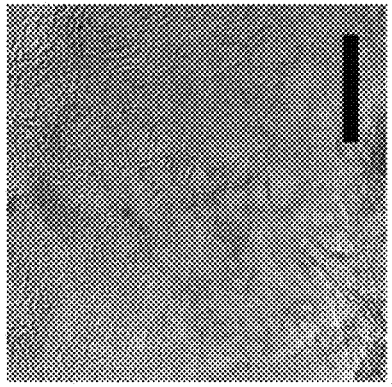
FIG. 19G
FIG. 19J

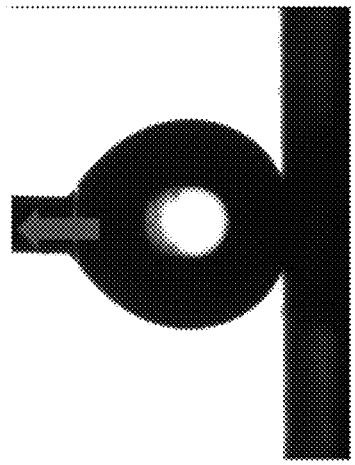
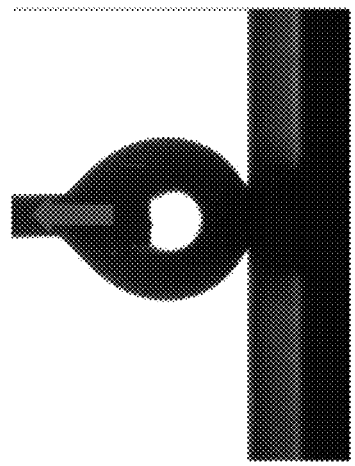
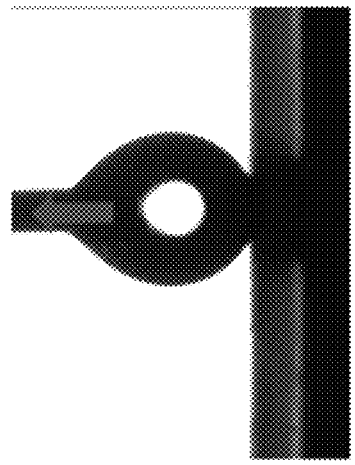

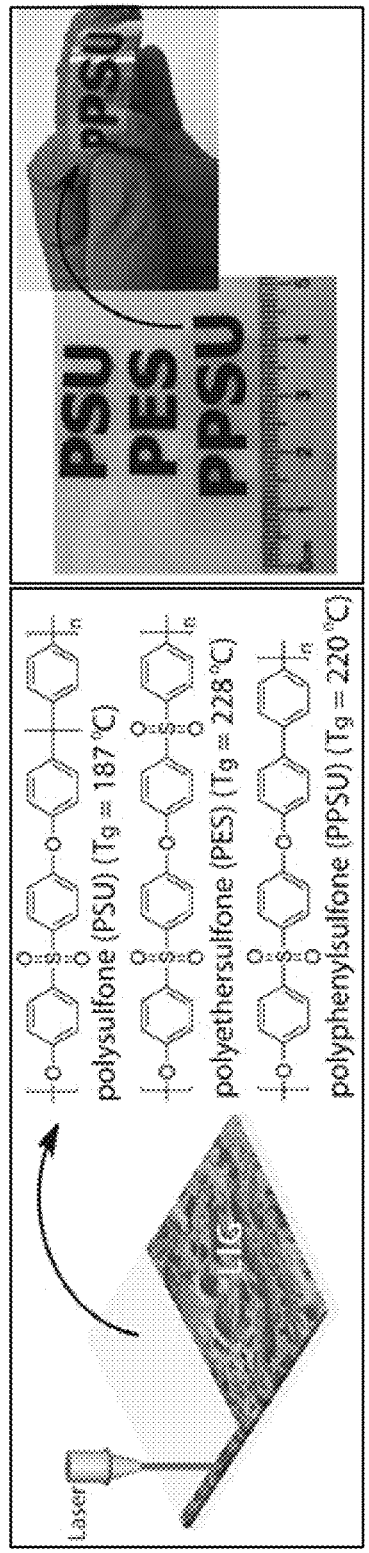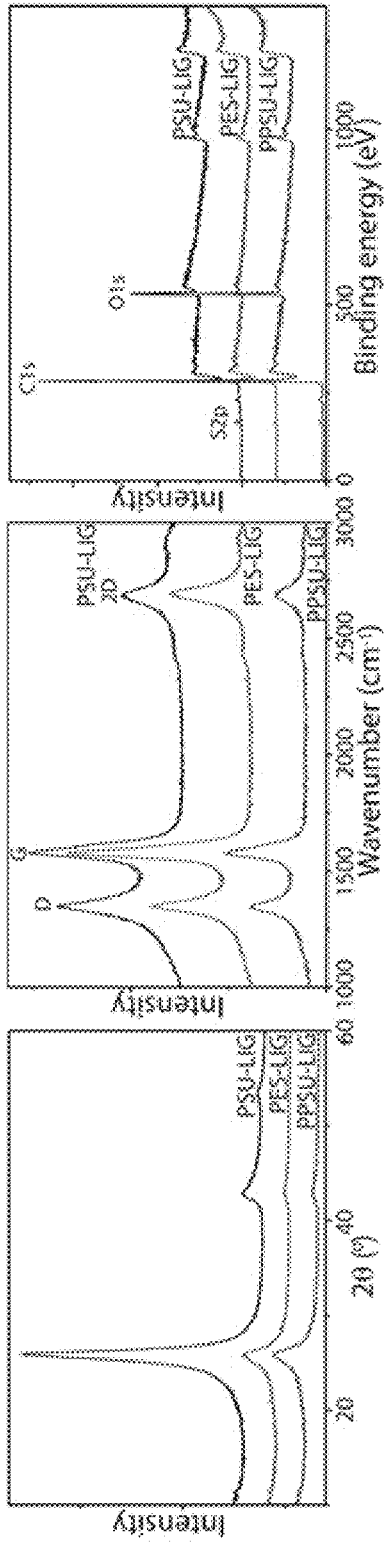
FIG. 34A
FIG. 34B
FIG. 34C
FIG. 34D
FIG. 34E

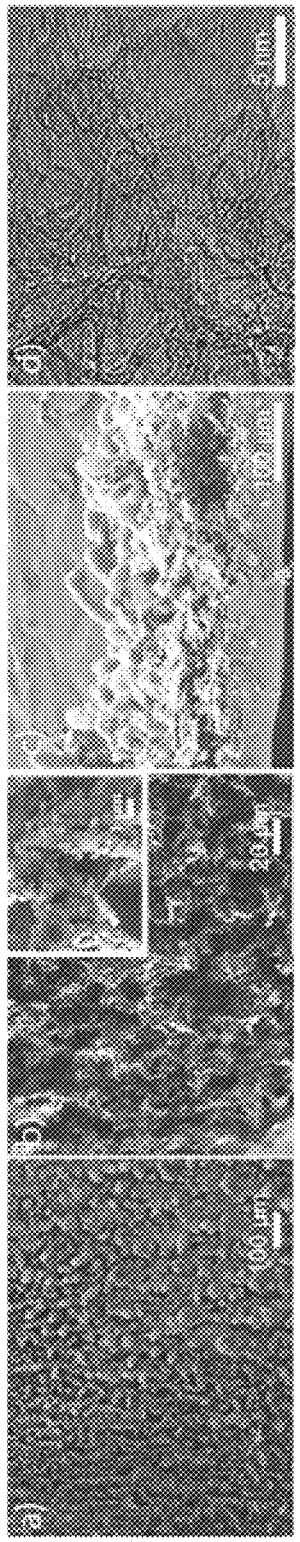
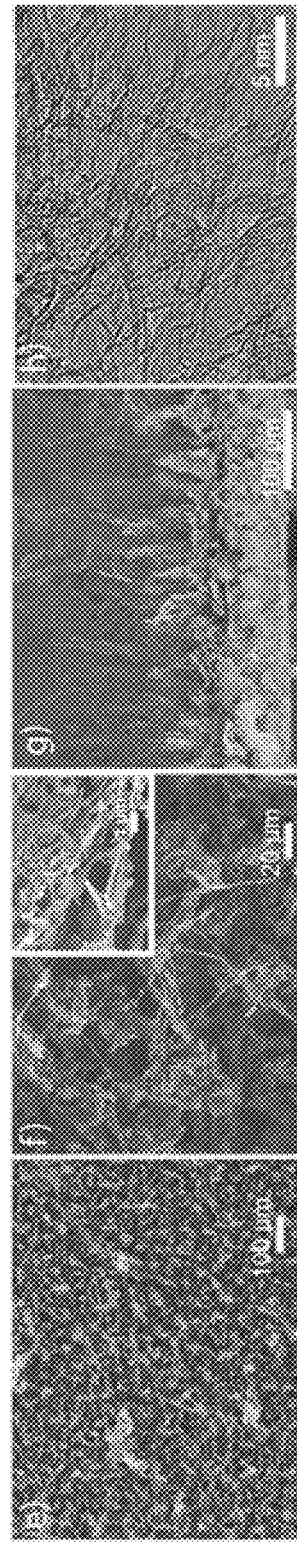

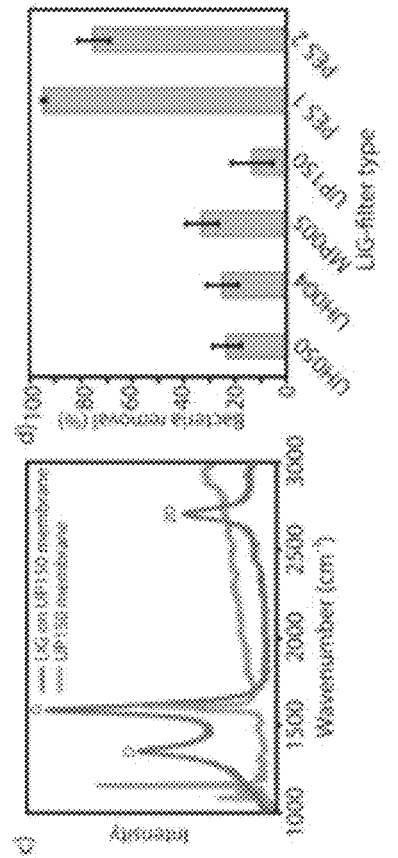
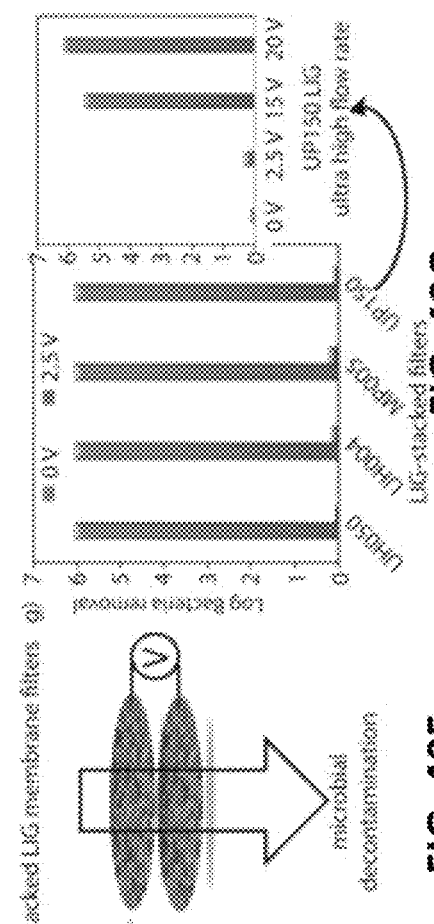

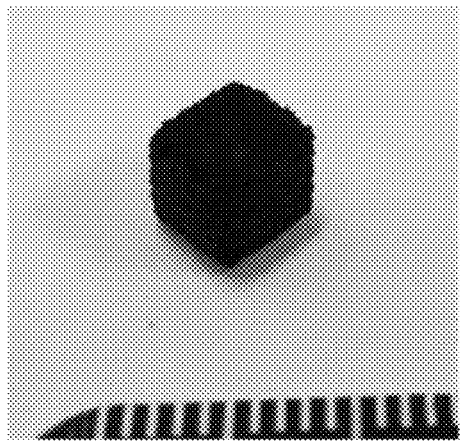
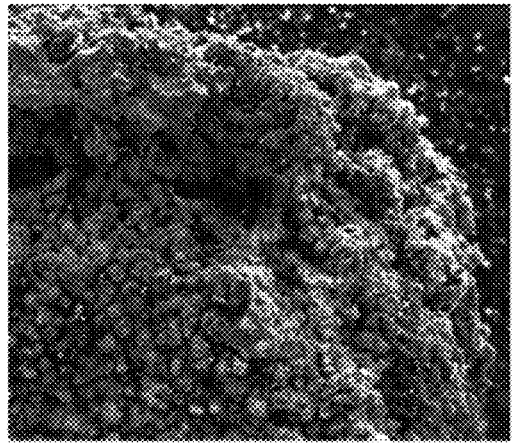
FIG. 44A  FIG. 44B
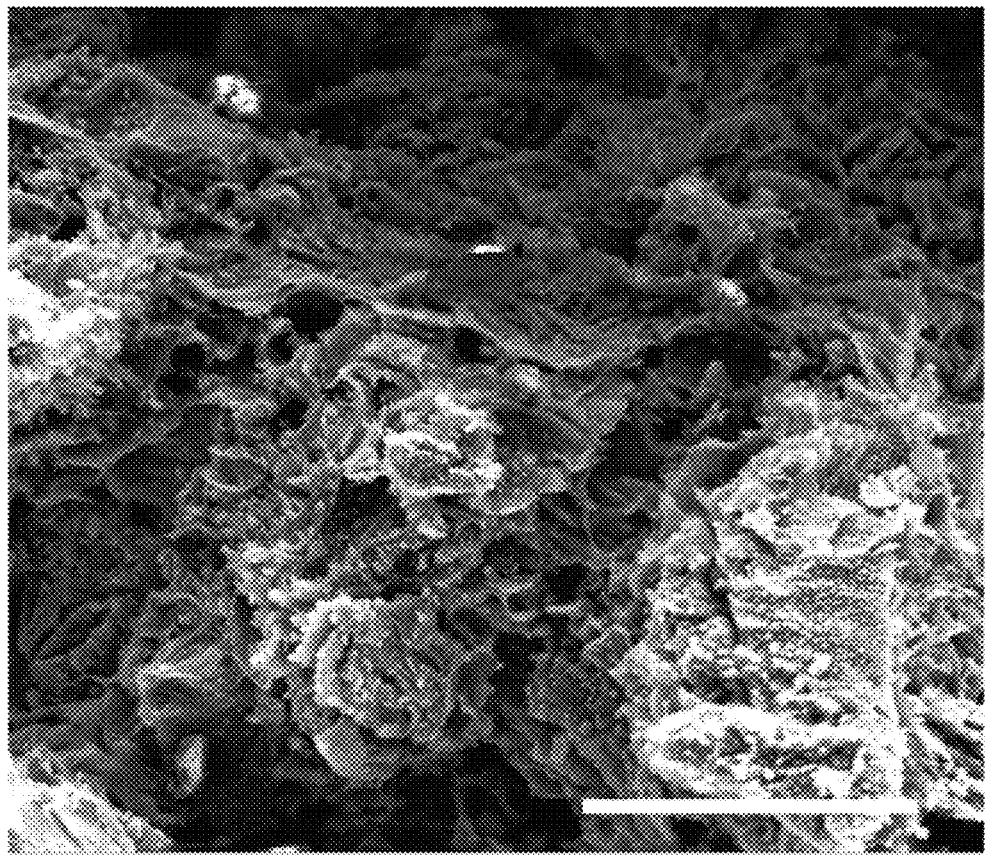
FIG. 44C

METHODS OF FABRICATING LASER-INDUCED GRAPHENE AND COMPOSITIONS THEREOF

RELATED PATENT APPLICATIONS

The application is a continuation of U.S. patent application Ser. No. 16/347,451, filed May 3, 2019, entitled "Methods Of Fabricating Laser-Induced Graphene And Compositions Thereof," (issued as U.S. Pat. No. 11,161,744, on Nov. 2, 2021), which is the U.S. § 371 national application of International PCT Application No. PCT/US2017/060238, filed on Nov. 6, 2017; entitled "Methods Of Fabricating Laser-Induced Graphene And Compositions Thereof" and claims priority to the following provisional patent applications: (a) U.S. Patent Application No. 62/418,202, entitled "Polymer-Derived Laser-Induced Graphene Materials And Uses Thereof," filed on Nov. 6, 2016); (b) U.S. Patent Application No. 62/487,821, entitled "Methods of Fabricating Laser-Induced Graphene In Controlled Atmospheres And Compositions Thereof," filed Apr. 20, 2017; and (c) U.S. Patent Application No. 62/537,512 entitled "Polymer-Derived Laser-Induced Graphene Materials And Uses Thereof," filed Jul. 27, 2017. All of these above-identified applications are commonly assigned to the Applicants of the present invention and are hereby incorporated herein by reference in their entirety for all purposes.

GOVERNMENT INTEREST

This invention was made with government support under Grant No. FA9550-14-1-0111 and FA9550-12-1-0035, awarded by the U.S. Department of Defense, Air Force Office of Scientific Research. The United States government has certain rights in the invention.

FIELD OF INVENTION

The present invention relates to methods of fabricating laser-induced graphene from materials, which range from natural, renewable precursors (such as cloth or paper) to high performance polymers (like Kevlar). The resulting laser-induced graphene can be used, inter alia, in electronic devices, as antifouling surfaces, in water treatment technology, and in electronics on paper and food.

BACKGROUND OF INVENTION

Graphene, an important member of the family of carbon nanomaterials, has shown promising applications in electronic devices, energy storage, and electrochemical catalysis due to its unique physical properties such as high surface area, high conductivity, good mechanical strength and stability. [Geim 2007; Geim 2009; Allen 2009; James 2012; Novoselov 2012; Lee 2008; Bolotin 2008; Balandin 2008; Lin 2010; Dai 2012; Fan 2015]. The modification of graphene structures introduces functional groups and/or active substances onto the graphene surface or edges, thus providing varied materials properties. Common structural changes on graphene generally occur post-graphene formation, and they involve wet-chemical or chemical vapor deposition (CVD) processes. [Liu 2012; Georgakilas 2012; Hirsch 2012; Wang 2014].

An often-desired modification of graphene seeks to tune the hydrophilicity or hydrophobicity of the surface of graphene-based materials, especially to achieve superhydrophobic surfaces that can be used for applications such as water and oil separation [Nguyen 2012; Dong 2012; Hu 2014; Feng 2016; Ma 2016] or anti-icing [Wang 2016]. The specific approaches include sonicating graphene oxide (GO) in different solvents followed by drop-coating [Rafiee 2010], dip-coating of sponges with thermally shocked GO [Nguyen 2012], CVD synthesis of 3D graphene/CNT hybrids [Dong 2012], microwave-assisted synthesis of graphene/CNT aerogels [Hu 2014], and by introducing fluorine-groups into the graphene-based structures or surfaces. [Wang 2016; Lin 2011; Zha 2011; Singh 2013; Li 2014]. These involve coating graphene foam or gel with polyvinylidene difluoride (PVDF) or polytetrafluoroethylene (Teflon™) [Zha 2011; Singh 2013; Li 2014], modifying GO aerogels with perfluorodecyltrichlorosilane [Lin 2011], and functionalizing graphene nanoribbons (GNRs) with perfluorododecyl groups [Wang 2016], all of which exploit the lower surface energy of C—F bonds to achieve even higher contact angles. Yet, within all the methods reported, usually multiple steps are required to yield the desired materials, and they all occur post-graphene formation.

Recently, the inventors of the present invention reported a laser-induced graphene (LIG) method as a facile and scalable approach to produce 3D porous graphene structures through a one-step laser scribing process from commercial polyimide (PI, Kapton®) films, which can be directly used as electrode materials for interdigitated microsupercapacitors, among other potential applications. [Lin 2014; Peng I 2015]. Various methods have then been developed to tune or improve the physical and chemical properties of the LIG by varying the laser conditions to change the thickness and morphology of LIG, or by introduction of boron or metal doping in the LIG by mixing the PI precursor with other substances. [Peng II 2015; Ye 2015]. Furthermore, modification can be done through the electrochemical deposition of active materials on top of the original LIG layer for high-performance pseudo-supercapacitors. [Li 2014]. Yet, all these LIG materials were fabricated in ambient atmosphere, and the surfaces that were produced were always hydrophilic, which allowed better contact between the graphene structures and the water-based electrolytes.

Porous 3D graphene-based nanomaterials demonstrate promise for a wide variety of applications due to their unique physical and chemical properties. A straightforward method of synthesizing laser-induced graphene (LIG) from polyimide (PI, Kapton®) has been previously reported and applied towards energy storage devices such as supercapacitors [Ye 2014], electrocatalysts for water splitting [Zhang 2017], piezoelectric strain gauges [Rahimi 2015], and for electrochemical biosensors [Rahimi 2015]. A limitation of this approach has been the reliance on polyimide as the polymer precursor for the formation of LIG.

The modification of graphene-based materials is an important topic in the field of materials research. The need remains to expand the range of properties for LIG.

SUMMARY OF INVENTION

The present invention provides a method to form LIG from a wide variety of carbon precursors including polymers, natural materials, and even non-polymeric materials such as activated carbon or anthracite coal by means of multiple lasing. Multiple lasing allows enhancement of the electrical properties by improving the quality of the LIG obtained. For example, polyetherimide (PEI) was previously found to produce LIG that was substantially less conductive than that formed from PI. [Lin 2014]. With multiple lasing, however, highly conductive PEI-based LIG could be obtained using both multiple pass and defocus methods. Moreover, multiple lasing allows for the formation of LIG on naturally occurring substrates such as cloth, paper, potato skins, coconut shells, cork, and activated carbon. These materials are inexpensive, abundant, and biodegradable unlike many of the polymer precursors found to yield LIG. The ability to form LIG on these substrates would potentially allow new applications such as flexible micro-supercapacitors on cloth or even edible electronics (after a thorough toxicity study).

The present invention expands the range of properties for laser-induced graphene (LIG), specifically to tune the hydrophobicity and hydrophilicity of the LIG surfaces. While LIG is normally prepared in the air, here, using selected gas atmospheres, a large change in the water contact angle on the as-prepared LIG surfaces has been observed, from 0° (superhydrophilic) when using $O_2$ or air, to >150° (superhydrophobic) when using Ar or $H_2$. Characterization of the newly derived surfaces shows that the different wetting properties are due to the surface morphology and chemical composition of the LIG. Applications of the superhydrophobic LIG are shown in oil/water separation as well as anti-icing surfaces, while the versatility of the controlled atmosphere chamber fabrication method is demonstrated through the improved microsupercapacitor performance generated from LIG films prepared in an $O_2$ atmosphere.

In other embodiments, the present invention relates to a laser-induced graphene made by multiple lasing of carbon precursors, which is an improvement to U.S. Patent Appl. Publ. No. 2017/0062821, entitled "Laser Induced Graphene Materials And Their Use In Electronic Devices," filed Feb. 17, 2015, to J. M. Tour et al. (the "Tour '821 Application") (co-owned by one of the Applicants), by further expanding the applicability of the lasing technique to generate laser-induced graphene. (The Tour '821 Application is the § 371 filing of PCT International Application Publ. No. WO/2015/175060, and is incorporated herein in its entirety). The present invention allows for the conversion of other carbon precursors beyond the previously reported formation of graphene from a polymer. With the methods of the present invention, carbon precursors other than the previously reported polyimide (PI) and polyetherimide (PEI) can be converted into laser-induced graphene materials, such as various aromatic polymers, lignin-containing materials, cellulose-based materials, and non-polymeric sources of carbon.

Some of the aromatic polymers that have been converted to laser-induced graphene by this method include polymers such as polyphenylene sulfide, polyamide-imide, polybenzimidazole, phenol-formaldehyde resin, poly(ether ether ketone) (PEEK), polysulfone, polyether sulfone, polyphenylsulfone, poly(m-pheylenediamine) isopthalamide, cross-linked polystyrene, epoxy, and poly(ether-imide). Lignin-containing materials include wood, coconut shells, potato skins, and burlap (jute fibers). Cellulose-based materials to promote LIG formation include cotton cloth, paper, cardboard (including those that are catalyst treated). Non-polymeric sources of carbon include amorphous carbon, charcoal, biochar, activated carbon, cole, asphalt, coke, and Gilsonite. Each of these can be employed to obtain LIG using the method of the present invention.

Previously, studies showed that only polymers containing aromatic and imide structures were reliably converted to porous graphene by laser scribing. The present invention is a laser scribing method for the production of graphene that can be generally applied to most carbon precursors. The method of the present invention also applies to non-polymeric materials, such as amorphous carbons, biochar, activated carbon, activated charcoal, coal and most other carbon sources.

In further embodiments, the present invention relates to direct 3D printing (more recently called additive manufacturing) of graphene materials from carbon precursors. The present invention includes a metal-free method by which a 3D graphene object can be printed via the exposure of one or more carbon precursors to laser irradiation. Single exposures of a laser can be employed, but, preferably, multiple exposures would be used.

Previous methods for obtaining 3D graphene typically involved 3D printing from GO inks or the thermal conversion of a carbon source such as sucrose by a metal catalyst such as nickel; the latter constitutes a powder metallurgy technique and not a 3D printing technique. And in that case a freestanding graphene object could only be obtained by a solution etch of the metal catalyst.

This present invention allows for the direct 3D printing of graphene from one or more carbon precursors including at least one polymer by using the multiple lase technique previously described. One potential embodiment of this process is the multiple lasing of a mixture of poly(phenylene sulfide) (PPS) and activated carbon (AC) powder by either the multiple scan or defocused raster methods. The combination of these materials and use of the multiple laser procedure in the 3D print allows an extremely conductive material with a sheet resistance of <5 Ohm/square to be obtained under certain parameters. Because the process is metal-free, both metal catalysts and non-metal additives can be added in controlled amounts to tune the properties of the 3D graphene for various applications.

In general, in one embodiment, the invention features a method of producing a graphene material. The method includes selecting a material including a carbon precursor. The method further includes converting the carbon precursor into laser-induced graphene by utilizing a laser having a focal plane to subject the carbon precursor to more than one exposure of laser irradiation. The step of utilizing the laser is selected from the group consisting of (i) utilizing the laser to perform multiple lase passes over a same area of the material, (ii) utilizing the laser upon overlapping regions of lased areas of the material, and (iii) combinations thereof.

Implementations of the invention can include one or more of the following features:

The step of converting the carbon precursor into laser-induced graphene can be performed at ambient conditions.

The method can further include applying a heat source to the material to char the carbon precursor before the step of converting carbon precursor into laser-induced graphene.

The heat source can be a flame.

The material including the carbon precursor can be selected from a group consisting of polymers, lignin-containing materials, cellulose-based materials, and non-polymeric sources of carbon.

The material including the carbon precursor can be an polymer selected from a group consisting of polyphenylene sulfide, polyamide-imide, polybenzimidazole, phenol-formaldehyde resin, poly(ether ether ketone) (PEEK), poly(m-pheylenediamine) isopthalamide, crosslinked polystyrene, epoxy, and poly(ether-imide).

The material including the carbon precursor can be a lignin-containing material selected from a group consisting of wood, coconut shells, potato skins, and burlap.

The material including the carbon precursor can be a cellulose-based material selected from a group consisting of cotton cloth, paper, cotton paper, and cardboard.

The material including the carbon precursor can be a non-polymeric source of carbon selected from a group consisting of amorphous carbon, charcoal, biochar, activated carbon coal, asphalt, coke, and Gilsonite.

The step of converting the carbon precursor into laser-induced graphene can include utilizing the laser to perform multiple lase passes over the same area of the material with the material positioned in the focal plane of the laser.

The step of converting the carbon precursor into laser induced-graphene can include utilizing the laser upon the overlapping regions of lased areas of the material with the material positioned offset the focal plane of the laser.

The laser can be utilized at ambient conditions.

The utilization of the laser can include exposing the material to multiple lases in a single pass of the laser while the material is positioned offset the focal plane of the laser.

The material can be positioned offset of the focal plane of the laser in an amount that is at least 1% of the laser focal length.

The material can be positioned offset of the focal plane of the laser in an amount that is at least 2% of the laser focal length.

In general, in another embodiment, the invention features a method of producing a graphene material. The method includes controlling a gas atmosphere. The method further includes fabricating laser-induced graphene by exposing one or more carbon precursors to a laser source in the controlled atmosphere. The exposing results in formation of laser-induced graphene derived from the one or more carbon precursors.

Implementations of the invention can include one or more of the following features:

The step of controlling the gas atmosphere can obtain a superhydrophilic laser-induced graphene or a highly hydrophilic laser-induced graphene.

The step of controlling the gas atmosphere can obtain a superhydrophobic laser-induced graphene or a highly hydrophobic laser-induced graphene.

The step of controlling the gas atmosphere can include a gas assist method in which a first gas is blown directly at the laser spot of the laser source while the one or more carbon precursors are surrounded by air.

The step of controlling the gas atmosphere can include utilizing a controlled atmosphere chamber.

The controlled gas atmosphere can use $O_2$ or air. The laser-induced graphene can be a superhydrophilic laser-induced graphene.

The controlled gas atmosphere can use at least one of nitrogen, argon, $SF_6$, and $H_2$. The laser-induced graphene can be a superhydrophobic laser-induced graphene.

The controlled gas atmosphere can include an inert gas.

The inert gas can be selected from a group consisting of nitrogen and argon.

The controlled gas atmosphere can include a reactive gas.

The reactive gas can be a halogenated gas.

The halogenated gas can be selected from a group consisting of $Cl_2$, $Br_2$, $SF_6$, and $XeF_2$.

The reactive gas can be a reducing gas.

The reducing gas can be selected from a group consisting of $H_2$ and $NH_3$.

The reactive gas can be an oxidizing gas.

The oxidizing gas can be selected from a group consisting of $O_2$ and air.

The reactive gas can be selected from the group consisting of $CO$, $SO_2$, and $NO_2$.

In general, in another embodiment, the invention features a material including laser-induced graphene made by at least one of the above-described methods.

In general, in another embodiment, the invention features a method that includes selecting an above-described material including laser-induced graphene. The method further includes utilizing the laser-induced graphene in an application selected from a group consisting of water/oil separation processes and anti-icing processes.

In general, in another embodiment, the invention features a method of producing a graphene material. The method includes selecting one or more carbon precursors. The method further includes fabricating laser-induced graphene by exposing the one or more carbon precursors to more than one lase.

Implementations of the invention can include one or more of the following features:

The one or more carbon precursors can not include polyimide (PI) and polyetherimide (PEI).

At least one of the one or more carbon precursors can be selected from a group consisting of aromatic polymers, lignin-containing materials, cellulose-based materials, and non-polymeric sources of carbon.

At least one of the one or more carbon precursors can be an aromatic polymer selected from a group consisting of polyphenylene sulfide, polyamide-imide, polybenzimidazole, phenol-formaldehyde resin, poly(ether ether ketone) (PEEK), poly(m-pheylenediamine) isopthalamide, cross-linked polystyrene, epoxy, and poly(ether-imide).

At least one of the one or more carbon precursors can be a lignin-containing material selected from a group consisting of wood, coconut shells, potato skins, and burlap.

At least one of the one or more carbon precursors can be a cellulose-based material selected from a group consisting of cotton cloth, paper, and cardboard.

The cellulous-based material can be a catalyst treated cellulous material.

The cellulous material can be pre-treated with a flame retardant before the step of fabricating the laser-induced graphene.

The flame retardant can be a phosphate-based retardant or a borate-based flame retardant.

The cellulous-based material can be been pretreated by charring the cellulous-based material before the step of fabricating the laser-induced graphene.

At least one of the one or more carbon precursors can be a non-polymeric source of carbon selected from a group consisting of amorphous carbon, charcoal, biochar, activated carbon coal, asphalt, coke, and Gilsonite.

The step of fabricating the laser-induced graphene can include exposing the one or more carbon precursors to more than one lase at multiple lase spots that do not overlap.

The step of fabricating the laser-induced graphene can include exposing the one or more carbon precursors to more than one lase at multiple lase spots that do overlap.

The method can further include a step selected from a group consisting of: (a) performing the step of fabricating the laser-induced graphene while controlling the reaction atmosphere; (b) converting surface of the one or more carbon precursors into amorphous or graphitic carbons by thermal or chemical means; (c) applying a char promoting catalyst to promote the formation of amorphous or graphitic carbons; and (d) combinations thereof.

The method can further include controlling the reaction atmosphere while performing the step of fabricating the laser-induced graphene.

The controlled gas atmosphere can include an inert gas.

The inert gas can be selected from a group consisting of nitrogen and argon.

The controlled gas atmosphere can include a reactive gas.

The reactive gas can be selected from a group consisting halogenated gases, reducing gases, and oxidizing gases.

The reactive gas can be selected from the group consisting of $Cl_2$, $Br_2$, $SF_6$, $XeF_2$, $H_2$, $NH_3$, $O_2$, air, CO, $SO_2$, and $NO_2$.

The method can further include adding a metal solution to the laser-induced graphene. The metal solution can be selected from a group consisting of metal salt solutions, metal oxide solutions, and metal nanoparticle solutions, and combinations thereof. The method can further include exposing the laser-induced graphene with the added metal solution to one or more lases.

The step of exposing the laser-induced graphene with the added metal solution to one or more lases can form nanoparticles dispersed in the laser-induced graphene. The nanoparticles can be selected from a group consisting of metal nanoparticles, metal carbide nanoparticles, metal oxide nanoparticles, and combinations thereof.

The metal solution can include a metal selected from a group consisting of Co, Ni, Pt, Pd, Fe, Ru, transition metals, mixtures of transition metals and main group elements, and combinations thereof.

The main group elements can be chalcogenides or phosphides.

The metal solution can include a cobalt phosphide or a nickel phosphide.

In general, in another embodiment, the invention features a method of producing a graphene material. The method includes selecting one or more carbon precursors. The method further includes fabricating laser-induced graphene by exposing the one or more carbon precursors to thermal or chemical charring followed by a one lase cycle or greater than one lase.

Implementations of the invention can include one or more of the following features:

At least one of the one or more carbon precursors can be selected from a group consisting of polymers lignin-containing materials, cellulose-based materials, and non-polymeric sources of carbon.

At least one of the one or more carbon precursors can be an aromatic polymer selected from a group consisting of polyphenylene sulfide, polyamide-imide, polybenzimidazole, phenol-formaldehyde resin, poly(ether ether ketone) (PEEK), poly(m-pheylenediamine) isopthalamide, cross-linked polystyrene, epoxy, and poly(ether-imide).

At least one of the one or more carbon precursors can be a lignin-containing material selected from a group consisting of wood, coconut shells, potato skins, and burlap.

At least one of the one or more carbon precursors can be a cellulose-based material selected from a group consisting of cotton cloth, paper, and cardboard.

At least one of the one or more carbon precursors can be a non-polymeric source of carbon selected from a group consisting of amorphous carbon, charcoal, biochar, activated carbon, coal, asphalt, coke, and Gilsonite.

The one or more carbon precursors can be in the form of a roll such that the step of fabricating the laser-induced graphene can be performed in a roll-to-roll process.

The one or more carbon precursors can be selected from a group consisting of paper, cotton paper, cardboard, and polymer films.

The step of fabricating the laser-induced graphene can be performed utilizing a roll-to-roll process.

In general, in another embodiment, the invention features a laser-induced graphene made by at least one of the above-described methods.

In general, in another embodiment, the invention features a method that includes selecting an above-described laser-induced graphene. The method further includes utilizing the laser-induced graphene in an application selected from a group consisting of water/oil separation processes, anti-icing processes, microsupercapacitors, supercapacitors, electrocatalysis, water splitting catalysts, sensors, and flexible electronics.

In general, in another embodiment, the invention features a method that includes irradiating a material including an aromatic polysulfone with a laser to form laser-induced graphene on the surface of the material including the aromatic polysulfone.

Implementations of the invention can include one or more of the following features:

The aromatic polysulfone can be selected from a group consisting of polysulfone, polyethersulfone, and polyphenylsulfone.

The method can further include a step of separating the laser-induced graphene from the material.

In general, in another embodiment, the invention features a material that includes an aromatic polysulfone having graphene on a surface of the material.

Implementations of the invention can include one or more of the following features:

The material can include the aromatic polysulfone having sulfur-doped graphene on the surface of the material.

In general, in another embodiment, the invention features a method of reducing microbial load in a bulk solution. The method includes placing electrodes in the bulk solution. The electrodes include graphene recovered from laser-irradiated aromatic polysulfone. The method further includes applying a voltage across the electrodes.

In general, in another embodiment, the invention features a method of treating a surface prone to the formation of biofilm. The method includes applying a carbon precursor onto the surface to form a carbon precursor-coated surface. The method further includes laser-irradiating the carbon precursors-coated surface to form graphene thereon the surface.

In general, in another embodiment, the invention features a method of treating a surface prone to the formation of biofilm. The method includes laser-irradiating a material including a carbon precursor to form laser-induced graphene thereon. The method further includes coating the surface with the laser-irradiated material including the laser-induced graphene.

In general, in another embodiment, the invention features a method of treating a surface prone to the formation of biofilm. The method includes identifying a portion of the surface that includes a carbon precursor. The method further includes laser-irradiating the portion of the surface to form graphene from the carbon precursor thereon the surface.

In general, in another embodiment, the invention features a method that includes utilizing laser-induced graphene in a process selected from a group consisting of (a) for coating the inside of a pipe, (b) for degradation of organic or inorganic pollutants, (c) for a component of membrane water treatment equipment, (d) a component in a medical application and (d) combinations thereof.

Implementations of the invention can include one or more of the following features:

The process for degradation of organic or inorganic polutants can include oxidizing organic contaminents by applying electrical voltage to the laser-induced graphene.

The component of the membrane water treatment equipment can be selected from a group consisting of a membrane spacer operable for adsorption of pollutants, laser-induced graphene attached to a substrate, laser-induced graphene separated from a substrate, and laser-induced graphene attached to a membrane of the membrane water treatment equipment.

The medical application can be a blood dialysis application.

The blood dialysis application can utilize a dialysis membrane that includes the laser-induced graphene.

In general, in another embodiment, the invention features a method of fabricating a membrane for a separation application. The method includes selecting a membrane having a carbon precursor layer. The method further includes generating laser-induced graphene on the carbon precursor layer of the membrane to form a laser-induced graphene-coated separation membrane.

Implementations of the invention can include one or more of the following features:

The separation application can be selected from a group consisting of oil/water separation, liquid separations, gas separations, and liquid/gas separations.

The membrane can be a polymer membrane.

The carbon precursor can be an aromatic polysulfone.

The aromatic polysulfone can be selected from a group consisting of of polysulfone, polyethersulfone, and polyphenylsulfone.

In general, in another embodiment, the invention features a method that includes using a stack of at least two laser-induced graphene-coated membranes for filtration. Each of the at least two laser-induced graphene-coated membranes includes a surface having laser-induced graphene. The method further includes utilizing the laser-induced graphene surfaces as electrodes during a filtration process.

In general, in another embodiment, the invention features a method that includes selecting a material including laser-induced graphene. The method further includes utilizing the material including laser-induced graphene in a water treatment process.

Implementations of the invention can include one or more of the following features:

The laser-induced graphene can include laser-irradiated aromatic polysulfone.

The method can further include laser-irradiating a material including an aromatic polysulfone to form the material including laser-induced graphene.

In general, in another embodiment, the invention features a method that includes selecting a material including laser-induced graphene. The method further includes utilizing the material including laser-induced graphene in a membrane separation process.

Implementations of the invention can include one or more of the following features:

The method can further include utilizing the material including laser-induced graphene in which an electrical voltage is applied.

The electrical voltage can be direct current (DC) or alternating current (AC).

In general, in another embodiment, the invention features a method that includes selecting a laser-induced graphene having dispersed nanoparticles selected from a group consisting of metal nanoparticles, metal carbide nanoparticles, metal oxide nanoparticles, and combinations thereof. The method further includes utilizing the laser induced graphene having dispersed nanoparticles as a catalyst in a reaction.

Implementations of the invention can include one or more of the following features:

The reaction can be selected from a group consisting of organic oxidation or reduction transformations and electrocatalytic transformations.

The electrocatalytic transformations can be selected from a group consisting of hydrogen evolution reactions (HER), oxygen evolution reactions (OER), hydrogen oxidation reactions (HOR), oxygen reduction reactions (ORR), and combinations thereof.

In general, in another embodiment, the invention features a method that includes selecting one or more carbon precursors. The method further includes direct 3D printing of graphene materials from the one or more carbon precursors via the exposure of the one or more carbon precursors to laser irradiation. The laser irradiation is performed utilizing a laser having a focal plane. The step of utilizing the laser is selected from the group consisting of (i) utilizing the laser to perform multiple lase passes over a same area of the material, (ii) utilizing the laser upon overlapping regions of lased areas of the material, and (iii) combinations thereof.

Implementations of the invention can include one or more of the following features:

A metal catalyst can not be required to produce the graphene materials from the one or more carbon precursors.

The step of 3D printing can not utilize a metal catalyst.

The method can be a metal-free 3D printing process.

The exposure of the one or more carbon precursors to the laser irradiation can include multiple exposures.

The one or more carbon precursors can include a mixture of at least two different carbon precursors.

The two different carbon precursors can include a polymer and activated carbon.

The two different carbon precursors can include a thermoplastic carbon precursor and a non-thermoplastic carbon precursor.

At least one of the one or more carbon precursors can be selected from a group consisting of aromatic polymers, lignin-containing materials, cellulose-based materials, and non-polymeric sources of carbon.

The method can further include a step selected from a group consisting of: (a) exposure of the one or more carbon precursors to the laser irradiation is performed while controlling the reaction atmosphere; (b) mixing an additive into the one or more carbon precursors; (c) at least one of the one or more carbon precursors is a liquid carbon precursor; and (d) combinations thereof.

The additive can be selected from a group consisting of melamine, ammonia, boranes, phosphenes, phosphides, and combinations thereof.

The exposure of the one or more carbon precursors to the laser irradiation can be performed while controlling the reaction atmosphere.

The exposure of the one or more carbon precursors to the laser irradiation can be performed utilizing the laser to perform multiple lase passes over the same area of the material. The material can be positioned in the focal plane of the laser.

The exposure of the one or more carbon precursors to the laser irradiation can be performed utilizing the laser in which the one or more carbon precursors are irradiated offset of the focal plane of the laser.

The laser can have a laser focal length. The offset of the focal plane of the laser can be in an amount that is at least 1% of the laser focal length.

The offset of the focal plane of the laser can be in an amount that is at least 1.5% of the laser focal length.

The offset of the focal plane of the laser can be in an amount that is at least 2% of the laser focal length.

In general, in another embodiment, the invention features a 3D graphene structure made by at least one of the above-described methods.

In general, in another embodiment, the invention features a 3D printing apparatus that include a build area. The 3D printing apparatus further includes a laser positioned adjacent to the build area operable to move in a first direction and a second direction. The first direction and the second direction are orthogonal. The 3D printing apparatus further includes a reservoir including a material that can be amorphous carbon or can be converted to amorphous carbon. The 3D printing apparatus further includes a distributor operable to distribute the material into the build area. The laser is operable to irradiate the material to form laser-induced graphene. The build area is operable to be moved in a third direction that is orthogonal to the first direction and the second direction. The 3D printing apparatus is operable to print a 3D object by the irradiation of the material performed in conjunction with the movements of the build area in the third direction and the movement of the laser in the first direction and the second direction.

Implementations of the invention can include one or more of the following features:

The reservoir can include a material that can be converted to amorphous carbon.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

It is also to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

FIG. 1A is picture of LIG patterned into a Rice logo on a coconut. FIG. 1B is a Raman spectra of coconut-derived LIG lased at two times at 10% speed 5% power. FIG. 1C is a low resolution TEM of coconut-derived LIG after 5 lases. The scale bar is 50 nm. FIG. 1D is a high resolution TEM coconut-derived LIG (10% speed, 5% power, 5×) showing the characteristic 0.34 nm d-spacing of graphene. The scale bar is 5 nm. FIG. 1E is a LIG on cork in the shape of an owl. FIG. 1A is a potato scribed with laser to form LIG in "R" pattern.

FIGS. 4A-4C relate to activated carbon and activated carbon LIG. FIG. 4A is a TEM of activated carbon lased one time at 5% speed 5% power. FIG. 4A is an activated carbon lased 5× at 5% speed 5% power showing presence of few layer graphene. FIG. 4C is a Raman spectra of activated carbon LIG lased 2× at 5% speed 5% power with ~0.25 mm defocus.

FIG. 5A is a diagram of defocusing on the substrate to increase the laser spot size such that laser shots overlap, resulting in multiple exposures. FIG. 5B is a graph shwoing the equivalent number of lases at various defocus.

FIG. 6A is a Raman spectra of PEI-LIG at various defocus values ranging from 0.0 mm to ~2.0 mm (10% speed 5% power), with curves 601-605 corresponding to 0.00 mm, 0.25 mm, 0.76 mm, 1.27 mm, and 1.78 mm, respectively. FIG. 6B is sheet resistance, measured using 4-point probe, of PEI-LIG at various levels of defocus. FIG. 6C is a summary of $I_D/I_G$ and $I2_D/I_G$ of PEI-LIG for various amounts of defocus. FIG. 6D is a summary of the FWHM of the G peak for various amounts of defocus.

FIGS. 9A-9D relate to LIG on various materials. FIG. 9A is a photographs of the letter "R" in LIG induced from phosphate fire retardant treated bread. FIG. 9B LIG is a photograph of a fire-retardant treated 2×4 and on a cardboard box. FIG. 9C is a photograph of LIG in the shape of an owl on cotton paper. FIG. 9D is a photograph of LIG in the shape of an owl on a pizza box.

FIGS. 10E-10J are top view SEM images of LIG samples prepared under different gas atmospheres. Gas assist: (FIG. 10E) air, (FIG. 10F) 3% Hz/Ar. Controlled atmosphere chamber: (FIG. 10G) $O_2$, (FIG. 10H) air, (FIG. 10I) Ar, (FIG. 10J) Hz. Scale bars: 2 µm. Inset pictures in FIGS. 10E-10J are the water droplet appearance on the LIG surfaces. (FIG. 10F-10H) The water droplet appears to have a contact angle of 0°, (i) 152°, (j) 157°. SEM images with lower magnification are shown in FIGS. 16A-16L (top views and side views). 2% laser duty cycle is used for these samples.

FIG. 13A is a top-view SEM image; the inset is the water droplet on the LIG surface with a contact angle of 162°. FIG. 13B is the Raman spectrum. FIG. 13C is the XPS survey spectrum. FIG. 13D is the C 1s spectrum. FIG. 13E is the F 1s spectrum. FIG. 13F is the S 2p spectrum. Additional SEM and TEM images are shown in FIGS. 26A-26C. A 9.3 μm $CO_2$ laser was used when $SF_6$ was present. A 4% laser duty cycle is used for this sample.

FIG. 14A shows the CV curves with a scan rate of 10 mV/s. FIG. 14B shows the charge/discharge curves with a current density of 0.5 mA/cm$^2$. FIG. 14C shows the specific capacitance plotted against current density. FIG. 14D shows the Ragone plot showing the energy and power densities of the devices.

FIGS. 16A-16L are (FIGS. 16A-16F) top view and (FIGS. 16G-16L) side view SEM images of LIG made under different gas atmosphere. 2% laser duty cycle is used for these samples. The scale bar is 50 μm for all images.

FIGS. 19A-19L are TEM images of LIG made under different gas atmosphere. 2% laser duty cycle is used for these samples. (FIGS. 19A-19F) Scale bars: 200 nm. (FIGS. 19G-19L) Scale bars: 20 nm.

FIG. 20A is a top view SEM image of the filtered LIG film. FIG. 20B is an image of water droplet on the filtered LIG film; the measured contact angle is ~120°.

FIGS. 28A-28F are (FIG. 28A-28C) advancing and (FIG. 28D-28F) receding contact angles of LIG with Ar, $H_2$, and $SF_6$, respectively. The values are 159°/147°, 160°/156°, and 164°/159°, respectively. 2% laser duty cycle is used for LIG samples prepared with Ar and $H_2$ (chamber). A 9.3 μm $CO_2$ laser was used when $SF_6$ was present, and 4% laser duty cycle is used for LIG samples prepared with $SF_6$ (chamber).

(FIG. 29D) Water does not go through the filter; (FIG. 29E) $CHCl_3$ goes through the filter; (FIG. 29F) water stays on top of the filter even after all of the $CHCl_3$ went through.

FIG. 30A shows a LIG sample (made in air) tilted 45° at a temperature of −15 to −20° C. FIG. 30B shows water (~0° C.) dripped onto the LIG sample in FIG. 30A. FIG. 30C shows ice formed on LIG sample in FIG. 30B after 1 min. FIGS. 30D-30F show the same process as with FIGS. 30A-30C but using a LIG sample made in Ar (chamber); ice only formed on PI but not on LIG. 2% laser duty cycle is used for these samples.

FIG. 34A is a schematic of PSU class polymers LIG via laser induction.

FIG. 34B is A photo of LIG patterned on PSU, PES and PPSU polymers (inset show an example of the flexibility of PPSU-LIG).

FIGS. 34C-34E are, respectively, is XRD, Raman spectrum, and XPS survey of PSU-, PES- and PPSU-LIG.

FIGS. 35A-35L are SEM and TEM images for PSU-class LIG. FIGS. 35A-35C are SEM images of PSU-LIG at (a) low resolution; (b) high resolution; and (c) cross-section; respedtively. FIG. 35D is a TEM images for PSU-LIG. FIGS. 35E-35G are SEM images of PES-LIG at (e) low resolution; (f) high resolution; and (g) cross-section, respectively. FIG. 35H is a TEM image for PES-LIG. FIGS. 35I-35K are SEM images of PPSU-LIG at (i) low resolution; (j) high resolution; and (k) cross-section, respectively. FIG. 35L is a TEM image for PPSU-LIG.

(FIG. 36B) PES-LIG; and (FIG. 36C) PPSU-LIG. S2p de-convolution for (FIG. 36D) PSU-LIG; (FIG. 36E) PES-LIG; and (FIG. 36F) PPSU-LIG. S2p de-convolution for polymer substrates (FIG. 36G) PSU; (FIG. 36H) PES; and (FIG. 36I) PPSU.

(FIG. 37C) PES-LIG; and (FIG. 37E) PPSU-LIG. Using aqueous $Na_2SO_4$ (0.05 M) (FIG. 37B) PSU-LIG; (FIG. 37D) PES-LIG; and (FIG. 37F) PPSU-LIG.

(FIGS. 39C-39D) PES-LIG; and (FIGS. 39E-39F) PPSU-LIG.

FIG. 40A is an illustration of LIG printed on the commercial UP150 PES porous membrane, including a photograph of the UP150-LIG membrane coupon.

FIG. 40B are SEM images of the UP150-LIG filter at different resolutions.

FIG. 40C is a Raman spectra of UP150 membrane substrate and UP150-LIG.

FIG. 40D is a mixed bacterial solution ($10^{-6}$ CFU $mL^{-1}$) that was passed through commercial and self-made membranes (PES 1 and PES 2) coated with LIG.

FIG. 40E is a calculated biofilm biomass and average thickness on UP150 membranes and UP150-LIG. Representative IMARIS software images are shown above. These images show live and dead bacteria and EPS. Scale bar: 100 μm.

FIG. 40F is an illustration of stacked LIG-filter electrodes.

FIG. 40G is a filtration of bacterial solution (~$10^6$ CFU mL-1) at 2.5 V and ~500 L $h^{-1}$ with different commercial LIG-filters. The inset shows the UP-150 LIG filter at different voltages at an ultra-high flow rate (~22000 L $m^{-2}$ $h^{-1}$).

FIG. 44A is a photograph of a 5 $mm^3$ 3D graphene monolith printed from PPS-AC using a powder bed printing method.

FIG. 44B is an SEM image of corner of the cube shown in FIG. 44A at 50× magnification (scale bar is 1 mm).

FIG. 44C is an SEM image of the surface of the cube shown in FIG. 44A (scale bar is 50 μm).

DETAILED DESCRIPTION

The present invention expands the range of properties for LIG, especially to tune the hydrophobicity of the LIG surface, and further extends the field of applications for LIG based on such different properties.

Laser-Induced Graphene By Multiple Lasing

The present invention is directed to a method of using multiple pulsed-laser scribing to convert a wide range of substrates into laser-induced graphene (LIG), i.e., a simple and facile method of obtaining patterned graphene on the surface of diverse materials ranging from natural, renewable precursors (such as cloth and paper) to high-performance polymers (such as Kevlar).

With the increased versatility of the multiple lase process, highly conductive patterns can be achieved on the surface of a diverse number of substrates in ambient atmosphere. The use of a defocus method of obtaining multiple lases in a single pass of the laser allows for this method to be implemented without significantly increasing processing times as compared with laser induction of graphene on polyimide (Kapton) substrates previously reported. In fact, any carbon precursor that can be converted to amorphous carbon can be converted to graphene using this multiple lase method including, for example, burnt toast. A generally applicable technique for forming graphene on diverse substrates opens the possibility for many applications such as flexible and perhaps even biodegradable and edible electronics.

Figure 1A:
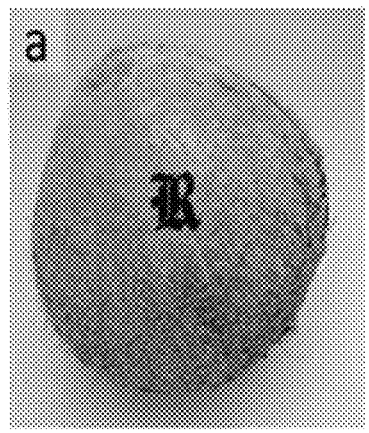
FIGS. 1A-1F relate to lignin LIG on coconut shell.

FIG. 1A depicts the conversion of a coconut surface into LIG in the shape of the letter "R." The surface of a coconut was converted into a 3D porous graphene structure by irradiation with a 10.6 µm $CO_2$ laser under ambient atmosphere.

Such fabrication of LIG by multiple lasing occurred as follows: An XLS10 MWH (Universal Laser Systems) laser platform was used to induce the formation of graphene on the various tested substrates. The XLS10 MWH was equipped with a 10.6 µm $CO_2$ pulsed laser (75 W) and a 9.3 µm $CO_2$ pulsed laser (50 W) and a 1.06 µm fiber laser was used to perform the laser induction for all materials. An image density of 1000 DPI and typically a scan rate of 15 cm/s was used but differing scan speeds were used. Generally, a laser duty cycle of 1-5% was used during the fabrication of LIG depending on the substrate used. Laser duty cycle refers to the percentage of time that the laser is active yielding an average power over the duration of each laser spot. The computer software supplied ULS adjusted the pulse widths and quiet times to achieve the desired average power. The laser was focused by lasing commercial PI (Kapton, thickness 127 µm, McMaster-Carr) at various z-axis heights and zeroing at the setting yielding the smallest LIG spot sizes. Z-axis defocus is in relation to this reference point.

Figure 1B:
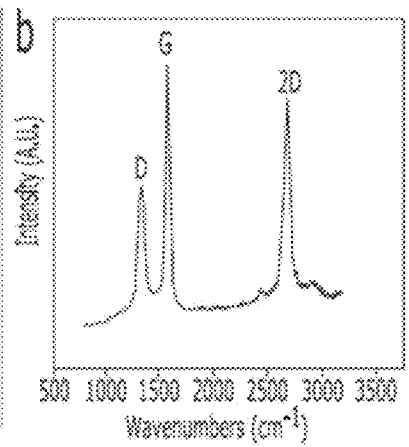
Figure 1C:
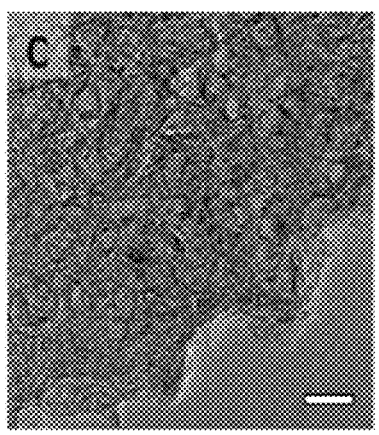

The lignin-containing precursor material can be easily patterned with LIG by computer-controlled laser rastering over the surface. Areas exposed to the laser light were converted by a photothermal process to graphene whereas areas not exposed to the laser remain unchanged. The presence of graphene was evidenced by the Raman spectrum depicted in FIG. 1B. FIG. 1C shows the transmission electron microscopy (TEM) image of a coconut-derived LIG flake. Higher resolution TEM images showed that the flake consists of few-layer graphene that reveal clear graphene fringes with the characteristic 0.34 nm d-spacing.

Figure 1D:
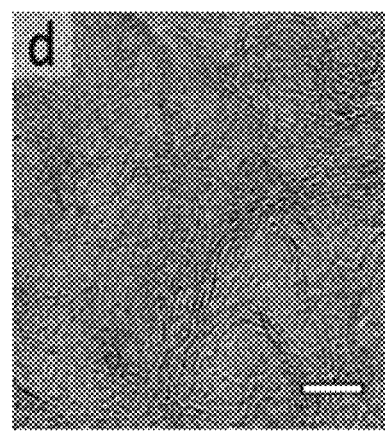
Figure 1E:
Figure 1F:
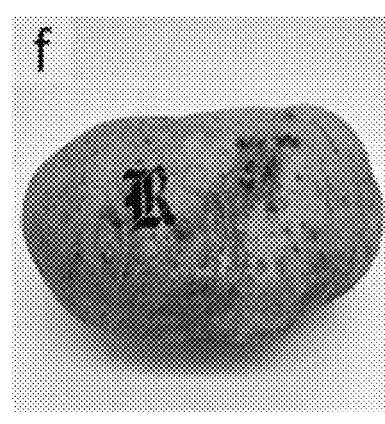
Figure 2A:
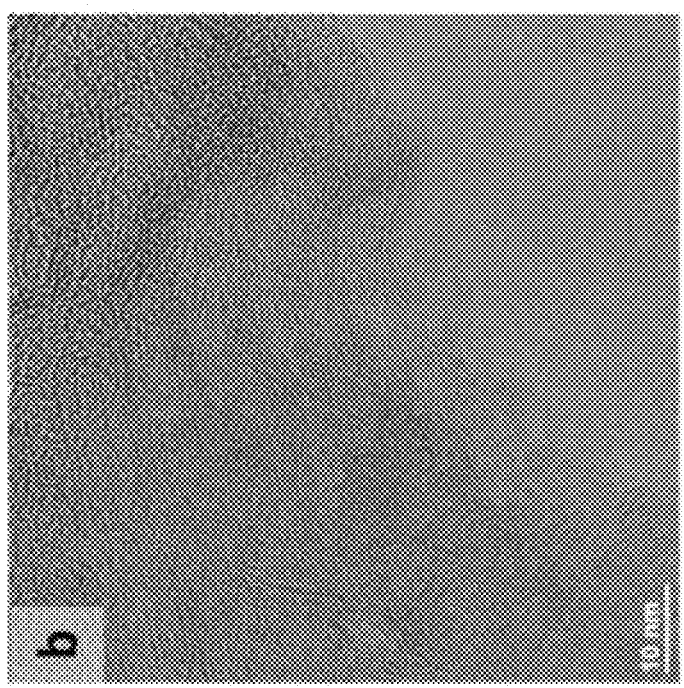
FIGS. 2A-2B are TEM images of a laser-scribed coconut shell (single lase).
Figure 2B:
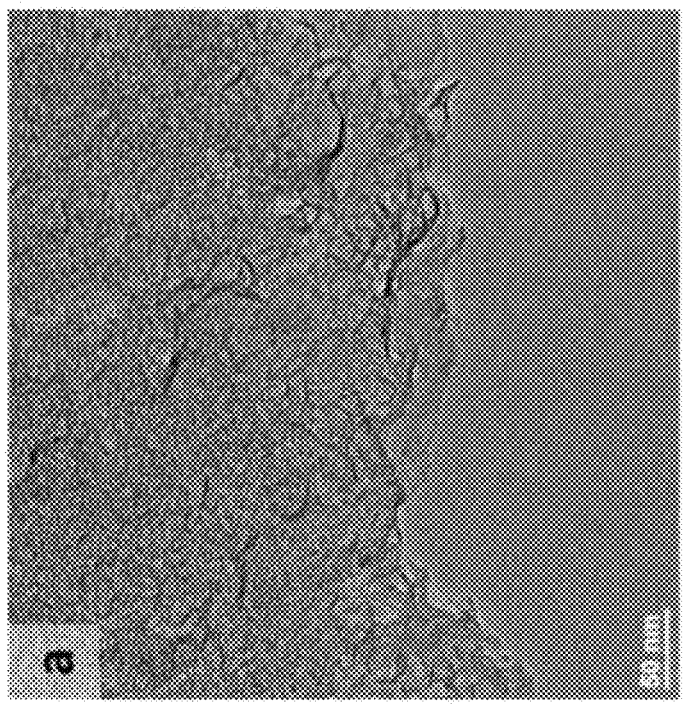

The coconut shell was exposed to a 75 W laser with power setting ranging from 5-10% power. It was found that a single exposure of the coconut shell using 5% power resulted in the formation of amorphous carbon. See FIGS. 2A-2B. Repeated lasing of the same portion of the substrate (up to 5×) resulted the graphene observed in FIG. 1D. Similar results were obtained for cork and potato skins (FIGS. 1E-1F, respectively) as determined by Raman microscopy.

Figure 3:
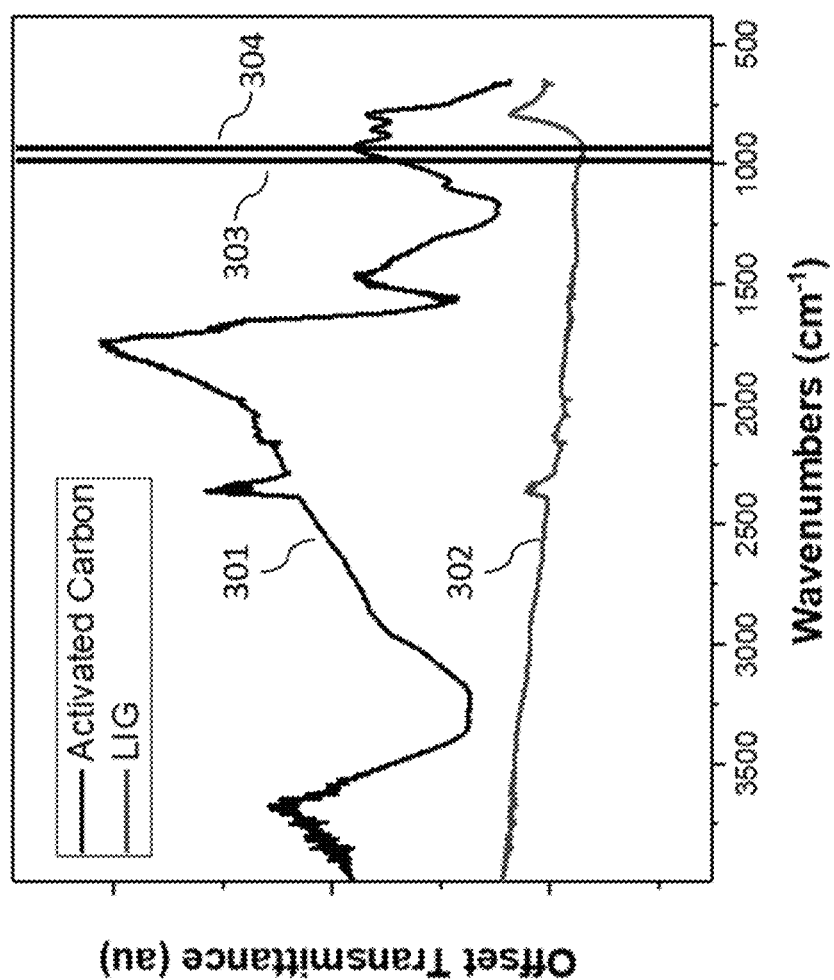
FIG. 3 is an IR spectrum of amorphous carbon and laser-induced graphene derived from cork.

This reflects that in some cases the mechanism of LIG formation involved the conversion of a carbon precursor first to amorphous carbon followed by a conversion to graphene upon subsequent lasing. FIG. 3 is an IR spectrum of amorphous carbon (curve 301) and laser-induced graphene (curve 302) derived from cork. The locations of the 10.6 µm and 9.3 µm bands of a $CO_2$ laser are denoted by the vertical line 303 and 304, respectively. As depicted in FIG. 3, amorphous carbon absorbs strongly in a range from ~500-1500 $cm^{-1}$. Amorphous carbon can be considered a heterogenous material consisting of $sp^2$ carbon clusters that are embedded within a $sp^3$ matrix [Ferrari 2003]. $CO_2$ lasers output a band centered at 10.6 µm but ranges between 927-951 $cm^{-1}$ [Patal 1964]. These frequencies are absorbed by the C—C and C—H bonds present in the precursor substrate materials that are not present in LIG. See FIG. 3.

As such, it is likely that the substrate is first photothermally converted to amorphous carbon. Subsequent exposures of the amorphous carbon then effect the transformation of the amorphous carbon to graphene. This selective breaking of non-aromatic bonds is potentially one reason why mere thermal treatments or irradiation with other wavelengths upon carbon only resulted in amorphous carbon. For example, lasing of polyimide film with an ultraviolet laser (275-363 nm) was previously reported to only result in amorphous or glassy carbon despite repeated lasing (up to 35 times) [Srinivasan 1995; Srinivasan 1994]. Clearly, the wavelength of the laser irradiation matters for obtaining graphene by multiple lasing. More recently, polyimide was ablated with a 308 XeCl excimer laser and the carbon material was characterized after 200-800 pulses but no graphene-based 2D Raman peaks were detected [Raimondi 2000]. By contrast, only 3-5 passes of a rastered $CO_2$ laser yields porous graphene from a wide variety of substrates. As such, both the wavelength of the laser irradiation as well as the number of exposures is important to the formation of LIG.

To further confirm, activated carbon was irradiated with multiple exposures to a pulsed 75 W 10.6 µm laser at 5% power at a 15 cm/s scan rate. Both TEM and Raman characterization show that amorphous carbon powder can be converted to LIG by multiple lasing. See FIGS. 4A-4C. This result demonstrates that the multiple lasing process for making graphene is generally applicable to any material that can be first converted to a layer of amorphous carbon. As such, multiple lasing can be used to directly obtain graphene from many substrates in a one-step process by laser irradiation but can also be applied to thermally and chemically carbonized materials. Moreover, inexpensive carbon sources, such as activated carbon, can now be used in the preparation of graphene which may have implications in commercial applications for LIG.

Two methods were used to obtain multiple lases of a substrate. The first method involved multiple passes of the rastered laser. At 5% power of the 75 W laser, the spot size of the laser was ~175 µm in diameter. Given that the samples were lased using the 1000 dots per inch (DPI, a setting on commercial laser systems; 1 inch is 2.54 cm) raster density, multiple exposures occurred naturally with the overlap of the laser spots. For a 175 µm diameter spot size, each location at which the substrate was exposed has ~37 overlapping laser spots. Multiple passes of the laser would result in an additional 37 lases per pass.

Figure 5A:
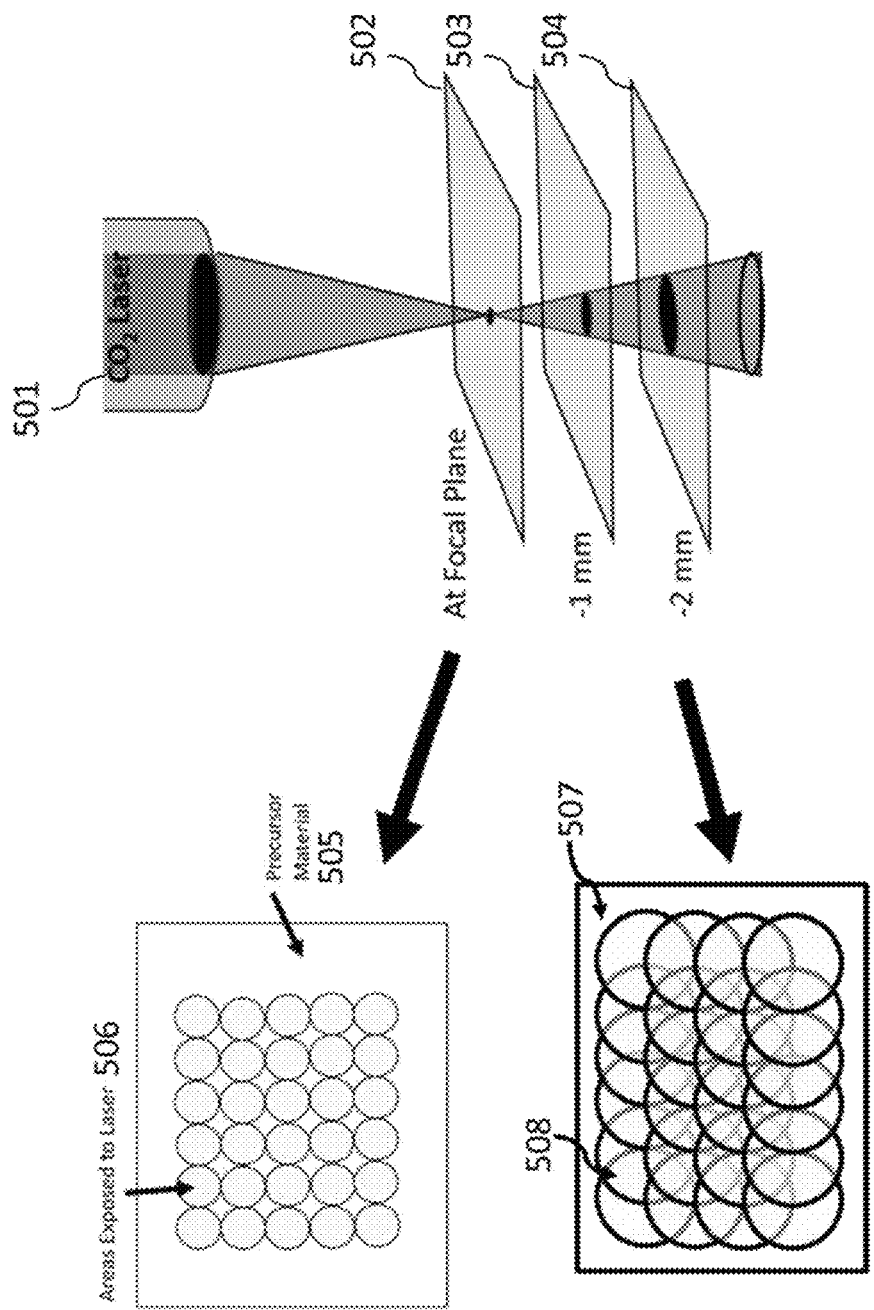
FIGS. 5A-5B relate to spot size vs defocus.
Figure 5B:
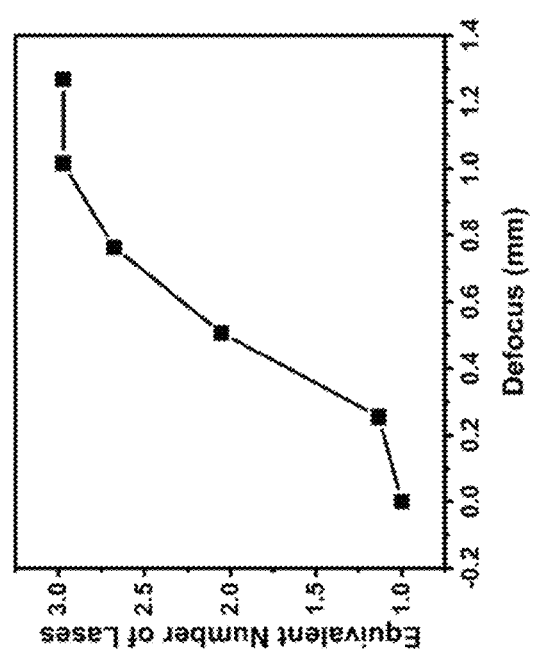

A second method for obtaining additional exposures was developed involving increasing the spot size of the laser while keeping the density of the dots consistent (1000 DPI). Referring to FIG. 5A, this was achieved by defocusing the laser 501 to take advantage of the fact that the shape of the focused laser beam is conical. By altering the z-axis distance from the focal plane 502 (such as planes 503 and 504 at −1 mm and −2 mm, respectively, different spot sizes can be obtained. For precursor material 505, located at the focal place 502, the areas exposed to the laser are shown in the circles 506. For precursor material 507, located at the focal place 504, the areas exposed to the laser are shown in the circles 508. For instance, lowering the substrate by ~1.02 mm results in the increase of the spot size from 175 μm to 300 μm in diameter. This results in effectively 3 times more lases in any given location of the substrate being lased since the area of each spot increases but the density of laser spots remains constant. FIG. 5B is a graph that shows the effective number of lases as a function of the z-axis defocus. The advantage of this method is the increase in processing speed as each spot can be lased many additional times in each pass of the laser. A combination of defocus and multiple laser passes can be used to lase a material the desired number of times.

Figure 6B:
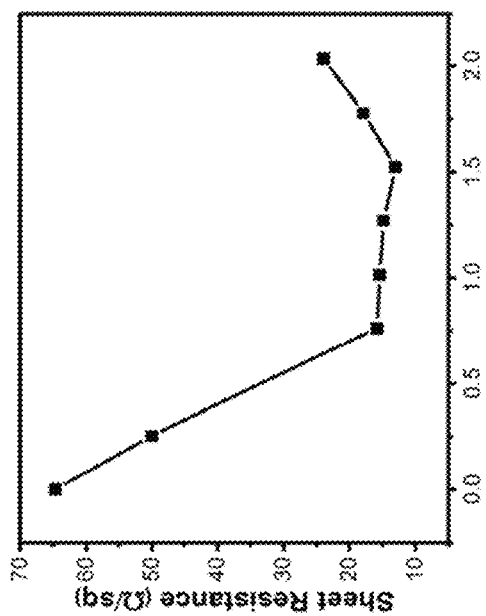
FIGS. 6A-6D related to PEI sheet resistance and Raman spectra as a function of defocus.
Figure 6D:
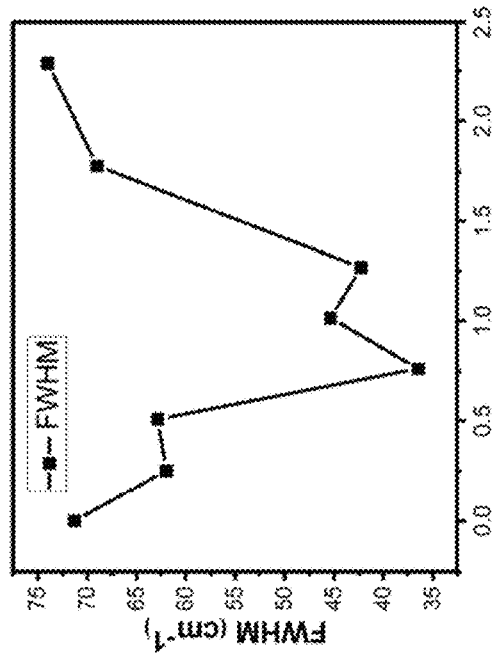
Figure 6A:
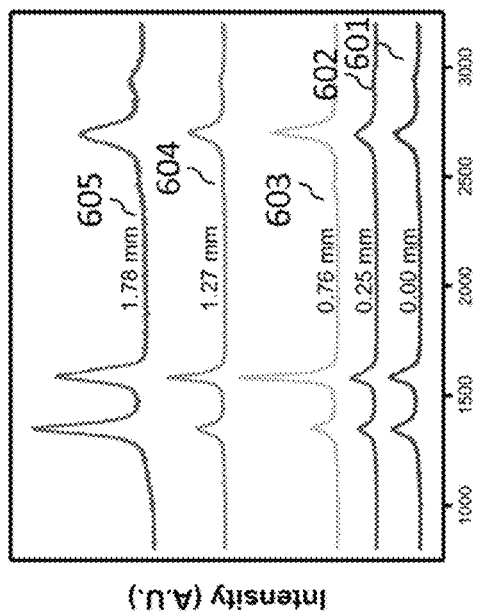
Figure 6C:
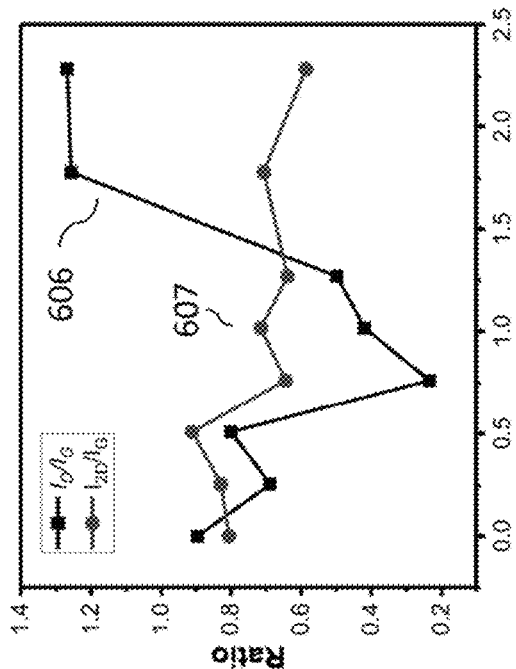

This technique was applied to ULTEM polyetherimide (PEI) which had previously been found to perform much more poorly than PI as an LIG precursor substrate [Lin 2014]. The PEI was lased at various defocus ranging from 0 (at focal plane) to ~2 mm defocus at 5% power and a scan rate of 30 cm/s. Even with no defocus, Raman spectroscopy in FIG. 6A showed the presence of graphitic carbon with a broad D peak observed at ~1350 cm$^{-1}$ and a 2D peak near 2700 cm$^{-1}$. Using a defocus of ~0.75-1.25 mm, significant improvements in the $I_D/I_G$ ratios were observed in FIG. 6C. As shown previously, a ~0.75 mm defocus is equivalent to lasing the substrate ~2.7 times. Moreover, as shown in FIG. 6D, the full-width-at-half-maximum (FWHM) of the G peak is narrowest at the same defocus. Consistent with these indications of better quality graphene, the LIG showed the lowest sheet resistance (~15 ohms/sq) at ~0.75 mm defocus as determined by 4-point probe measurements. To confirm, PEI was also lased without defocusing (1% power and 30 cm/s scan rate) up to four times. The sheet resistance was found to be lowest after 3 lases. By contrast, even though the overall fluence is higher, lasing a single time at 5% power and the same speed yields LIG with a worse $I_D/I_G$ ratio compared with multiple lased LIG. The sheet resistance was also higher at ~65 ohm/sq, which is substantially worse than the multiple lased materials whether by multiple raster or by defocusing the beam. This showed that the improvement in the quality of the graphene arises from application of multiple lases rather than just total fluence of laser energy to the substrate.

Having developed a method for improving the quality of the LIG by multiple lasing, this method was tested on numerous substrates that previously did not yield laser-induced graphene when lased at the focal plane. Using a combination of the multiple raster and defocus methods of multiple lasing, it was found that a wide range of polymers could be converted to LIG, as reflected in TABLE 1 (with $T_g$ and $T_m$ are the glass transition temperature and melting temperature, respectively).

TABLE 1

| | $T_g/T_m$ (° C.) | Trade Name |
|---|---|---|
| High-Temperature Thermoplastics | | |
| Poly(m-phenylenediamine) isopthalamide | 225/380 | Nomex |
| Polyimide (PI) | 280 | Kapton |
| Polyamide Imide (PAI) | 277 | Torlon |
| Polyether Imide (PEI) | 215 | Ultem |
| Polyphenylene Sulfone (PPSU) | 225 | Radel PPSU |
| Poly-parapheylene terphthalamide | | Kevlar |
| Polybenzimidazole (PBI) | 427 | |
| Polyether Ether Ketone (PEEK) | 143/334 | |
| Polyphenylene Sulfide (PPS) | 85/285 | |
| Chlorinated polyvinyl chloride (CPVC) | | |
| Thermoset Materials | | |
| Polystyrene (crosslinked) | 114/640 | Rexolite |
| Epoxy | Varies (up to 350) | |
| Phenolic Resin | 300/570 | Bakelite |
| Natural Polymer Materials | | |
| Lignin | Varies | |
| Cellulose (phosphate treated) | 300-350 | |
| Non-Polymeric Materials | | |
| Activated Carbon | | |
| Charcoal | | |
| Anthracite Coal | | |

High temperature polymers with higher melting points and crosslinked thermoset plastics tended to perform better for direct laser conversion into LIG. TABLE 1 shows a list of polymers that can be directly converted to LIG by lasing in air. These obtained LIG materials showed the characteristic 2D peak in their respective Raman spectra. Laser irradiation under $N_2$ atmosphere was performed in a sealed chamber with a ZnSe window.

Since applicants now have discovered that the mechanism of LIG formation does not require a one-step conversion of a precursor into LIG, it allows for the development of additional methods of obtaining LIG. In fact, the multiple lase technique is applicable to any carbon precursor that can be converted to amorphous carbon. For example, LIG was obtained by a 1 mm defocused exposure of a piece of bread that was first carbonized in a toaster oven.

Figure 7A:
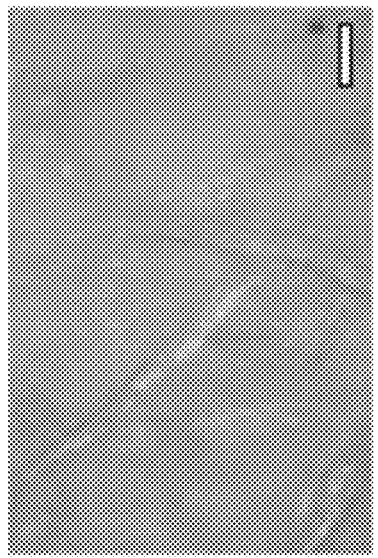
FIG. 7A is an optical image of Whatman filter paper at 20× magnification. Scale bar is 50 µm.
Figure 7B:
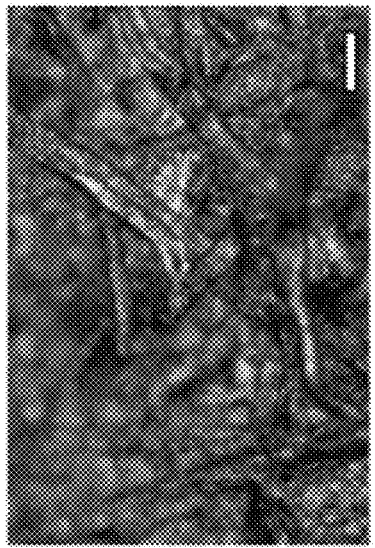
FIG. 7B is an optical image of charred Whatman filter paper at 50× magnification. Scale bar is 50 µm.
Figure 7C:
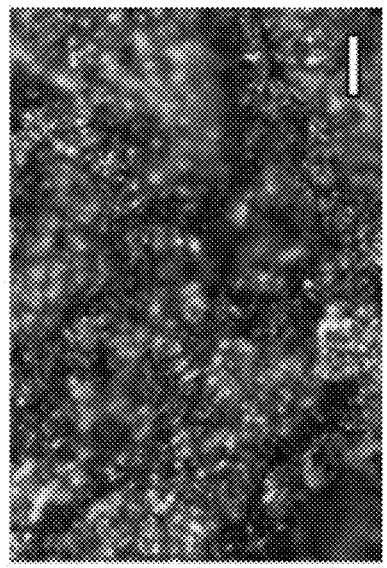
FIG. 7C is an optical image of LIG from lased Whatman filter paper at 50× magnification. Scale bar is 50 µm.
Figure 8A:
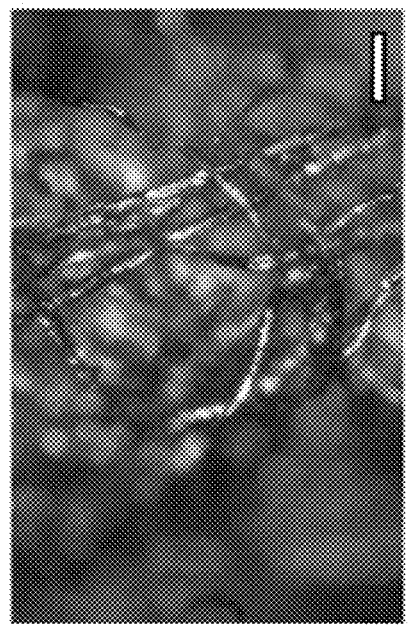
FIGS. 8A-8D are optical images of other cellulose containing materials (canvas, denim, jute (burlap), and muslin cloth respectively) that were treated with phosphate catalysts and then lased to form LIG. Scale bar is 200 µm.
Figure 8B:
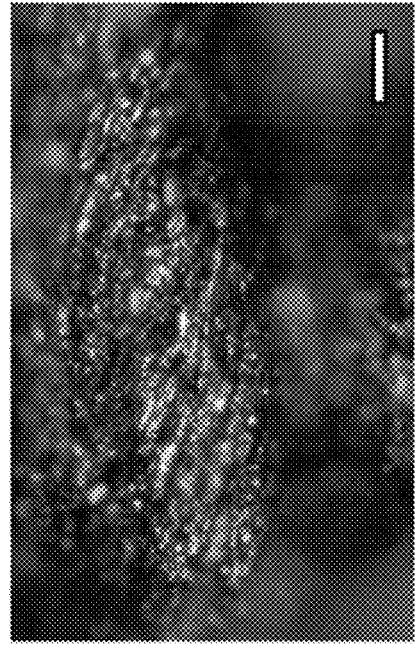
Figure 8C:
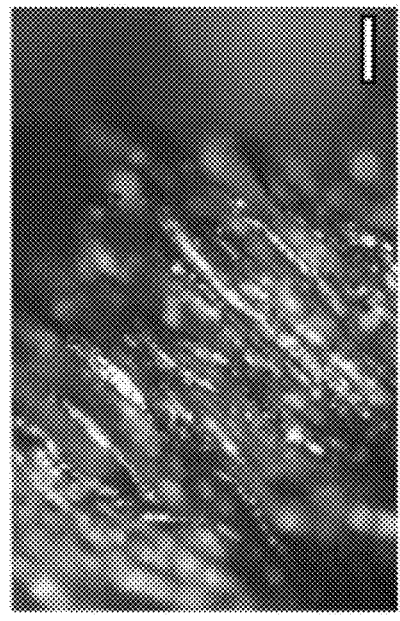
Figure 8D:
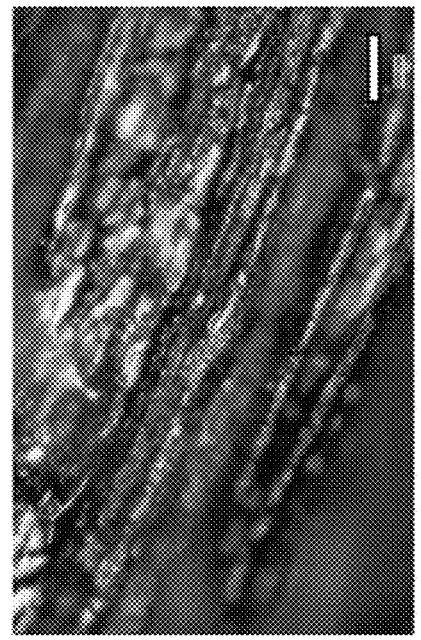

This technique was applied to materials that were predominantly cellulose that previously could not be converted directly to laser-induced graphene either in ambient air or in a $N_2$ atmosphere. Carbohydrates, such as cellulose and starch, decompose into levoglucosan which then further decomposes into volatile compounds [Kandola 1996]. Fortunately, methods for increasing the char yield of cotton-based materials have previously been thoroughly investigated. [Id.] Whatman filter paper, cloth, and other cellulose-based materials were then treated with a commercial organic phosphate salt containing fire retardant or ammonium polyphosphate. The materials were then exposed to a propane torch to char the surface of the material and to obtain amorphous carbon. Exposure to the 10.6 μm laser then converted amorphous carbon to LIG. FIGS. 7A-7C. show optical images of the filter paper before charring over an open flame, after charring, and after lasing, respectively. Raman showed that charred filter paper consisted of amorphous carbon but a single lase with the $CO_2$ laser was sufficient to convert the material to LIG. XPS showed that the elemental composition of the LIG changes with subsequent multiple lasing. Charred filter paper started out at ~55% carbon and 35% oxygen with <5% of phosphorus and nitrogen. Subsequent lasing caused the carbon content of the LIG to increase to nearly 80%.

It was subsequently found that directly lasing of cellulose containing materials such as cloth, cotton paper, and filter paper could be achieved without thermally charring the material in advance albeit with lower quality graphene as determined by conductivity measurements and the Raman spectra of the obtained LIG. See FIGS. 8A-8D. With this method, any material that can be converted to amorphous carbon can further treated by $CO_2$ laser to obtain graphene. This enables a general method of obtaining LIG from carbon precursors.

The lignocellulosic structure of wood with high lignin content could be converted into LIG by irradiation under inert or reducing atmosphere. The need for a carefully controlled atmosphere is obviated using fire-retardant treatment to promote the formation of carbon char by catalyzing the dehydration during lasing. Commercially produced fire retardant-treated plywood (D-Blaze) was lased in ambient atmosphere and LIG was obtained. Ablation was observed when the wood was exposed to 10% speed 5% power laser irradiation at the focal point but extremely conductive LIG (~8 Ω/sq) was obtained when the defocus was increased to ~1 mm. In addition to cellulose, other polysaccharides can be converted to LIG if first treated with fire retardants. For example, bread was treated with commercial "Fire Guard" phosphate based fire retardant was allowed to dry in air. Subsequent lasing converted the surface of the bread into a conductive surface consisting of LIG. See FIGS. 9A-9D. Direct conversion of wood and wood products, such as paper to graphene, in ambient atmosphere will likely have significant commercial implications since conductive patterns can be produced without requiring vacuum chamber. Indeed, the multiple lase method allows for the either the direct conversion of polymeric carbon precursors to LIG or even any material that can be first converted to amorphous carbon.

In short, multiple lasing allows almost any carbon precursor that does not ablate when exposed to a $CO_2$ laser to be converted into LIG. High-temperature engineering plastics such as Kapton, Kevlar, polysulfones, polyetherimide, polyphenylene sulfide, among others are readily converted into LIG. Cross-linked polymers such as phenolic resin and crosslinked polystyrene are also suitable substrates for LIG formation. While lignin is the only natural polymer that can be converted to directly LIG, polysaccharides such as cellulose and starch can be readily activated for conversion to LIG with the application of boric acid or phosphate-based fire retardants. See FIGS. 9A-9D. The ease of obtaining a porous graphene surface on biodegradable substrates such as wood, paper, coconuts, potatoes, cardboard, and cloth as well as the excellent conductivity (<5 ohms/sq sheet resistance) will potentially allow for many electronic applications such as supercapacitors, wiring, batteries, transistors, RFID antennae, sensors and other applications.

Utility and Variations

A general method of converting carbon precursor materials into graphene could be exceptionally useful given the properties of graphene. Being able to pattern conductive layers of LIG on a variety of materials would potentially allow for applications such as supercapacitors, water splitting catalysts, sensors, flexible electronics, and other applications. Conductive graphene traces on cotton clothing for example could potentially be useful for wearable electronics. The same LIG on cotton cloth might be useful for water purification applications. Additional potential applications of laser-induced graphene can be found in the Tour '821 Application.

As compared with the previous methods, this method of forming LIG is particularly useful because it enables the use of natural, abundant, and renewable sources of carbon, such as wood, paper, cloth, and any other material to form LIG. Non-polymeric sources of carbon can also be used with this method, which was not the case for the previously reported methods. For example, sugars can be charred into a layer of amorphous carbon and then converted into LIG by multiple lases. Or, for example, activated charcoal or biochar can be converted to conductive LIG.

The improved method of generating laser-induced graphene can thus be applied generally and not only to certain expensive high temperature aromatic plastics.

Specifically, the prior art only described the tuning of laser parameters to match a polymer substrate. By contrast, the methods of the present invention involve multiple lases of a precursor to obtain laser-induced graphene. The prior art limited the claim of LIG to materials derived from the lasing of a polymer precursor. By contrast, most materials that can form a layer of carbon on the surface can be converted into laser-induced graphene by the method described. The initial conversion of the surface of the material into a layer of carbon need not be by laser exposure but can be performed by thermal (burning with a flame) or chemical methods.

Many materials tend to vaporize and ablate away when exposed to high energy lasers. This ablation means that the carbon contained in the precursor would be lost without the opportunity for it to rearrange into graphene. Additionally, oxygen (if present) may oxidize the material resulting in the precursor burning away rather than yielding an appreciable yield of the laser-induced graphene. Methods of addressing this for certain carbon-containing precursors include the following:

Control over Reaction Atmosphere—Inert or reducing atmospheres combined with variation of gas pressures can reduce oxidation and vaporization of precursor materials. See R. Ye et al. "Laser-Induced Graphene Formation on Wood", *Adv. Mater.* 2017, 29(37), 1702211 and supporting information, which are hereby incorporated by reference in their entirety for all purposes.

Carbon precursors for LIG can be inserted into a closed chamber with a window that is transparent to laser irradiation of the selected wavelength. For example, ZnSe can be used as a transparent window material with a 9.3 or 10.6 µm laser. The chamber can then be placed under vacuum, purged, and filled with an inert gas such as Ar or $N_2$ after which the material is exposed to laser irradiation. Alternatively a reducing atmosphere such as $H_2$ can also be used.

Pre-carbonization—Converting the surface of a precursor material into amorphous or graphitic carbons by thermal or chemical means. For example wood can be converted to charcoal in a flame which does not vaporize as readily when exposed to laser irradiation.

Char Promoting Catalysts—Catalysts can be applied to some materials to promote the formation of amorphous or graphitic carbons on the surface of some materials that would otherwise tend to vaporize.

Thus, with the methods of the present invention, carbon precursors other than the previously reported polyimide (PI) and polyetherimide (PEI) can be converted into laser-induced graphene materials, such as various aromatic polymers, lignin-containing materials, cellulose-based materials, and non-polymeric sources of carbon.

Some of the aromatic polymers that have been converted to laser-induced graphene by this method include polymers such as polyphenylene sulfide, polyamide-imide, polybenzimidazole, phenol-formaldehyde resin, poly(ether ether ketone) (PEEK), poly(ether sulfone), poly(m-pheylenediamine) isopthalamide, crosslinked polystyrene, epoxy, and poly(ether-imide). Lignin-containing materials include wood, coconut shells, potato skins, and burlap (jute fibers). Cellulose-based materials to promote LIG formation include cotton cloth, paper, cardboard (including those that are catalyst treated). Non-polymeric sources of carbon include amorphous carbon, charcoal, biochar, activated carbon, coal, asphalt, coke, and Gilsonite. Each of these can be employed to obtain LIG using the method of the present invention.

Previously, studies showed that only polymers containing aromatic and imide structures were reliably converted to porous graphene by laser scribing. The present invention is a laser scribing method for the production of graphene that can be generally applied to most carbon precursors. The method of the present invention also applies to non-polymeric materials, such as amorphous carbons, biochar, activated carbon, activated charcoal, coal and most other carbon sources.

Typically, in order to use a cellulose-based materials in the present invention, such as paper, it is advantageous to pre-treat such materials with a flame retardant. For example, a phosphate-based or borate-based flame retardant can be utilized. Alternative, the surface of the celluylose-based material, such as paper, can be charred beforehand.

Metal Solutions. It has further been shown that one or more metal salt solutions, metal oxide solutions, or metal nanoparticle solutions can be added to the laser-induced graphene and then lased again. In this way, the metal nanoparticles or the metal salts (after reduction by the lasing process) or metal oxides (with or without subsequent reduction) form metal nanoparticles or metal carbide nanoparticles or metal oxide nanoparticles that are dispersed in the laser-induced graphene. These LIG-dispersed nanoparticles can act as catalysts for reactions, and more specifically organic oxidation or reduction transformations, or electrocatalytic transformations such as hydrogen evolution reactions (HER), oxygen evolution reactions (OER), hydrogen oxidation reactions (HOR) and oxygen reduction reactions (ORR). HER and OER are important for water splitting to make hydrogen gas and oxygen, and HOR and ORR are important for fuel cell chemistry.

Metal nanoparticles and metal salts or metal oxides that can be used include Co, Ni, Pt, Pd, Fe, Ru, and more generally transition metals or combinations thereof, or mixtures of transition metals and main group elements such as chalcogenides or phosphides, the metal phosphides, such as cobalt phosphides or nickel phosphides being particularly active as electrocatalysts.

Roll-to-Roll process. Furthermore, the material can be used in the form of a roll so that a roll-to-roll process can be employed. Generally paper is the least expensive material that can be utilized in roll form. Other materials that can be utilized in roll form inclulde cardboard and polymer films.

Dopants. Variations further include modifications, such as the addition of dopants, that can be used to improve the performance of the laser-induced graphene for additional applications. Heteroatoms such as boron and phosphorous can be introduced by addition of compounds containing those elements to the carbon precursor. Metals, metal oxides, metal chalcogenides, metal nanoparticles, salts, organic additives, and inorganic additives can all be added to modify the properties of the obtained graphene such that the graphene is suitable for various electronic and catalytic applications.

Fabrication of Laser-Induced Graphene in Controlled Atmospheres

The present invention further includes a method to fabricate LIG structures under controlled gas atmospheres, where superhydrophilic, highly hydrophilic, highly hydrophobic, and superhydrophobic LIG are obtained by changing the gas environment. A material is "superhydrophilic" when the water contact angle of the material is less than or equal to 1°, and a material is "highly hydrophilic" when the water contact angle is between 1° and 10°. A material is "superhydrophobic" when the water contact angle of the material is more than or equal to 150°, and a material is "highly hydrophobic" when the water contact angle is between 135° and 150°.

In some embodiments, a controlled atmosphere chamber (that was home-made) allowed gas to controllably flow through the chamber, while a ZnSe window on top of the chamber permitted the $CO_2$ laser beam to irradiate the PI film that resided within the chamber. The gases studied include $O_2$, air, Ar, $H_2$, and $SF_6$. LIG structures with different properties were obtained. This change in gas atmosphere permits an enormous change in the water contact angle on the as-prepared LIG, from 0° (superhydrophilic) when using $O_2$ or air, to >150° (superhydrophobic) when using Ar or $H_2$. F-doping of the LIG was also demonstrated under a $SF_6$ gas atmosphere, where an even higher contact angle (>160°) could be reached due to the low surface free energy of the C—F bonds. Scanning electron microscopy (SEM), X-ray photoelectron spectroscopy (XPS), and Raman spectroscopy showed that the different wetting properties are due to the LIG surface morphology and the edge and surface chemistry of these LIG structures. While superhydrophobicity can be introduced with Ar, $H_2$, or $SF_6$ in the controlled atmosphere chamber, LIG samples fabricated under $O_2$ flow show an increased number of defects that produce a significantly improved specific capacitance (compared to LIG made in air) when the LIG was used as the electrode material for microsupercapacitors, showing the versatility of the controlled atmosphere chamber fabrication method.

Figure 10A:
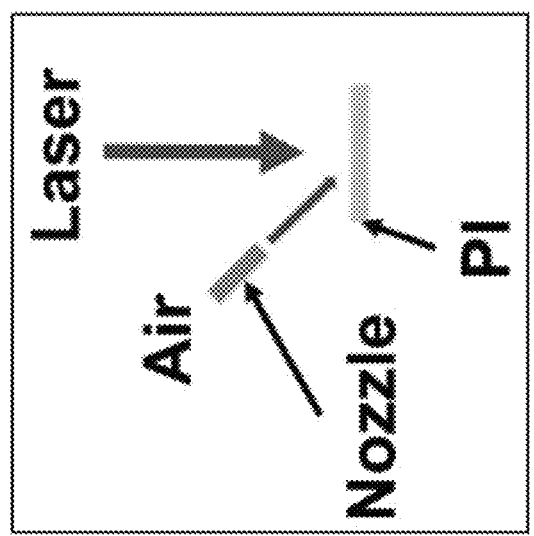
FIG. 10A is a scheme for the fabrication of LIG with gas assist where a stream of air or Hz/Ar is blown across the surface of the PI without a controlled atmosphere chamber.
Figure 10B:
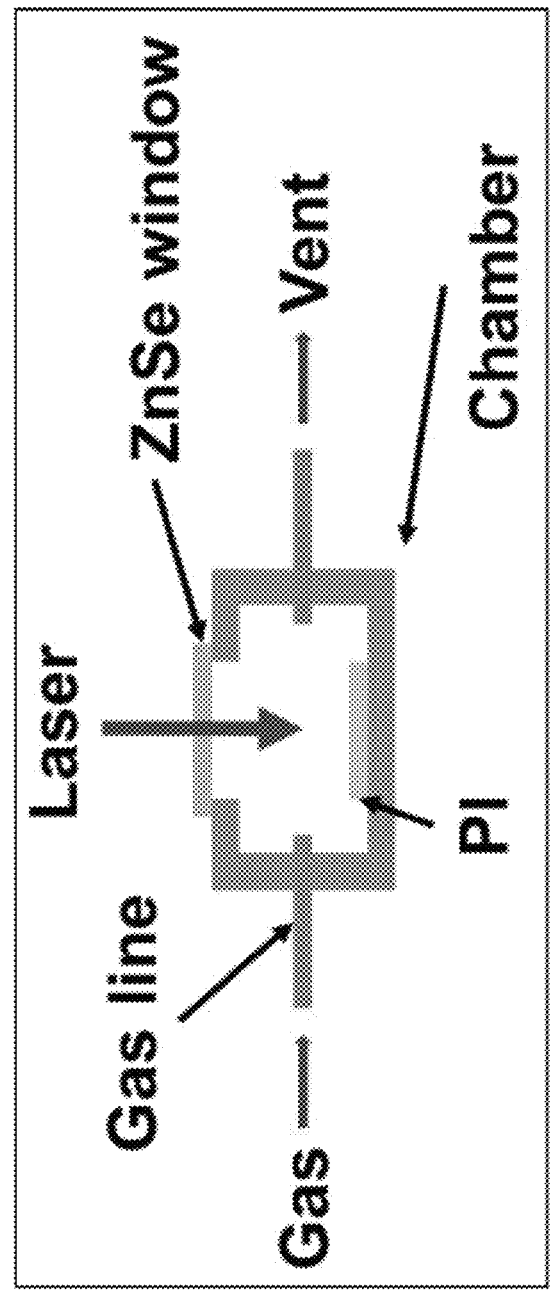
FIGS. 10B-10C are schemes for the fabrication of LIG inside a controlled atmosphere chamber.
Figure 10C:
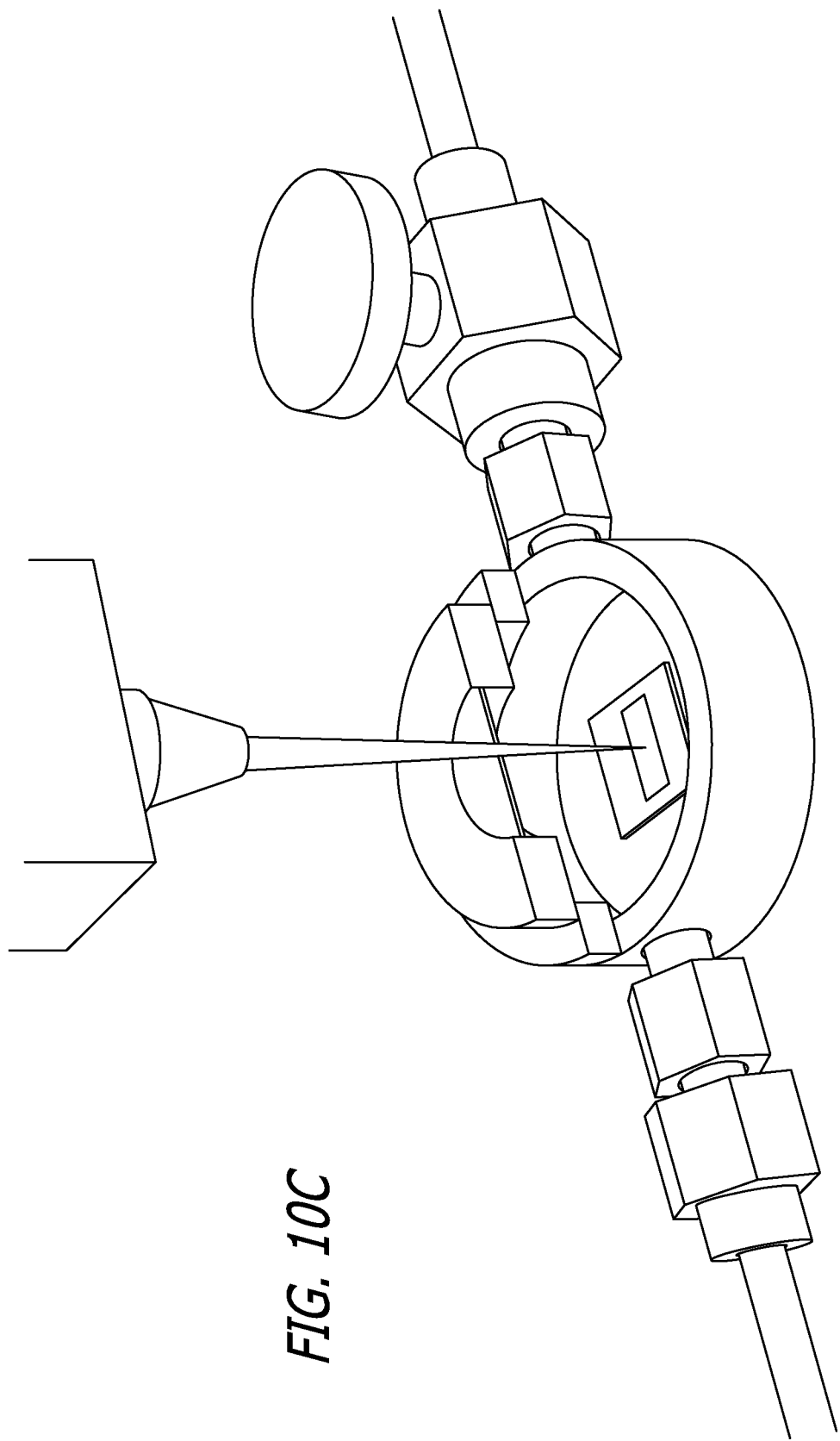
Figure 10D:
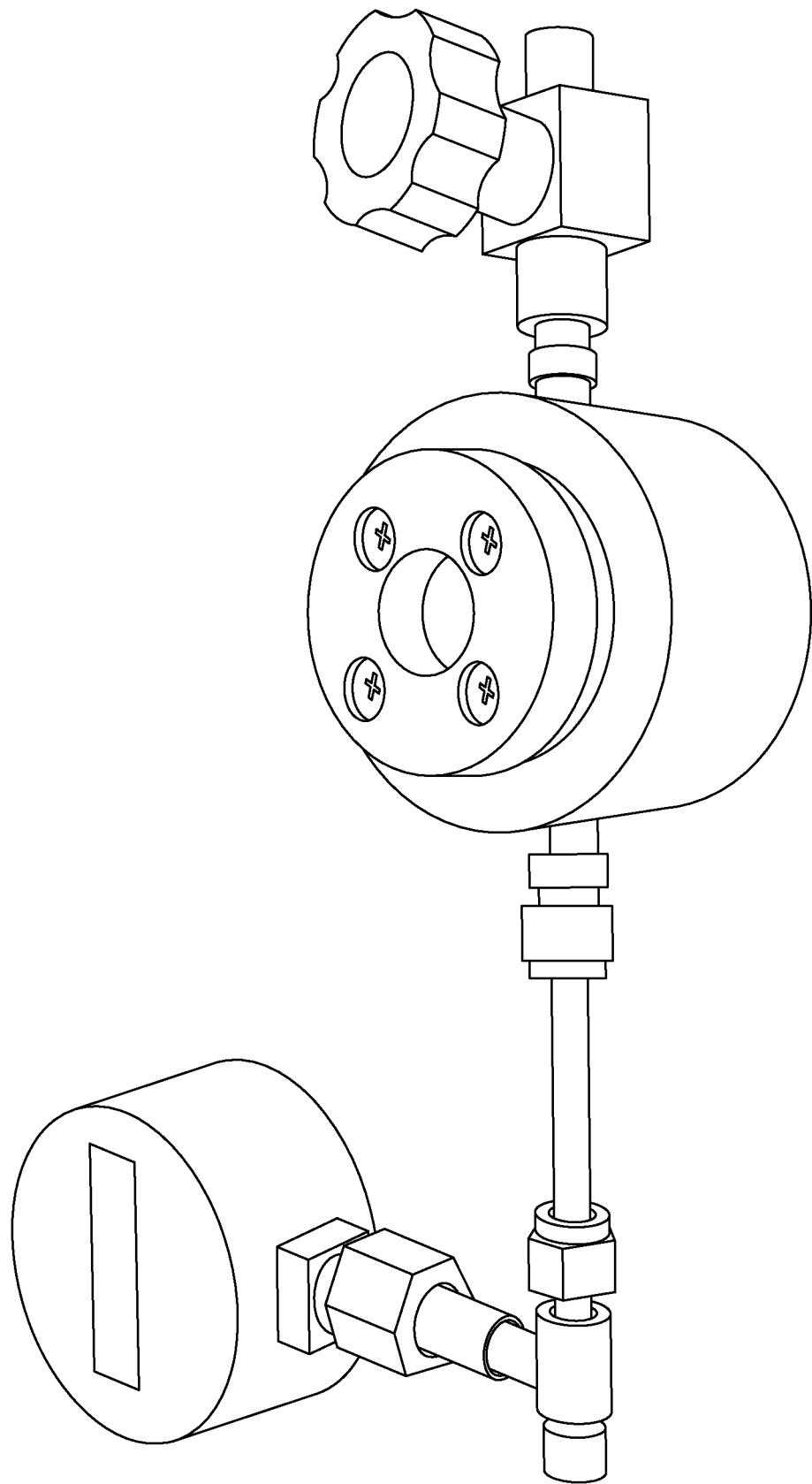
FIG. 10D is an actual photo of a home-built controlled atmosphere chamber used in embodiments of the present invention. The schematic design is shown in FIGS. 15A-15B.

The schemes for the fabrication of LIG structures under controlled gas atmosphere are shown in FIGS. 10A-10C. Generally, a 10.6 μm $CO_2$ laser is used to directly convert PI into LIG structures with different gas atmosphere control methods. For the gas assist method (FIG. 10A), a nozzle is used to blow the selected gas directly at the laser spot, while the sample is still surrounded by air. In this case, only non-flammable gases (or gas mixtures below their explosion limit) were used due to safety concerns, but it is not essential as long as air or oxygen is not present. For instance, inventors of the present invention selected air and 3% $H_2$ in Ar to explore both oxidizing and reducing or inert gas assist. For the controlled atmosphere chamber method (FIGS. 10B-10D), different gases have been introduced through the gas line; this fabrication process mimics the traditional CVD process for graphene growth and modification [Mattevi 2011], but replaces the extended high-temperature heating with laser irradiation. Due to the isolation from air, a larger range of gas environments were tested with the controlled atmosphere chamber method, including $O_2$, air, Ar, and $H_2$, and a significant change in LIG properties was observed in terms of hydrophilicity and hydrophobicity. Details for the fabrication of LIG samples under different gas atmospheres are discussed below.

FIGS. 10E-10J show the SEM images and contact angle measurements for LIG samples prepared under various atmospheres. For samples prepared with air assist, 3% $H_2$/Ar assist, and air in the chamber, the LIG structures share a similar porous morphology with a mixture of sheet-like and strip-like components [Lin 2014]; this similarity could come from the fact that even though 3% $H_2$/Ar assist was blown at the laser spot, the overall environment still contains much air. For LIG with $O_2$ in the chamber, however, much rougher edges were observed, presumably resulting from the excess oxidation of the graphene structure. Rough edges were also observed from LIG with $H_2$ in the chamber to create a hierarchical nano-structure, as the irregular defects on graphene structures were protected from oxygen capping by the reducing environment. From the lower magnification SEM images (FIGS. 16A-16L), much more significant macroporous structures can be observed for LIG samples prepared with air assist and $O_2$ in the chamber, presumably caused by the strong oxidizing environment.

Figures 17A, 17B:
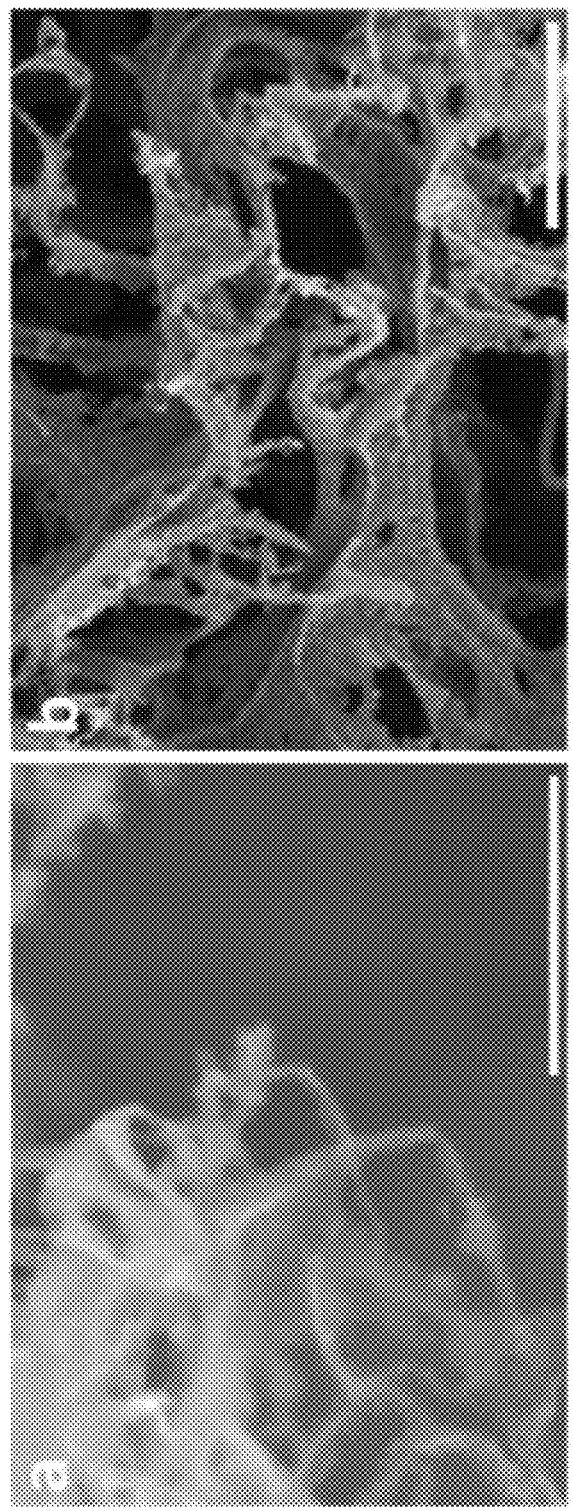
FIGS. 17A-17B are high resolution SEM images of (FIG. 17A) LIG with $H_2$ (chamber) and (FIG. 17B) LIG with $O_2$ (chamber). Scale bars: 500 nm.
Figure 18A:
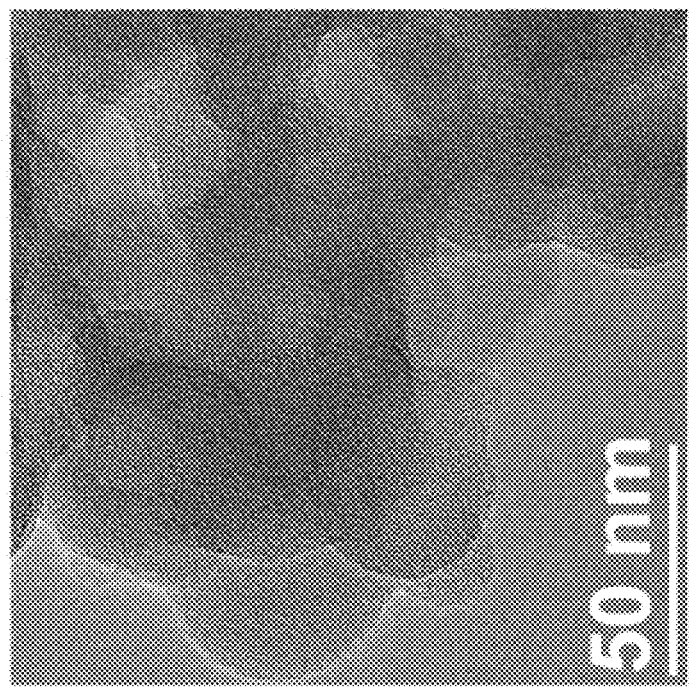
FIGS. 18A-18B are TEM images of (FIG. 18A) aggregated carbon nanoparticles and (FIG. 18B) aggregated carbon nanoparticles on the surface of LIG.
Figure 18B:
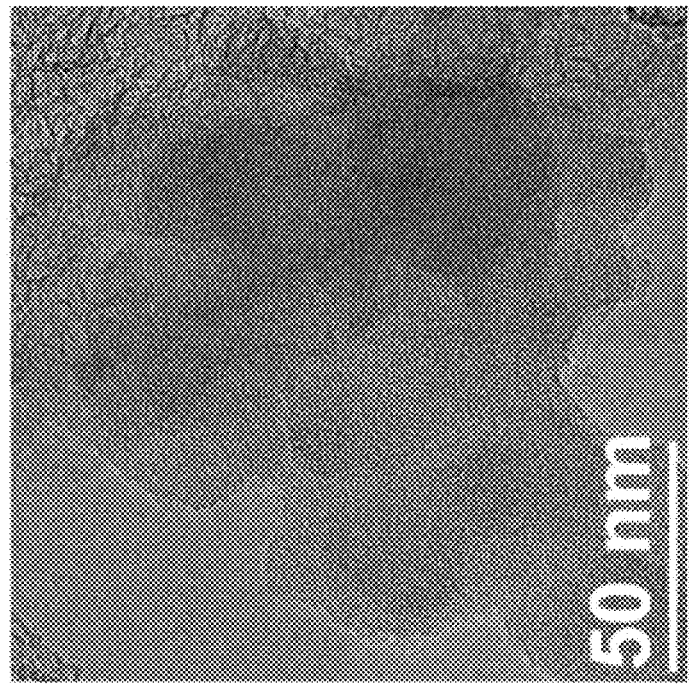
Figure 19C:
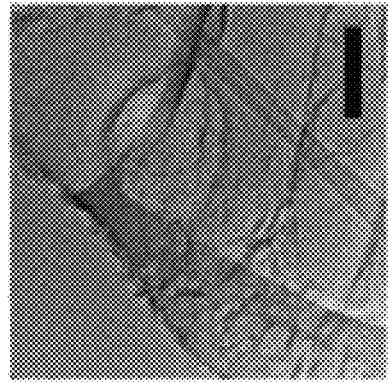
Figure 19F:
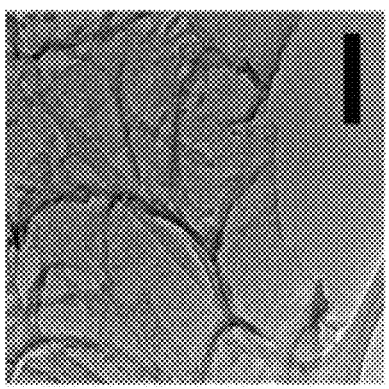
Figure 19B:
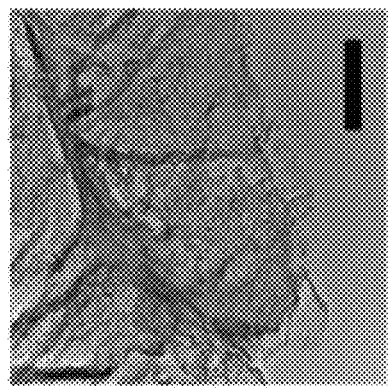
Figure 19E:
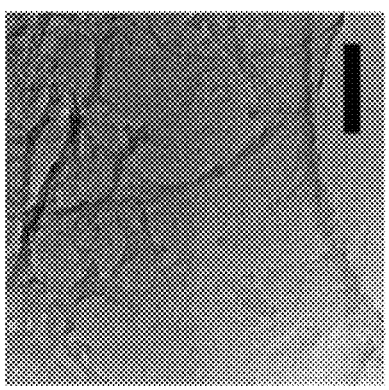
Figure 19A:
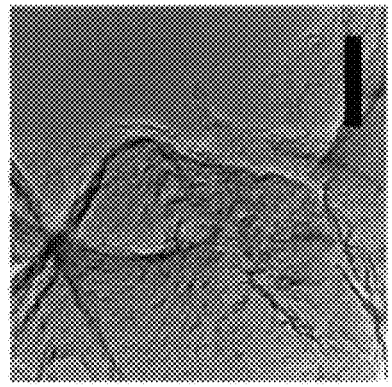
Figure 19D:
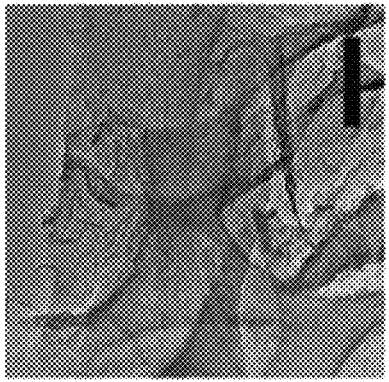

The higher-resolution SEM images show the rough edges for both samples (FIGS. 17A-17B). The degree of defects was analyzed by Raman spectroscopy (vide infra). For LIG prepared with Ar in the chamber, aggregated carbon nanoparticles were also observed on the surface of the LIG flakes, especially from the additional TEM images shown in FIGS. 18A-18B. These aggregated carbon nanoparticles are probably the product of the carbonization of the PI under the inert atmosphere, forming an enhanced hierarchical microstructure for the LIG sample made with Ar in the chamber. Although certain morphology differences have been observed under SEM for LIG samples prepared under the different atmospheres, there are common features such as the similar LIG thickness of ~40 μm (FIGS. 16A-16L) and the randomly distributed graphene edges which were observed under TEM (FIGS. 19A-19L). [Lin 2014].

The inset images in FIGS. 10E-10J show the water contact angles for LIG samples prepared under different gas atmospheres. Superhydrophobic (contact angle >150°) surfaces were obtained from reducing or inert environments, namely Ar in the chamber (152°) or $H_2$ in the chamber (157°), while all other samples prepared with the presence of $O_2$ show superhydrophilicity (~0°).

Figure 20B:
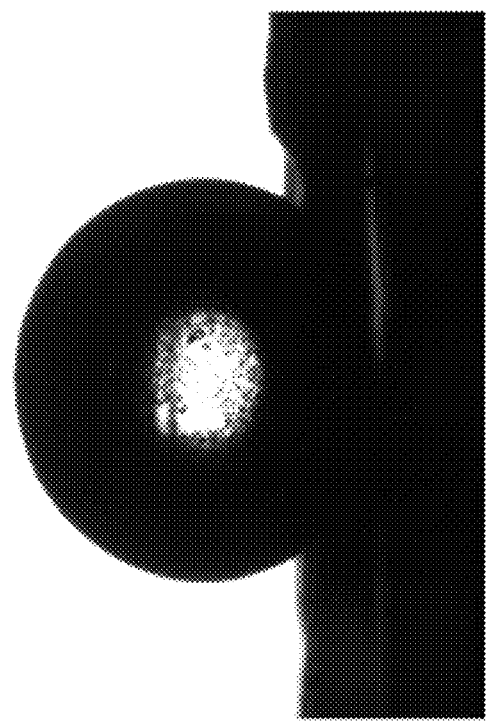
FIGS. 20A-20B are film of LIG that was scraped from the PI surface and prepared through vacuum filtration. This LIG was made with air assist.
Figure 20A:
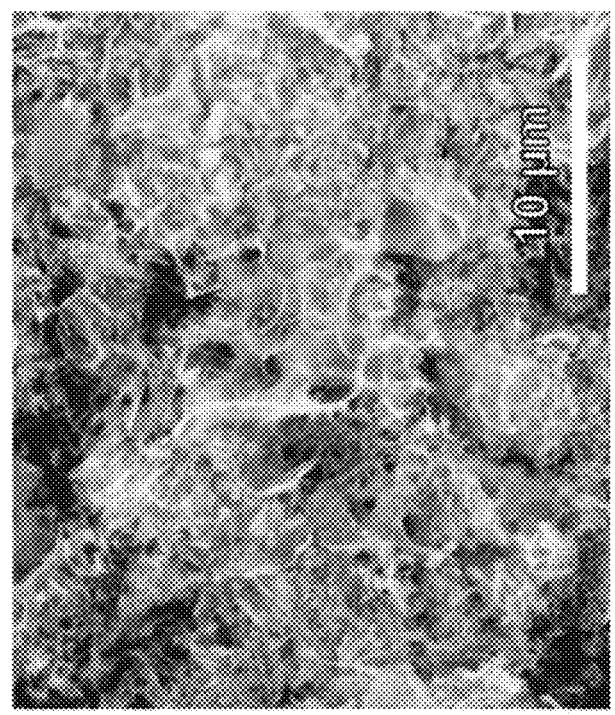
Figure 21A:
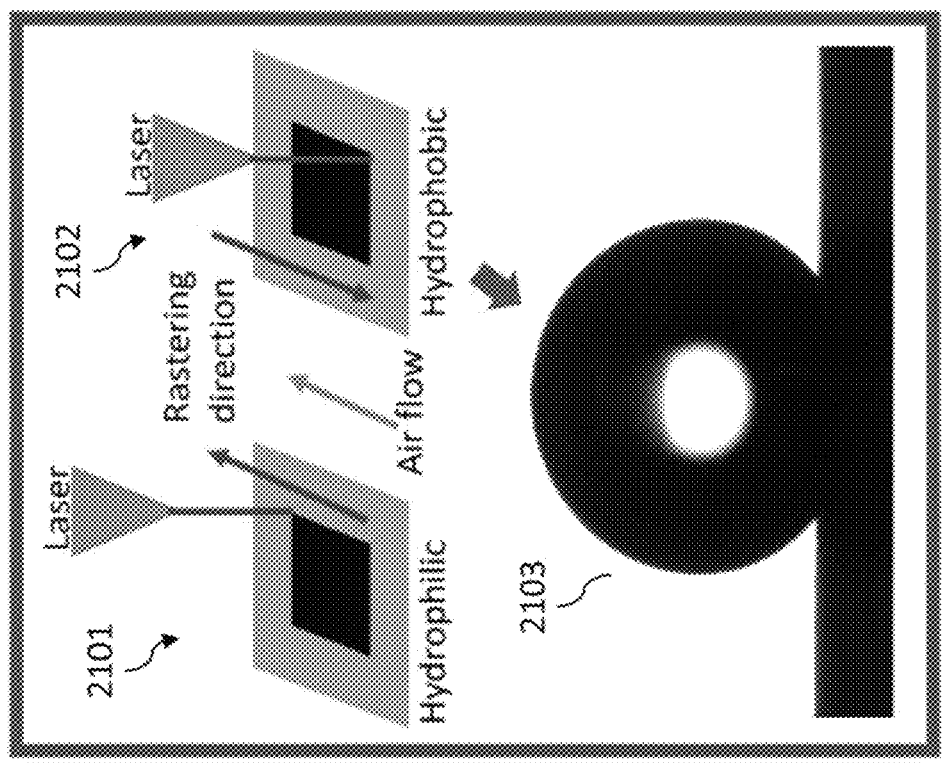
FIG. 21A is a scheme of different laser rastering directions (methods 2101 and 2102) provide different wetting properties. The picture 2103 shows a water droplet sitting on the hydrophobic LIG surface from method 2102, the measured contact angle is 143°.
Figure 21B:
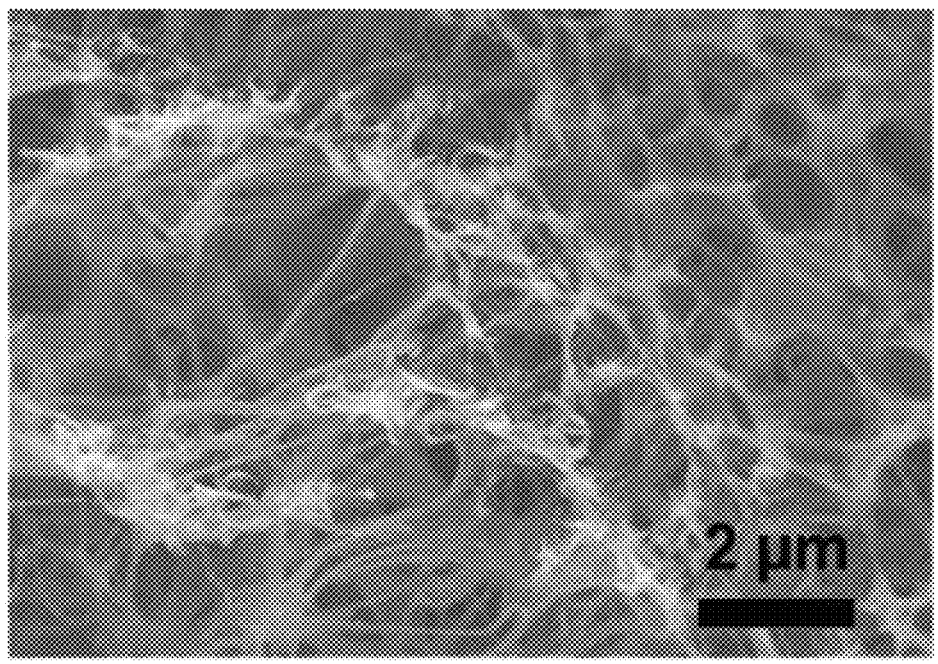
FIGS. 21B-21C are SEM images of hydrophilic LIG which has few carbon nanoparticles (method 2101).
Figure 21C:
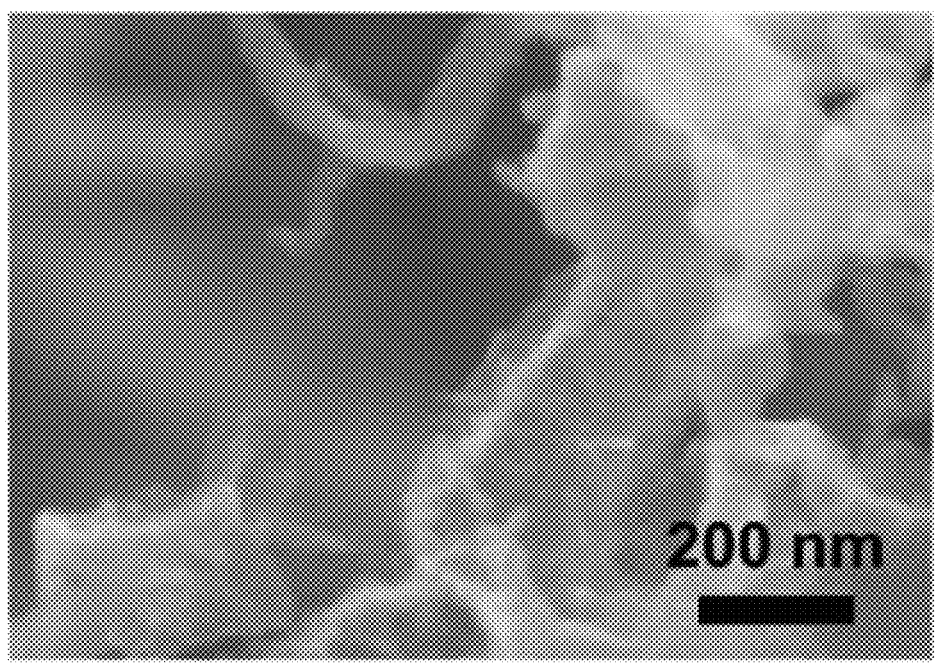
Figure 21D:
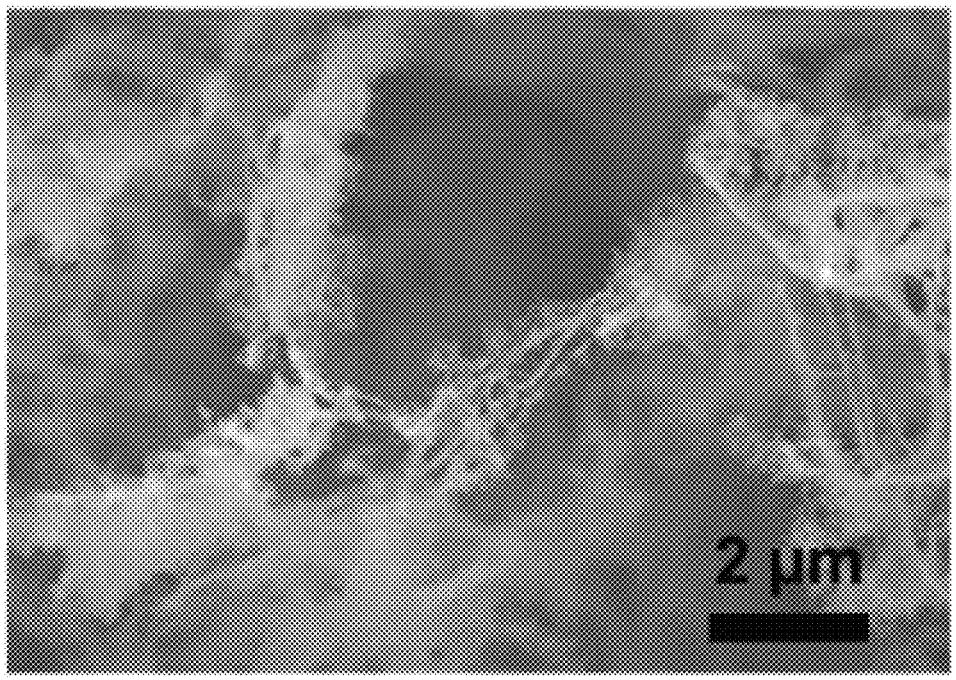
FIGS. 21D-21E are SEM images of hydrophobic LIG which are coated with carbon nanoparticles (method 2102). All fabrications of LIG with gas assist disclosed herein used method 2101.
Figure 21E:
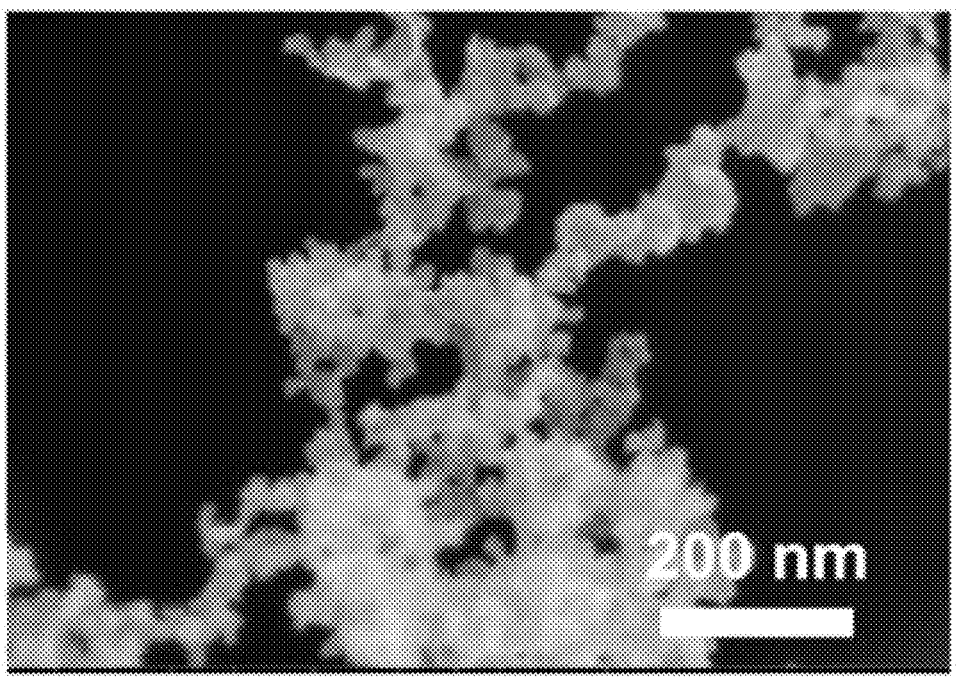
Figure 22A:
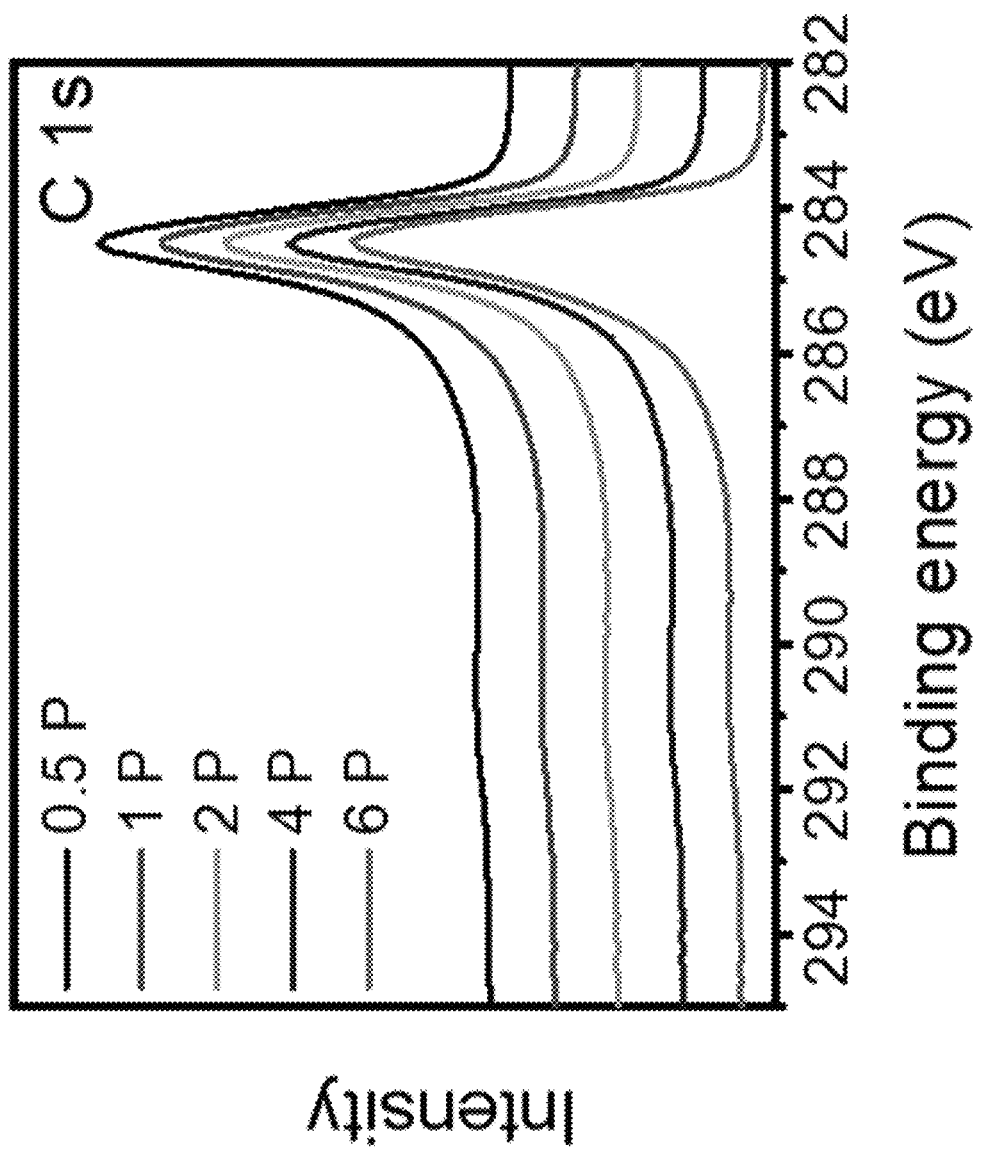
FIGS. 22A-22B are (FIG. 22A) C 1s and (FIG. 22B) O 1s peaks of LIG made with $H_2$ in the chamber with different laser powers.
Figure 22B:
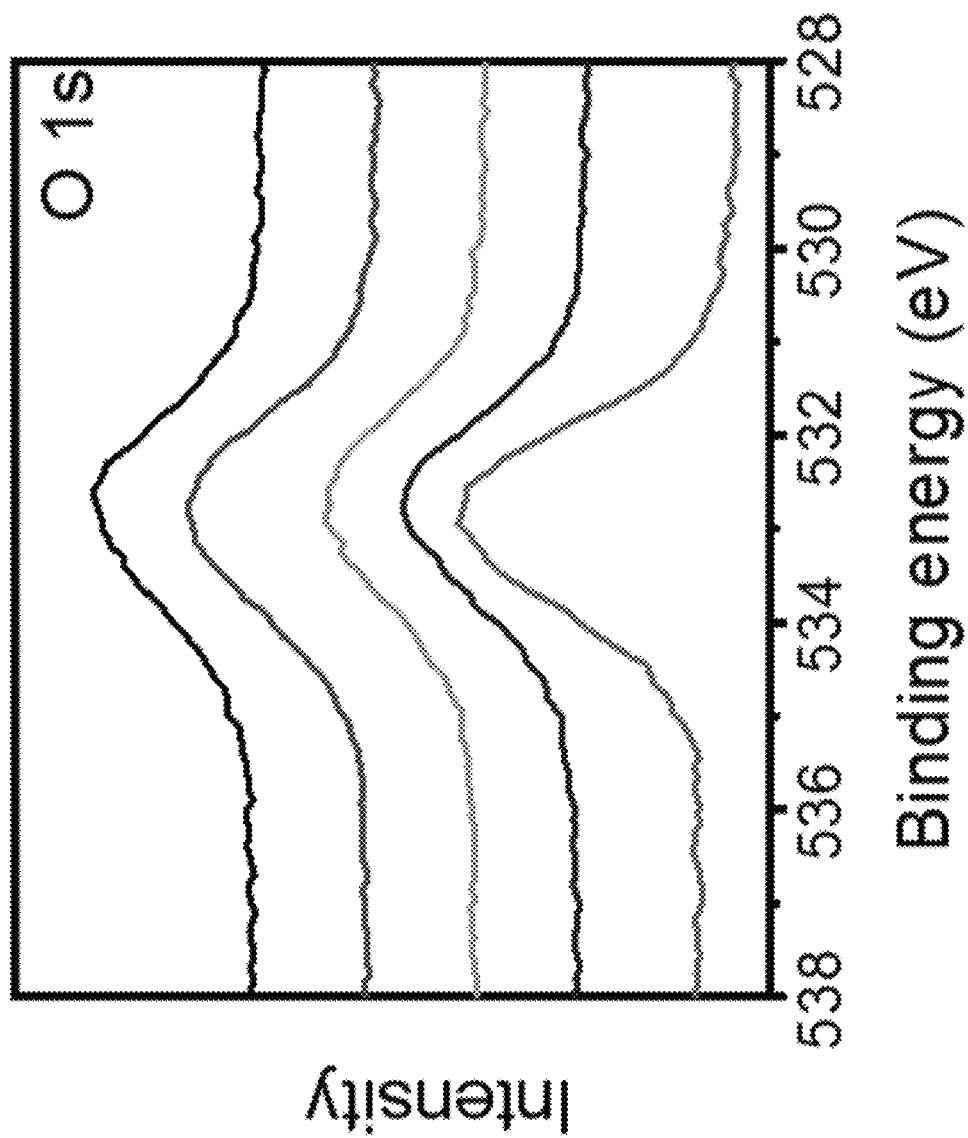
Figure 22C:
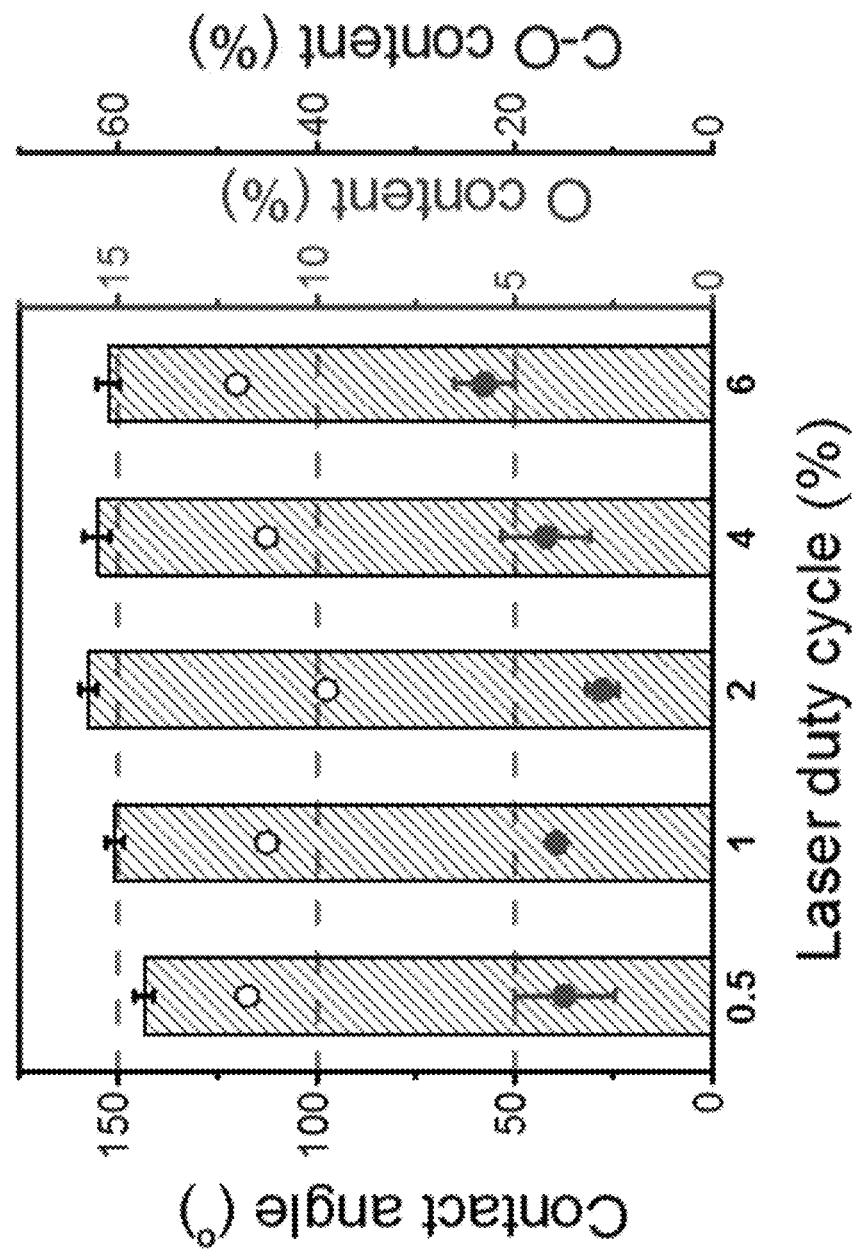
FIG. 22C shows the relationship between contact angle (bars), O content (red dots), and C—O bond content (of total O content, blue circles) for LIG samples made with $H_2$ in the chamber with different laser duty cycles.
Figure 22D:
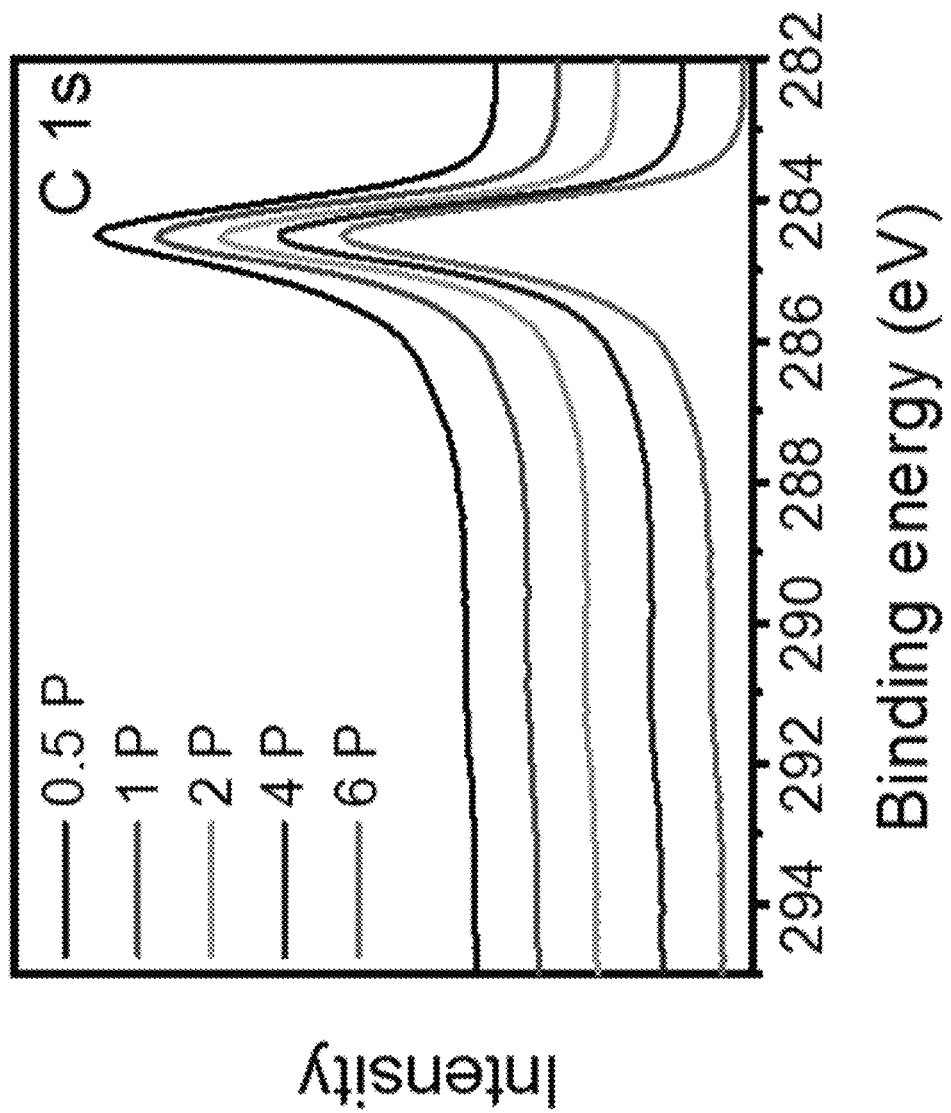
FIGS. 22D-22E are (FIG. 22D) C 1s and (FIG. 22E) O 1s peaks of LIG made with Ar in the chamber with different laser duty cycles.
Figure 22E:
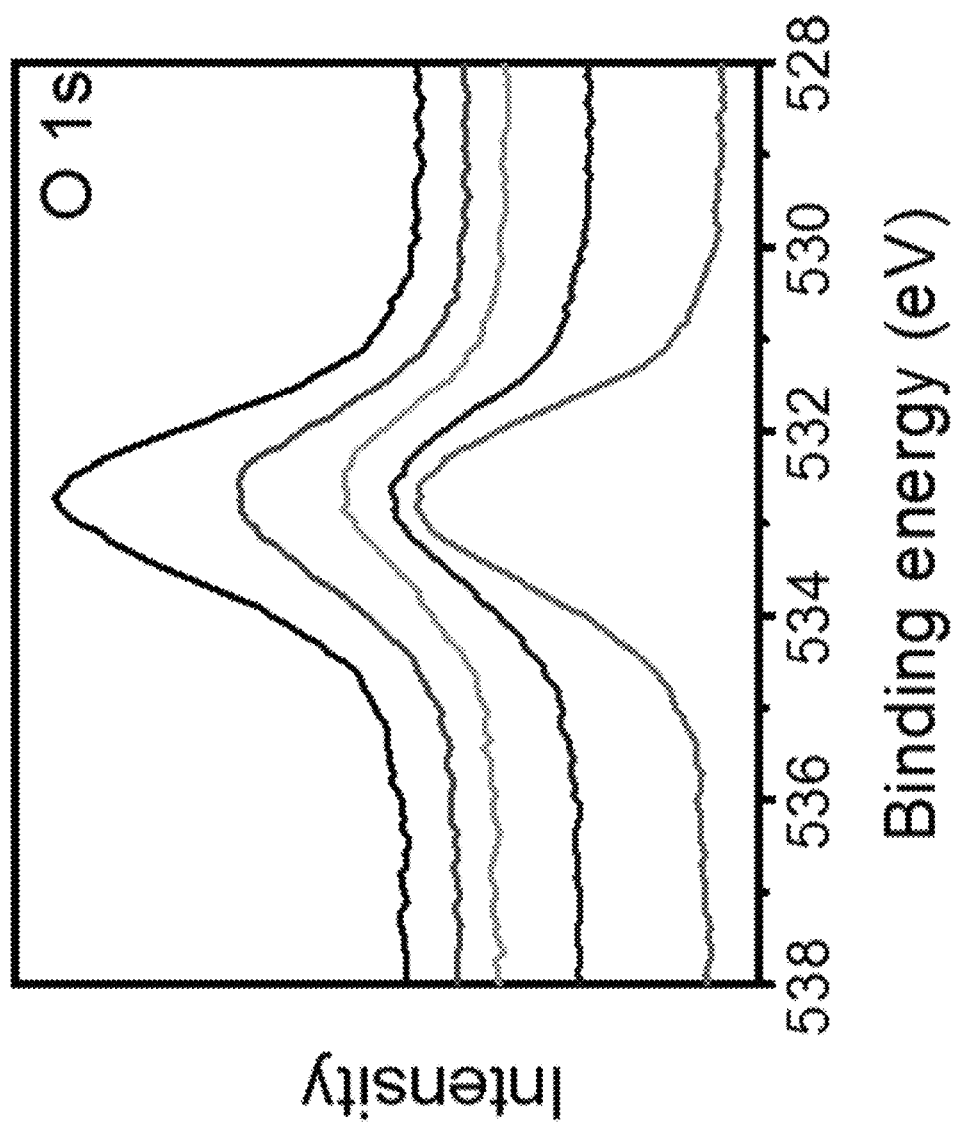
Figure 22F:
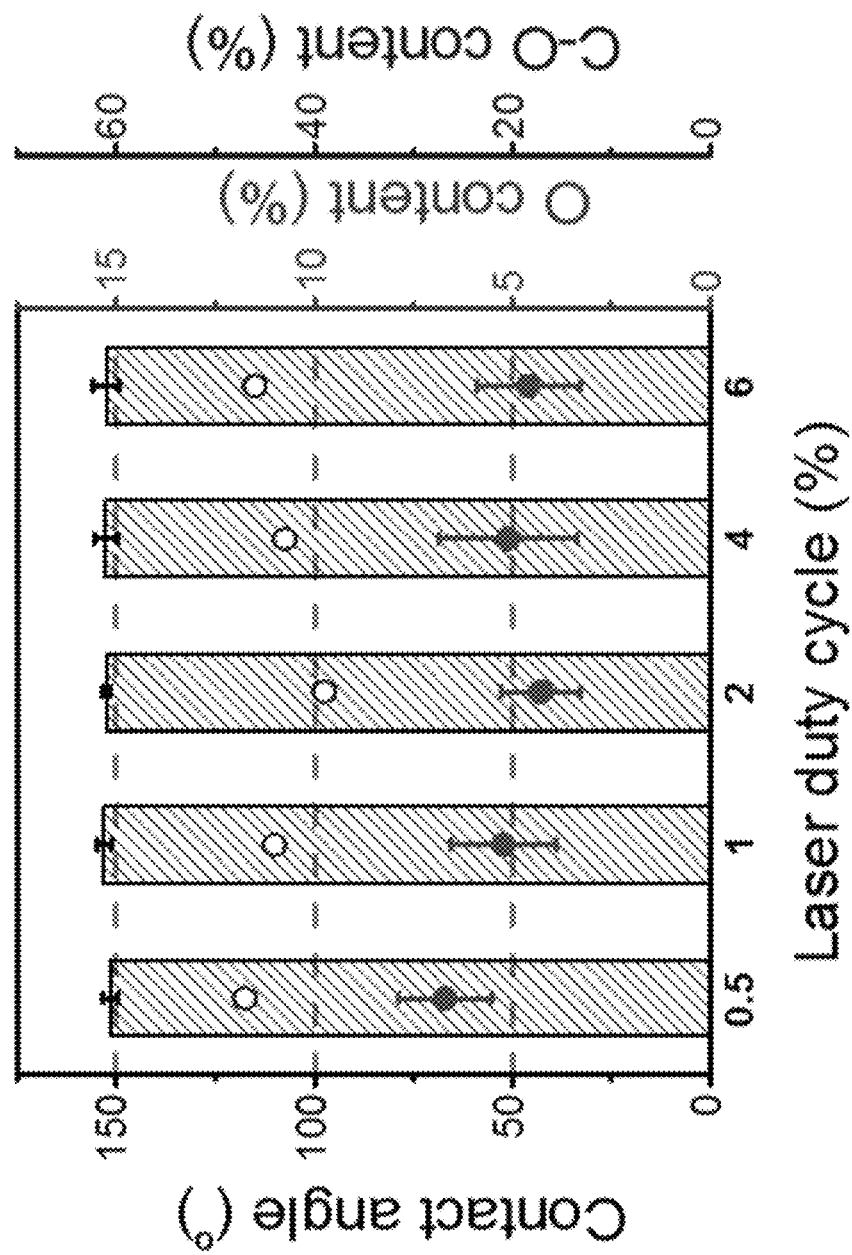
FIG. 22F shows the relationship between contact angle, O content, and C—O bond content (of total O content) for LIG samples made with Ar in the chamber with different laser duty cycles. The error bars reflect the difference between various spots of the same sample.

Interestingly, while the as-prepared LIG surface made with air assist is superhydrophilic, scratching off the LIG from the PI into a powder and making an LIG film by filtration, obtains a hydrophobic surface with a contact angle of ~120°, as shown in FIGS. 20A-20B. This might underscore the significance of the morphology, or surface orientation, of the as-prepared LIG surfaces.

For the as-prepared LIG sample on PI, the hydrophilic oxidized edges might be facing upward, making direct contact with water, while the porous surface permits the water droplet to penetrate into the LIG structure. In the case of the LIG film prepared by removal and filtration, the more hydrophobic graphene basal planes are exposed to the water droplet [Wang 2009], retarding penetration of the water droplet. Conversely, it could be that only the upper surface of the as-prepared film is superhydrophilic, and the removed LIG exposes the hydrophobic lower portions.

In another interesting and controllable protocol, if one changes the laser rastering direction relative to the gas assist direction during LIG fabrication, carbon nanoparticles generated under laser irradiation are blown back onto the previously formed LIG surface instead of being blown away (the normal setup), as shown in FIGS. 21A-21E. In this case, hydrophobic surfaces are obtained affording a contact angle of 143°. Here, the hydrophobic surface properties apparently come from the enhanced hierarchical structure created by the carbon nanoparticles, a frequently reported phenomenon that can even generate superhydrophobic surfaces. [Lee 2007; Bhushan 2009; Bhushan 2010]. Taken together, surface morphology significantly impacts the hydrophobicity of the LIG samples, more specifically, the superhydrophilic as-prepared LIG (air assist) surface with exposed graphene edges, the hydrophobic film (filtered LIG powders, FIG. 20A-20B) with the exposed graphene basal planes, and the hydrophobic as-prepared LIG (reversed air assist) with hierarchical structure covered by the carbon nanoparticles all present different surfaces to the applied water.

Figure 11:
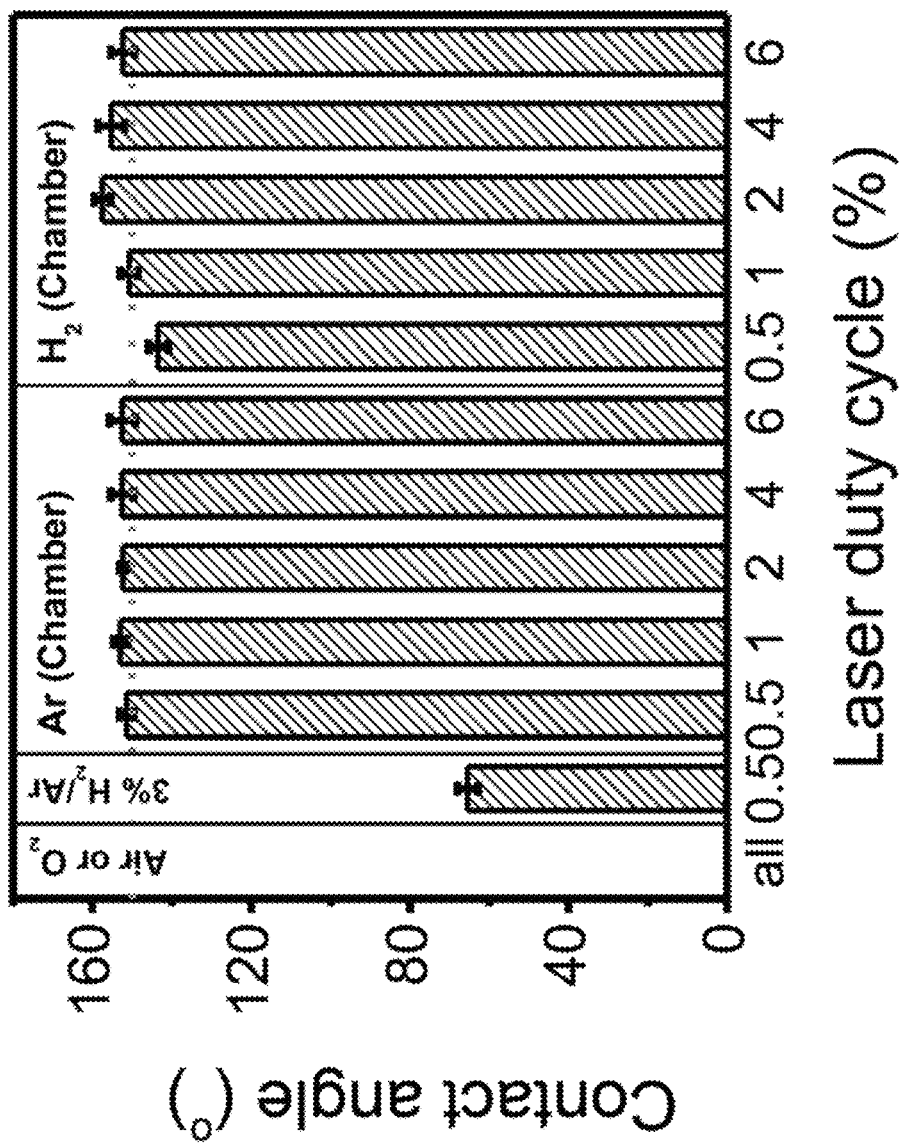
FIG. 11 is a graph showing contact angles of LIG samples prepared under different gas atmospheres with different laser duty cycles. The dashed line at 150° is the minimum contact angle required for superhydrophobicity. The first column is done with air assist or with $O_2$ in the chamber, and the second column is done with 3% $H_2$/Ar assist. The rest of the columns are done with Ar or $H_2$ in the chamber. The error bars reflect the difference between various spots of the same sample.

FIG. 11 shows a statistical summary of the water contact angles of LIG samples prepared under different gas atmospheres. Even with different laser duty cycles, except for LIG prepared with Ar or $H_2$ in the chamber, almost all other samples show superhydrophilicity with ~0° contact angle (except for 0.5% duty cycle with 3% $H_2$/Ar assist). For LIG made with Ar in the chamber, superhydrophobicity is produced and the contact angles remain relative constant (~152°) with different laser duty cycles. For LIG made with $H_2$ in the chamber, superhydrophobicity with a larger variance is observed, and 2% laser duty cycle gives the highest contact angle of 157°. It was concluded that as $H_2$ is much more reactive (reducing) than Ar (inert), when the laser irradiation condition changes, there will also be a larger response or change regarding the properties of LIG structures; this topic will be further discussed below especially in terms of the changes in O content.

To further demonstrate the different wetting properties of various LIG samples, a first video was taken (available at top-level domain name www.youtube.com (at subdomain watch?v=_xFBDkQH7GAU)) that showed a superhydrophilic LIG surface patterned inside a superhydrophobic LIG frame, and water rolls off the superhydrophobic LIG surface but is trapped at the superhydrophilic LIG surface domains.

Figure 12A:
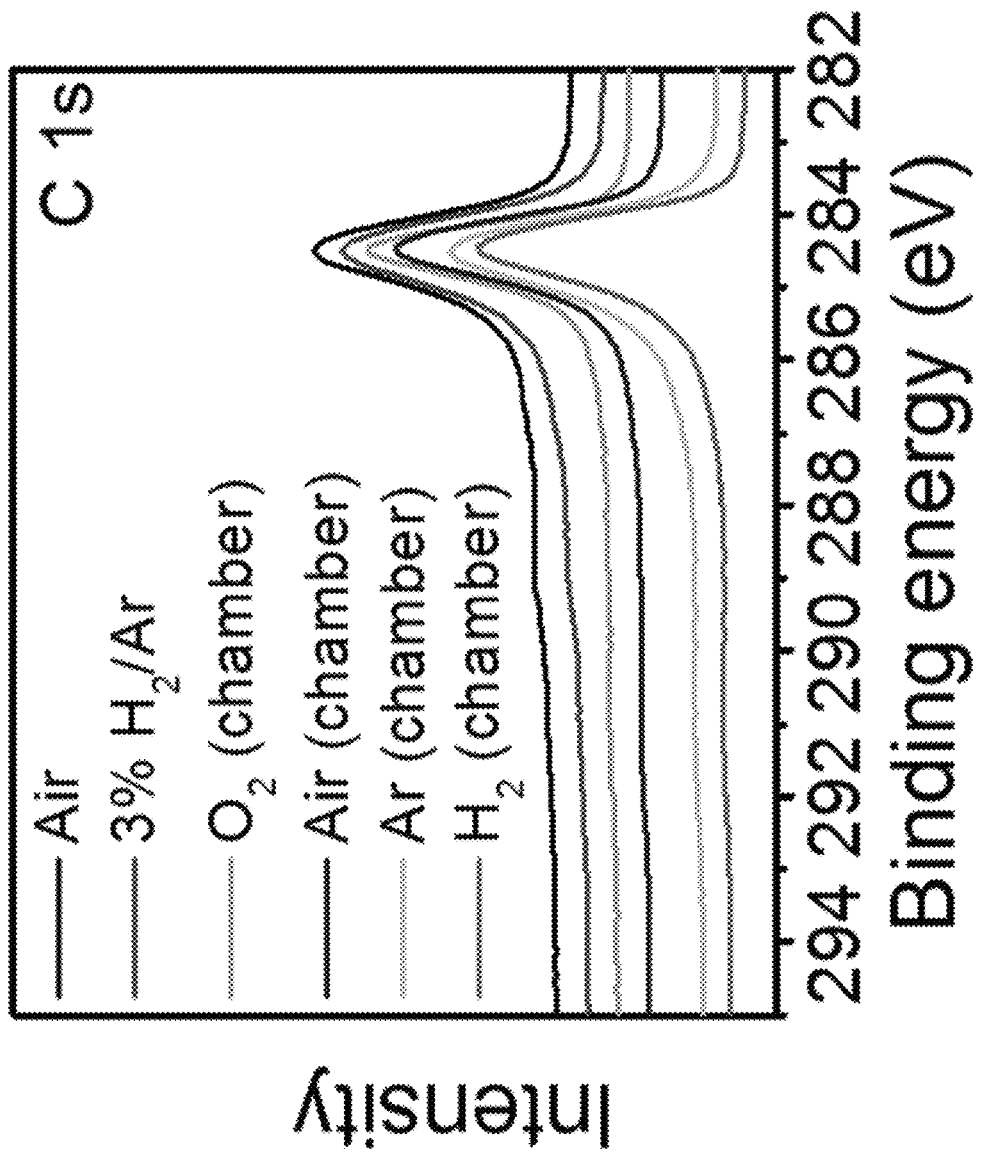
FIGS. 12A-12B are XPS spectra for LIG samples made under different gas atmospheres with (FIG. 12A) Normalized C 1s spectra, (FIG. 12B) O 1s spectra.
Figure 12B:
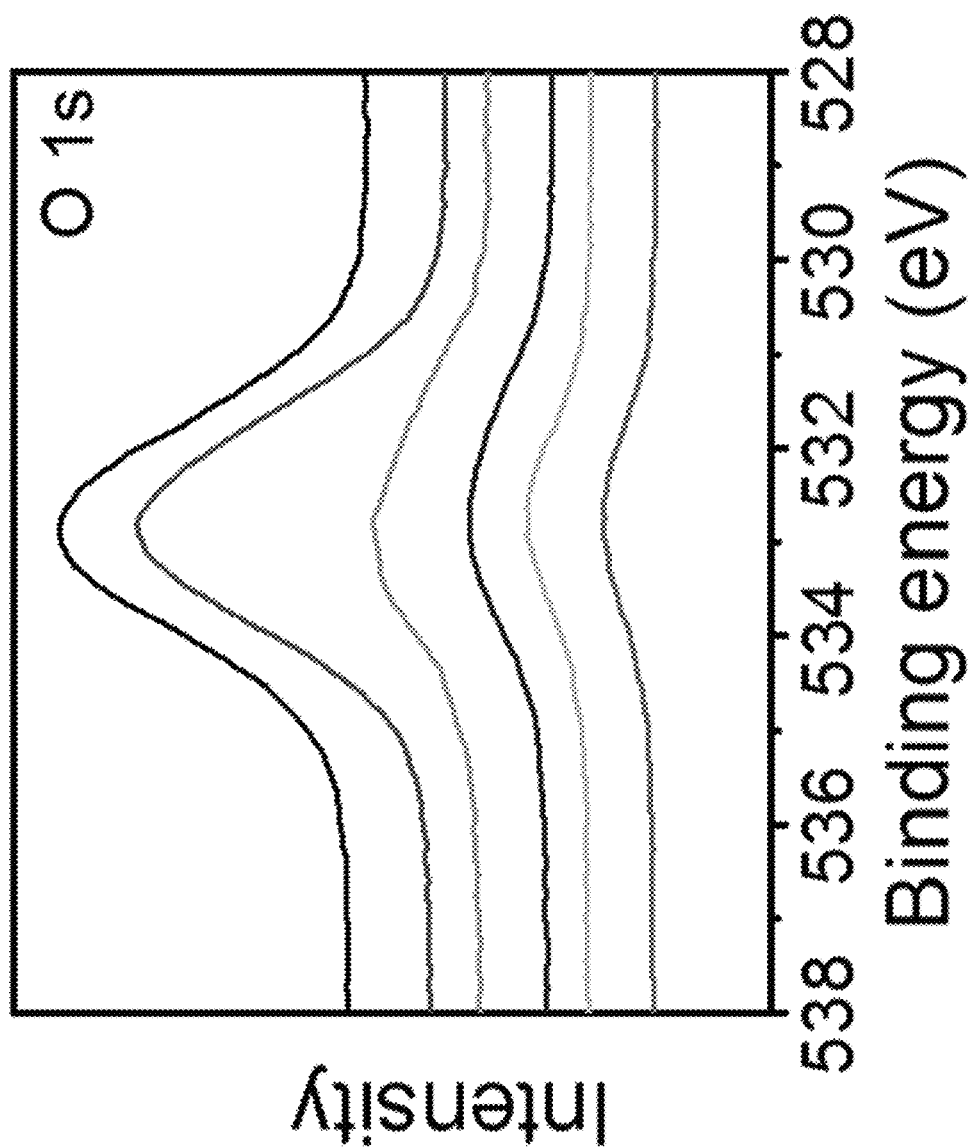
Figure 12C:
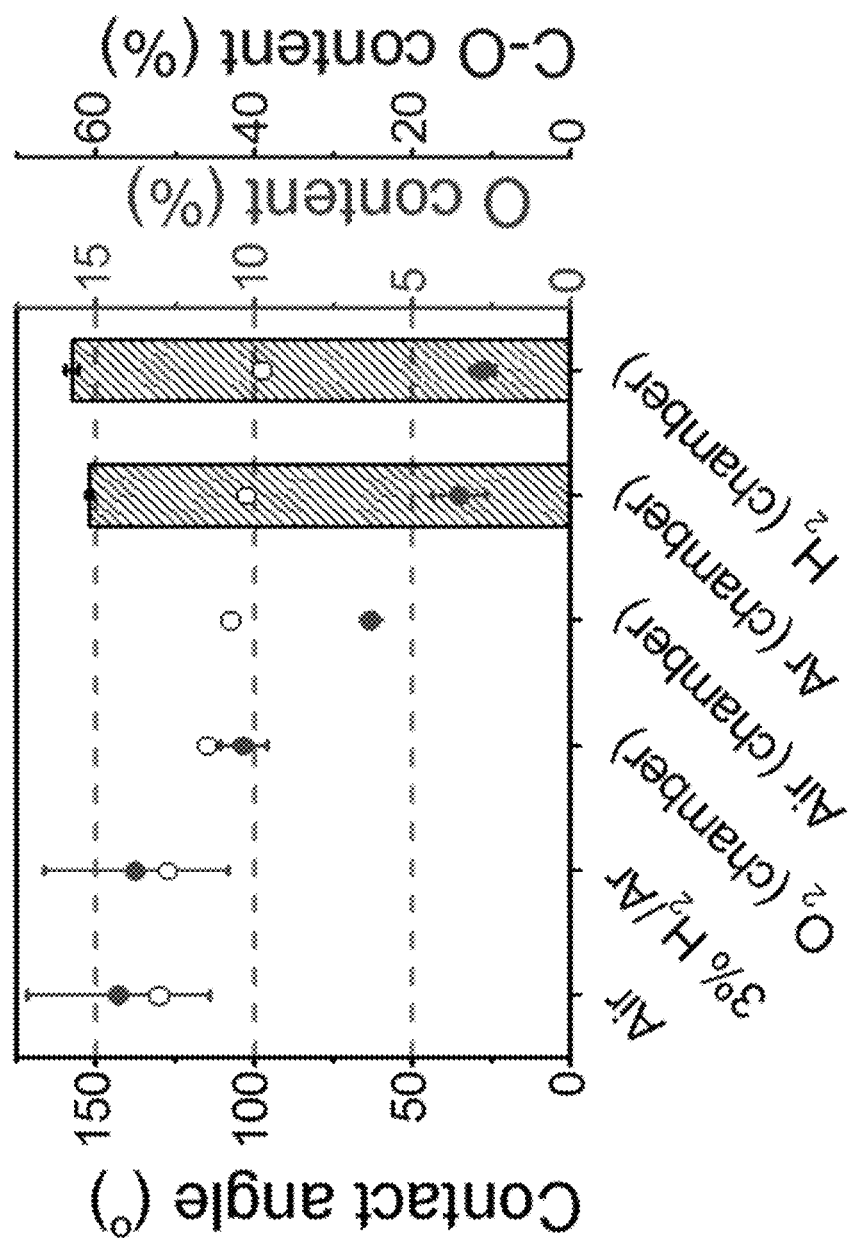
FIG. 12C is a graph showing the relationship between water contact angle (bars), O content (red dots), and C—O bond content (of total O content, blue circles) for LIG samples made under different gas atmospheres. 2% laser duty cycle is used for these samples. For the calculation of C—O content (relative to total O content, i.e. total of C—O and C=O content), the C—O peak was assigned at 533.4 eV and the C=O peak was assigned at 532.3 eV for the deconvolution. [Hontoria-Lucas 1995; Bagri 2010]

FIGS. 12A-12B show the XPS spectra for LIG samples made under different gas atmospheres. From the C 1s spectra shown in FIG. 12A, the graphitic C peak (284.5 eV) is observed as the major component for all LIG samples and is used to calibrate the XPS peak position. [Lin 2014]. LIG made with air assist or 3% $H_2$/Ar assist shows obvious shoulder peaks at 286 to 290 eV, corresponding to C—O/C=O bonds. [Hontoria-Lucas 1995; Marcano 2010]. For the O 1s spectra, different peak heights (normalized with C 1s peak) are observed for different LIG samples in FIG. 12B, and the O content as well as C—O content (relative to total O content, i.e. total of C—O and C=O content) are quantified in FIG. 12C after deconvolution. Generally, LIG samples made with gas assist (not isolated from air) shows significantly higher O content relative to LIG samples made in the controlled atmosphere chamber. Samples with superhydrophobicity, specifically LIG made with Ar or $H_2$ in the chamber, show significantly lower O and C—O content compared to the hydrophilic samples. In the controlled atmosphere chamber, more oxidizing atmospheres yield higher O and C—O content.

To further investigate the relationship between O content and water contact angle, for LIG made with Ar or $H_2$ in the chamber, the data for different laser duty cycles was also plotted in FIGS. 22A-22F. Clearly, the difference in surface chemistry does correlate to the difference in contact angle. LIG samples with lower O content and lower C—O content almost always have a higher water contact angle. This trend holds despite the fact that the changes in O content and contact angle are smaller for LIG made with Ar (less reactive than $H_2$) in the chamber. This correlation is rationalized by the fact that C—O and C=O bonds are more polar than C—C or C—H bonds, so that more O content means the edges are more favorable to interact with water, and thus more hydrophilic. In addition, C—O bonds can terminate in H making it C—OH, therefore more hydrophilic than C=O bonds. This trend is also confirmed by using the captive bubble method to evaluate the contact angle for air (instead of water) and thus the difference in surface properties for the superhydrophilic LIG samples. [Zhang 1989].

Figure 23:
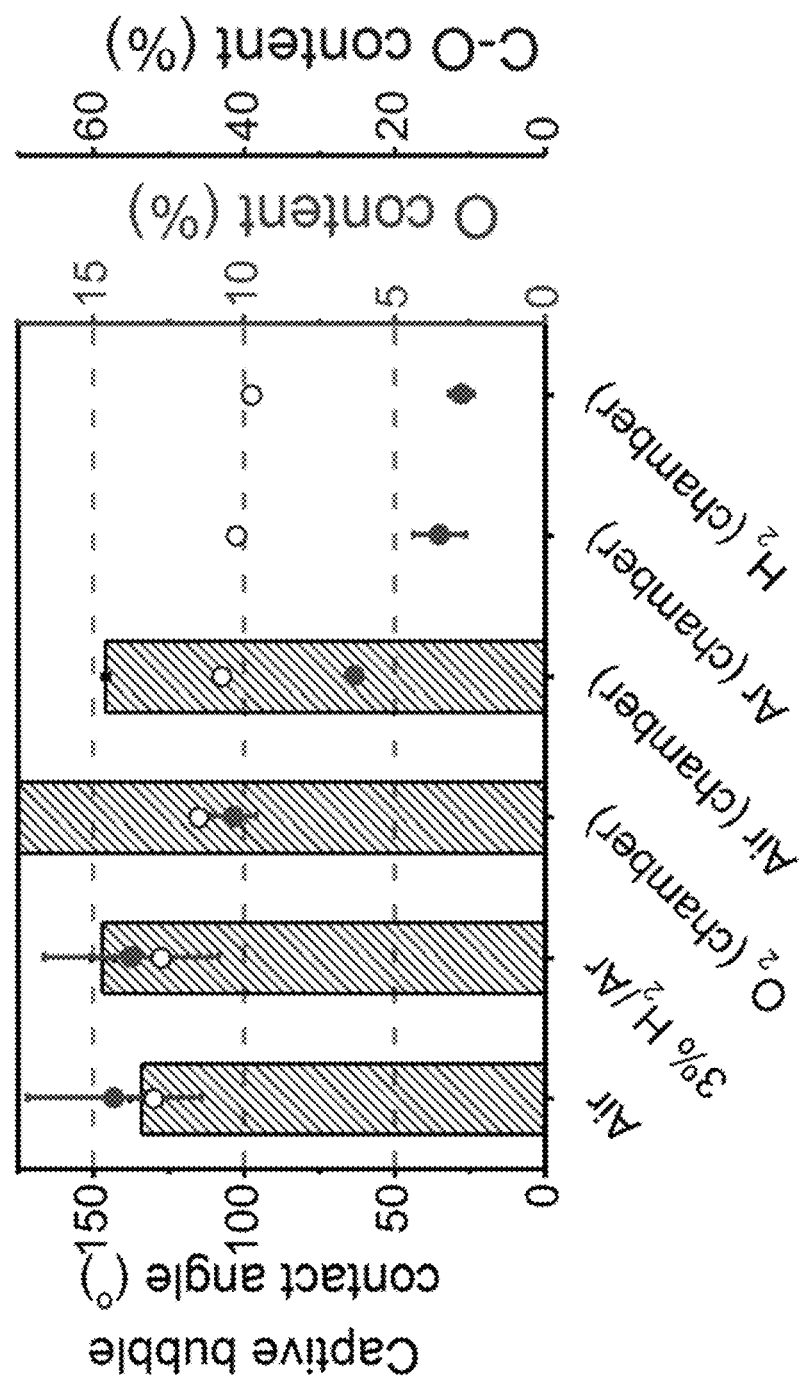
FIG. 23 shows the relationship between captive bubble contact angle (bars), O content (red dots), and C—O bond content (of total O content, blue circles) for LIG samples made under different gas atmospheres. 2% laser duty cycle is used for these samples. C—O peak assigned at 533.4 eV, C=O peak assigned at 532.3 eV for the calculation of C—O content. The error bars reflect the difference between various spots of the same sample.

Using this method, FIG. 23 shows that with the controlled atmosphere chamber, LIG samples with a less oxidizing atmosphere (air), compared to 02, gives lower O and C—O content, and thus a lower air contact angle of ~146°. The air bubble cannot even stay on the LIG made with $O_2$ in the chamber, indicating a much higher air contact angle, thus greater hydrophilicity. As with the water contact angle measurements, the captive bubble contact angles (~0°) for LIG samples prepared with Ar and $H_2$ in the chamber both afford superhydrophobic structures.

In summary, based on the experimental results discussed above, both surface morphology and surface chemistry could contribute to the hydrophilicity or hydrophobicity of the LIG surfaces. Specifically, superhydrophilic or hydrophobic LIG surfaces can be obtained by varying the morphology of LIG samples prepared with air assist, and superhydrophilic or superhydrophobic LIG surfaces can be obtained by tuning the O content with different gas atmospheres. However, both factors should be taken into consideration when synthesizing superhydrophobic or superhydrophilic LIG samples, since the changes in surface chemistry are often accompanied by changes in surface morphology. As shown in FIG. 10E-10J and FIGS. 16A-16L, superhydrophobic surfaces with their lower O content LIG contains a hierarchical structure with rough edges ($H_2$ in chamber) or carbon nanoparticles (Ar in chamber), and superhydrophilic surfaces with their higher O content LIG contains more macro-pores (air assist and $O_2$ in chamber).

Figure 12D:
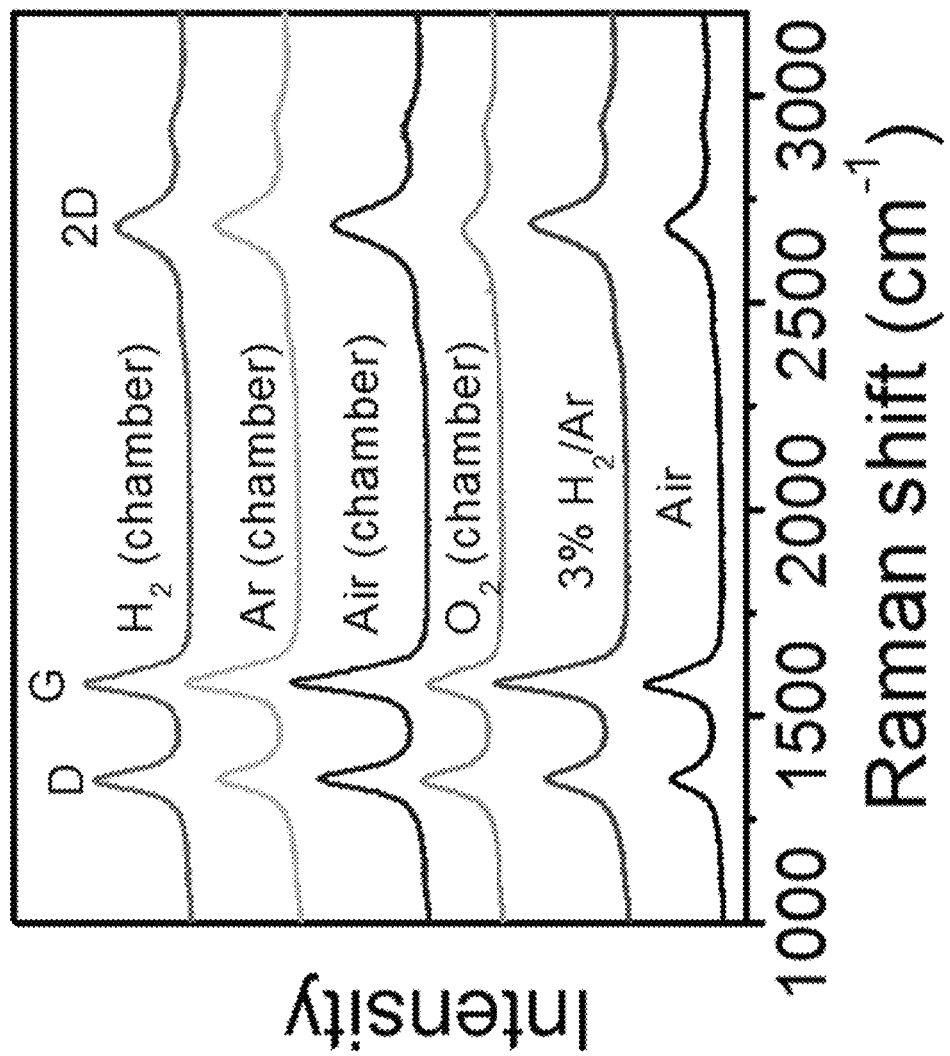
FIG. 12D is the Raman spectra for LIG samples made under different gas atmospheres.
Figure 12E:
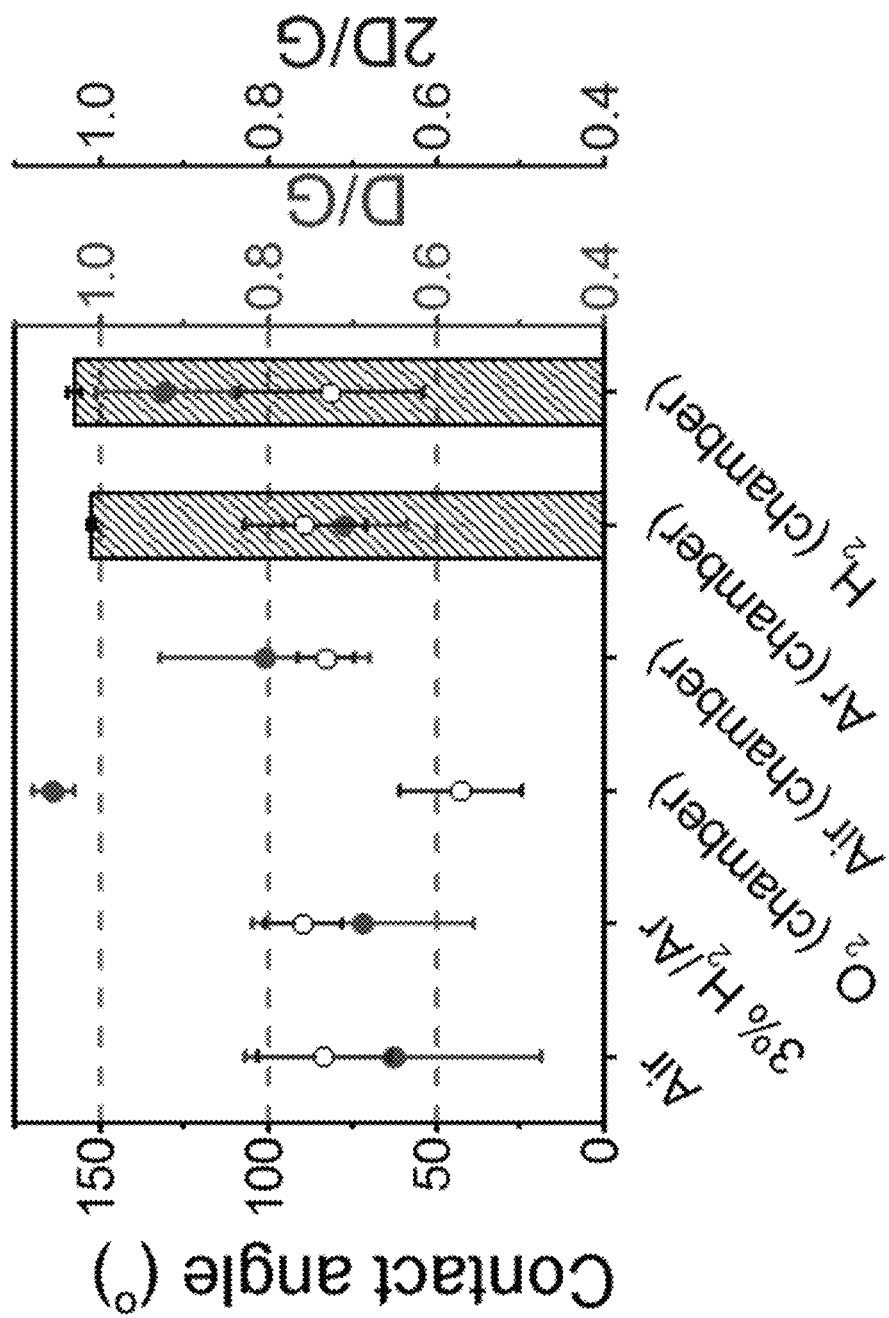
FIG. 12E is a graph showing the relationship between contact angle (bars), D/G ratio (red dots), and 2D/G ratio (blue circles) for LIG samples made under different gas atmospheres. 2% laser duty cycle is used for these samples. The error bars reflect the difference between various spots of the same sample.

Raman spectroscopy is also used to study the degree of graphitization and defect formation for various LIG samples under different atmospheres. [Ferrari 2006; Pimenta 2007]. As shown in FIG. 12D, D, G, and 2D peaks are observed for the LIG samples, similar to the previously reported LIG. [Lin 2014]. FIG. 12E shows the quantified results of D/G and 2D/G ratios as they are commonly used to analyzed the quality of graphitic structures. Among the samples analyzed, a similar 2D/G ratio of 0.6 to 0.7 is observed that indicates good graphitization. The exception is for LIG made with $O_2$ in the chamber, which shows a significantly lower 2D/G ratio of ~0.55 as well as a much higher degree of defects (higher D/G ratio). This could be due to the higher oxidation induced by the $O_2$ environment, which can be related to the rough edges and large pores observed in the SEM images. LIG made with $H_2$ in the chamber also shows a slightly increased D/G ratio, most likely because of the reducing environment, which prevents the decomposition or rearrangement of the defects within the graphitic structures. Yet no significant correlation could be found between the Raman spectra and the superhydrophobicity.

Figure 13C:
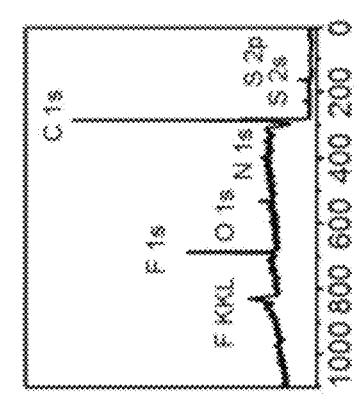
FIGS. 13A-13F show the characterization of LIG made with an atmosphere of $SF_6$ in the chamber.
Figure 13F:
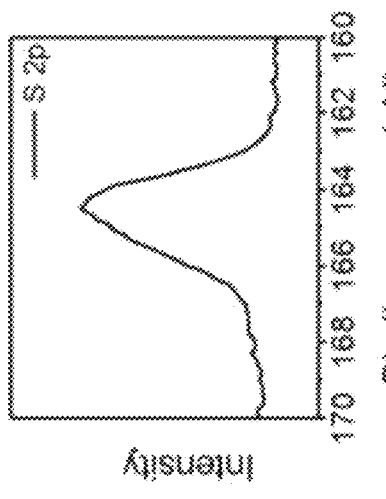
Figure 13B:
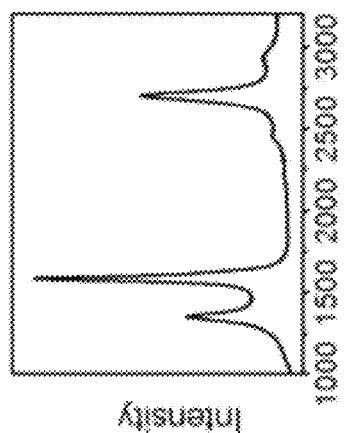
Figure 13E:
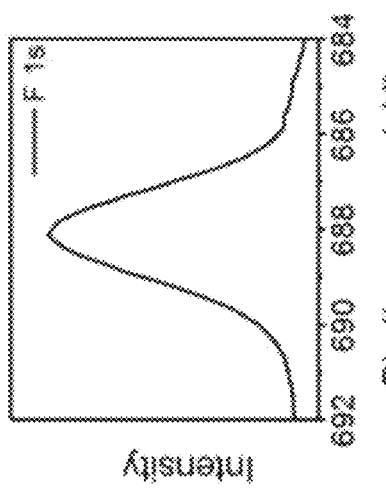
Figure 13A:
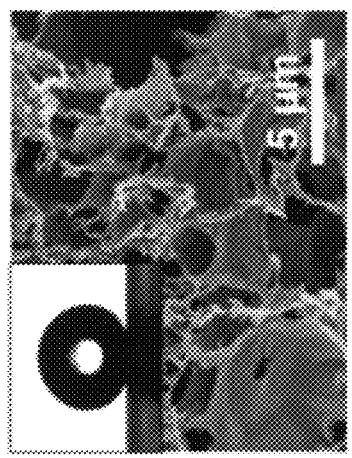
Figure 13D:
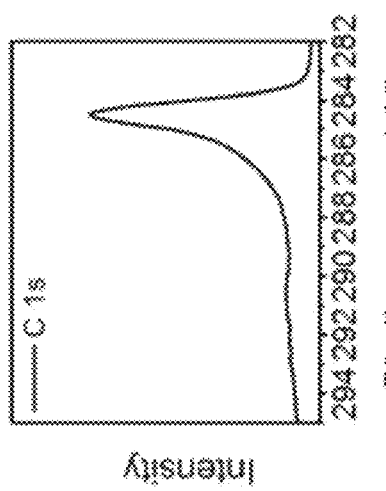
Figure 14A:
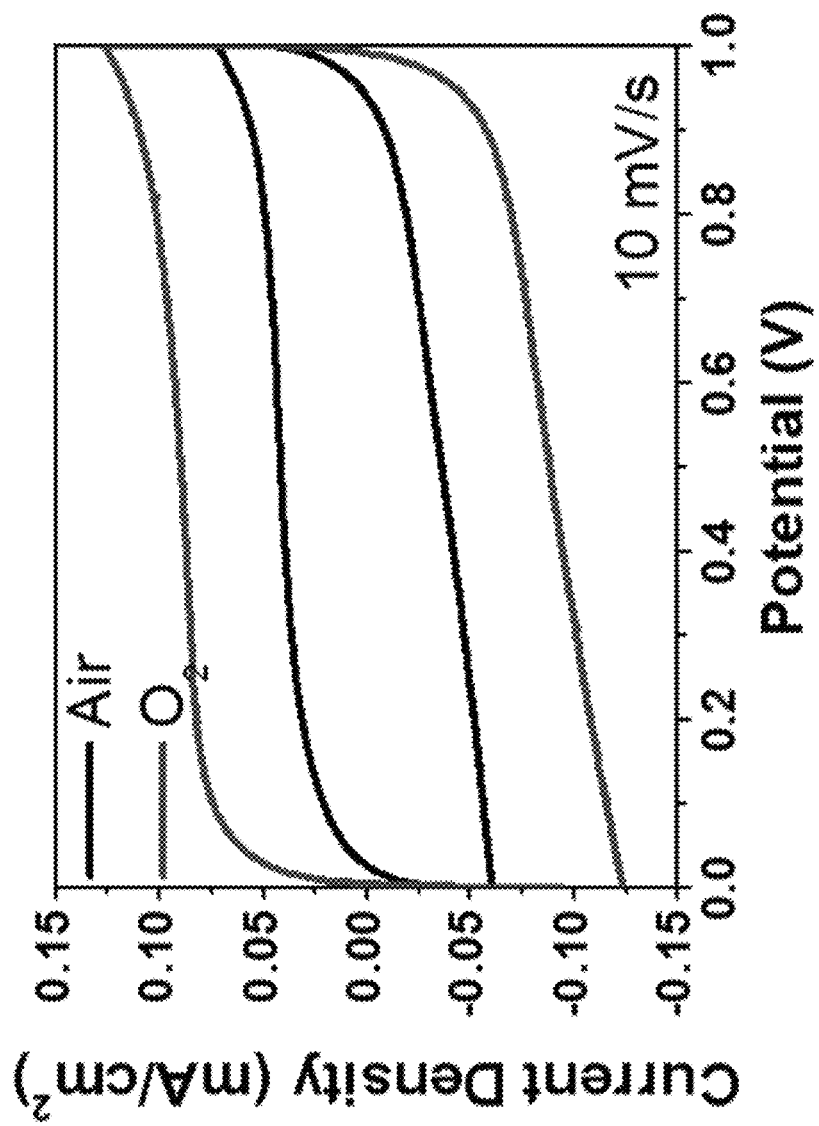
FIGS. 14A-14D show performance of microsupercapacitors prepared from LIG with $O_2$ in the chamber vs air in the chamber.
Figure 14B:
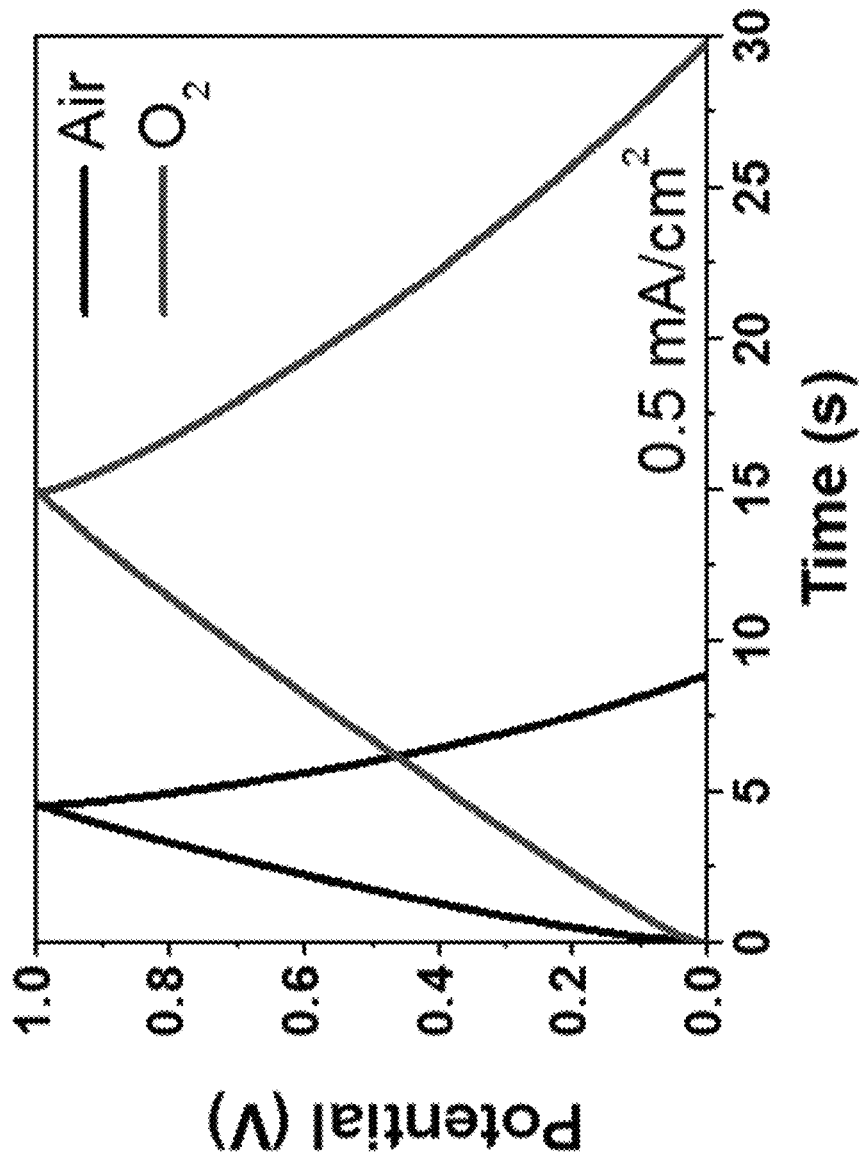
Figure 14C:
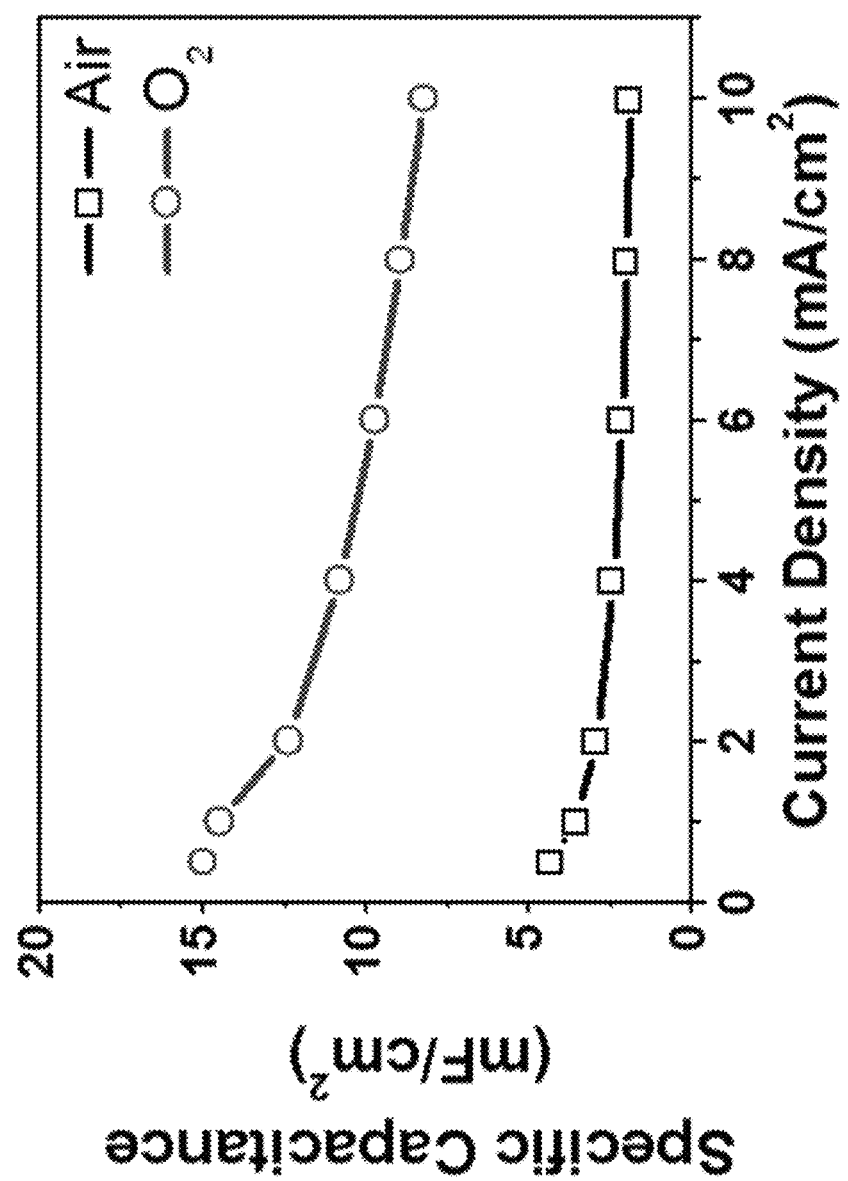
Figure 14D:
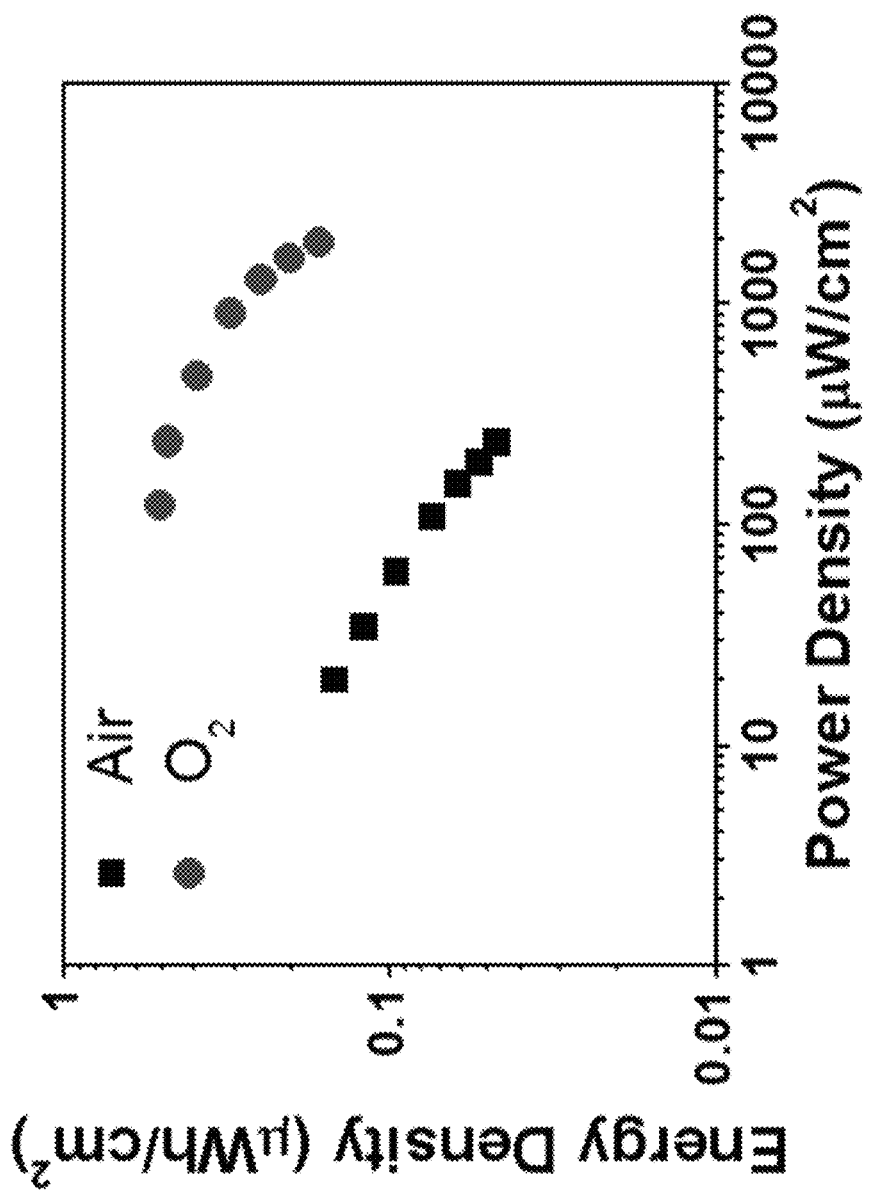
Figure 15B:
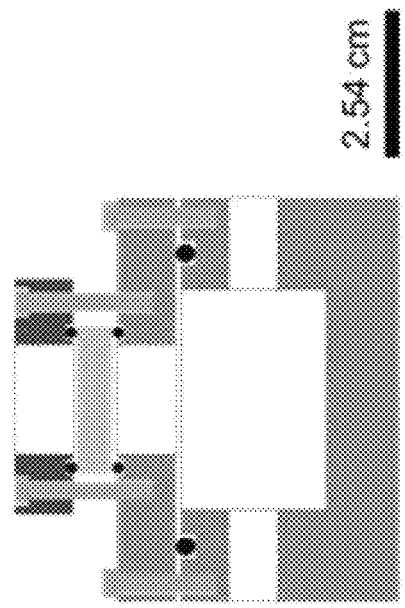
FIGS. 15A-15B are drawings of the top view and side view drawings of the home-built controlled atmosphere chamber shown in FIG. 10D.
Figure 15A:
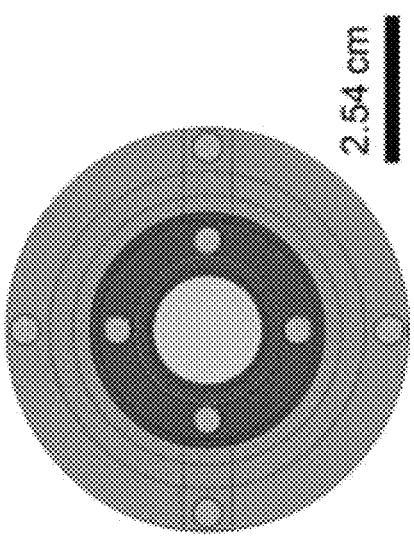

The low surface energy of C—F bonds can yield superhydrophobic surfaces. [Wang 2016; Lin 2011; Zha 2011; Singh 2013; Li 2014]. Here, the inventors of the present invention also tried to introduce C—F bonding into the LIG structures using $SF_6$ gas in the chamber. $SF_6$ is a non-flammable gas commonly used as the dielectric medium in electronics manufacturing, yet it is able to decompose to form reactive F species under extreme conditions. [Chu 1986; Tsai 2007]. Since $SF_6$ gas has a high absorbance at 10.6 μm, a 9.3 μm $CO_2$ laser is used to prepare LIG samples when using $SF_6$ in the chamber, and FIGS. 13A-13F show the characterization of the samples. The typical LIG characteristics of a porous structure and D/G/2D peaks could be observed from the SEM images and the Raman spectrum (FIGS. 13A-13B). A significantly higher water contact angle of 162° was achieved. A second video taken (available at top-level domain name www.youtube.com (at subdomain watch?v=qAuyVgYI9m8)) that showed the water droplet bouncing on the surface of this LIG sample with $SF_6$ in the chamber until it settles on the neighboring PI film. High F-content (~10%) of the LIG surface was confirmed by XPS as shown in FIGS. 13C-13F. Both $CF_2$ (689 eV) and CF (687 eV) bonds are detected in the F 1s spectrum and the tailing part for C 1s spectrum. [Zhao 2014; Romero 2015].

Figure 24A:
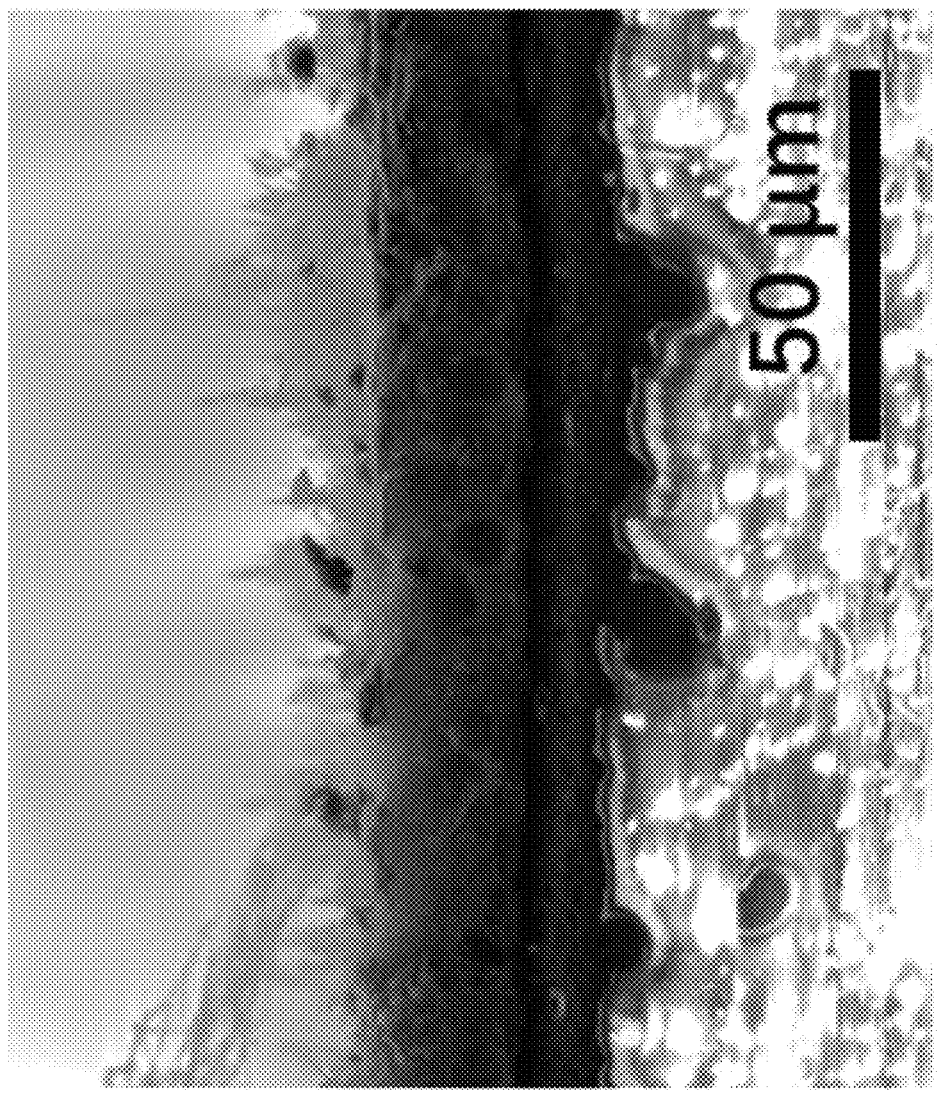
FIG. 24A is a side view SEM image of LIG made with $SF_6$ in the chamber.
Figure 24B:
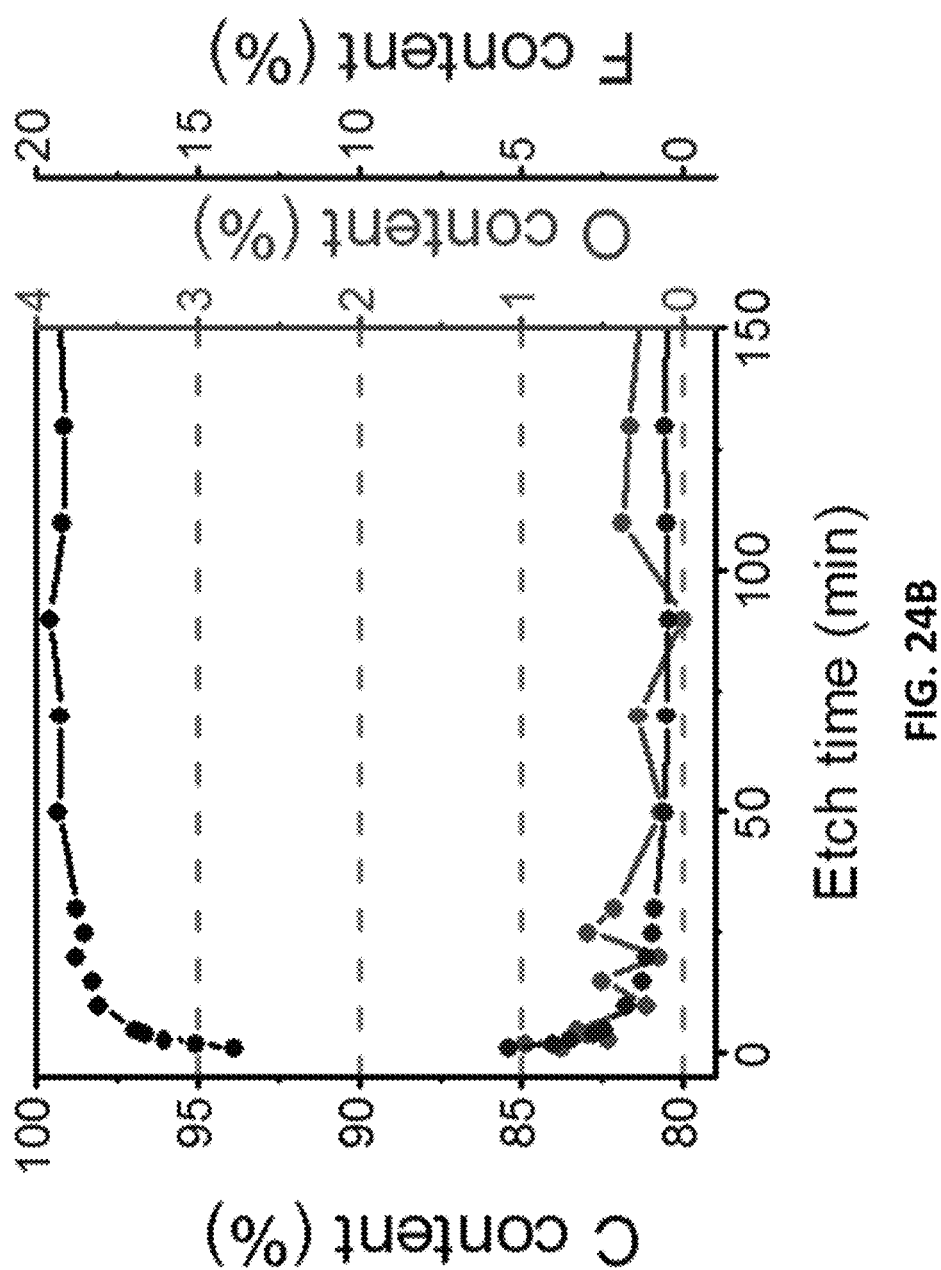
FIG. 24B is the depth profile of C/O/F content (black, red and blue dots, respectively) of LIG made with $SF_6$. An Argon ion beam is used to etch the LIG surface, the estimated etch rate is ~20 nm/min.
Figure 24C:
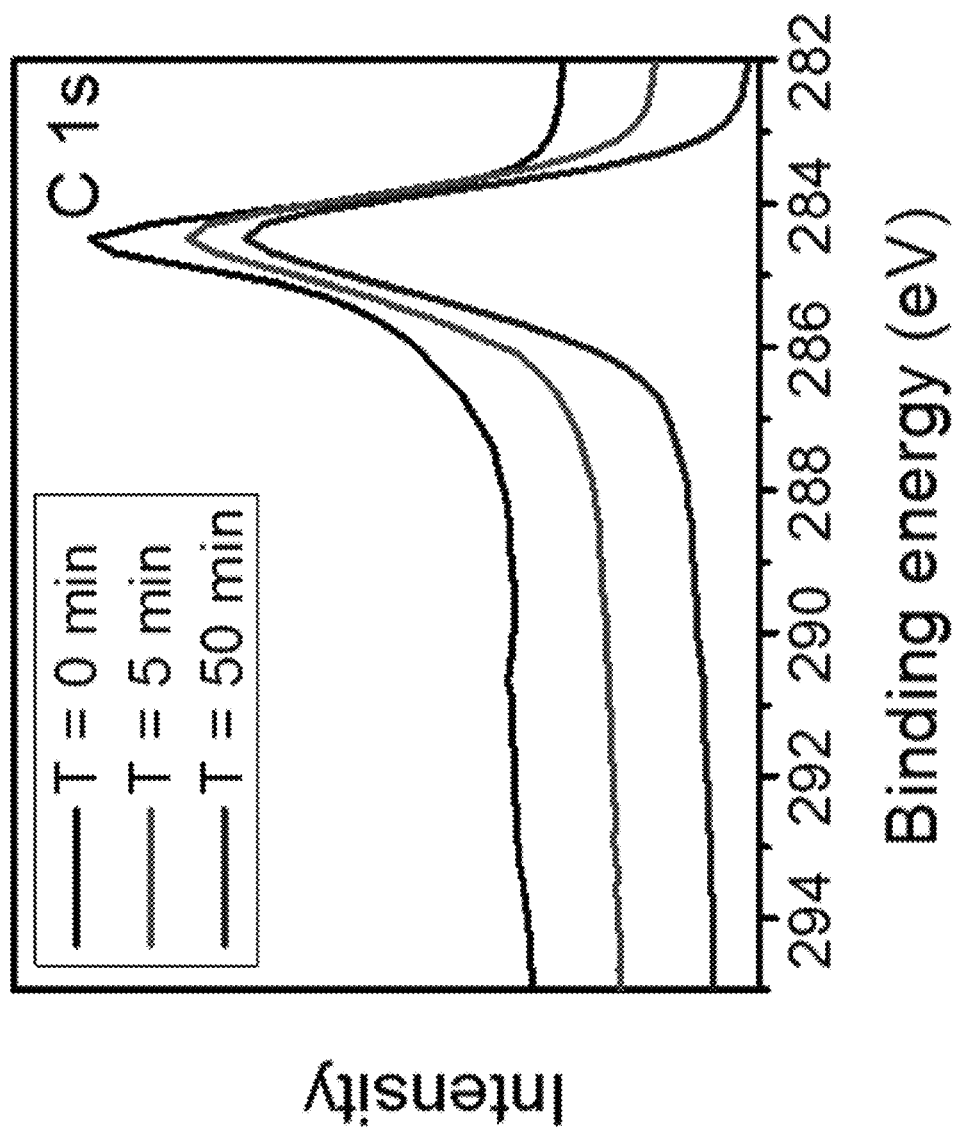
FIGS. 24C-24D are (FIG. 24C) C 1s and (FIG. 24D) F 1s spectra of LIG made with $SF_6$ with different etch times. A 9.3 μm $CO_2$ laser was used when $SF_6$ was present. 4% laser duty cycle is used for this sample.
Figure 24D:
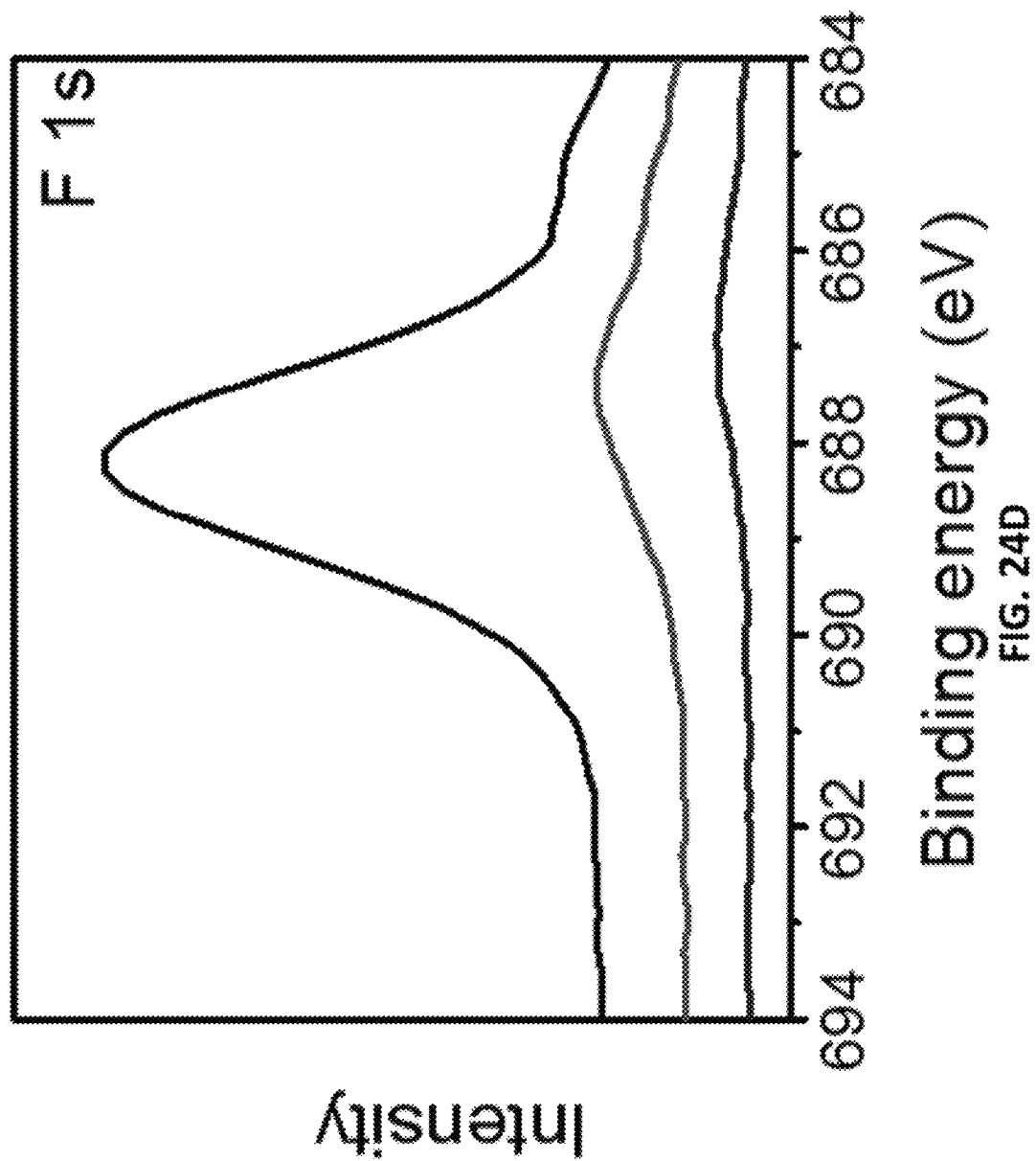
Figure 25:
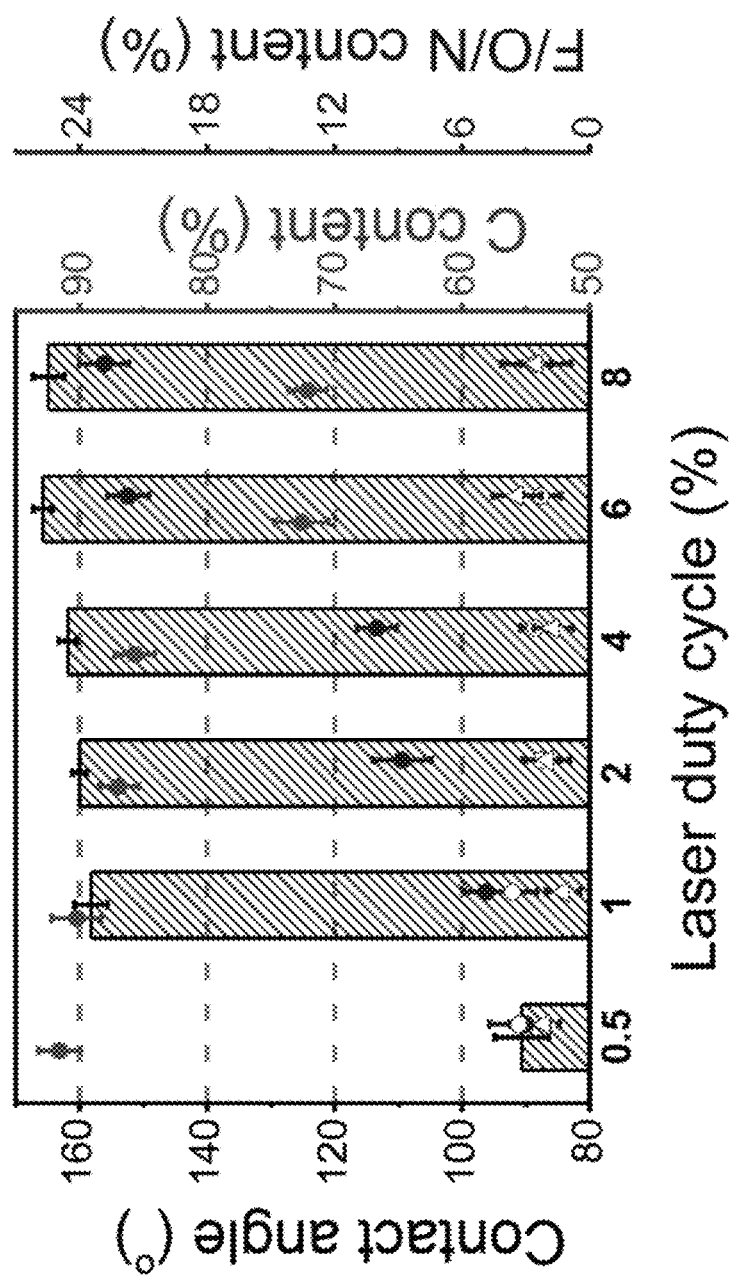
FIG. 25 shows the relationship between contact angle (bars) and C/F/O/N content (red dots, blue dots, blue cycles, blue triangles, respectively) for LIG samples made with $SF_6$ in the chamber with different laser duty cycles. A 9.3 μm $CO_2$ laser was used when $SF_6$ was present. The error bars reflect the difference between various spots of the same sample.
Figure 26B:
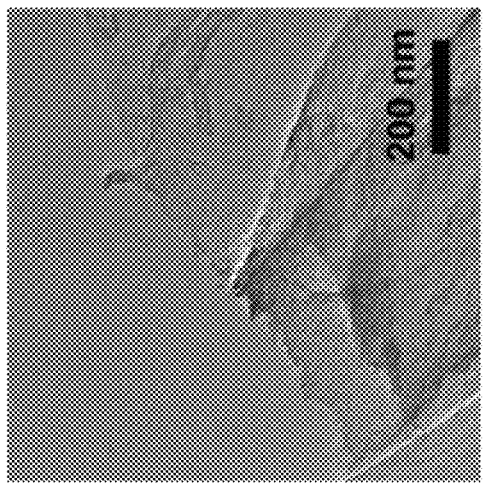
FIGS. 26A-26C show SEM and TEM images of LIG prepared with $SF_6$ (chamber). A 9.3 μm $CO_2$ laser was used when $SF_6$ was present. 4% laser duty cycle is used for this sample.
Figure 26C:
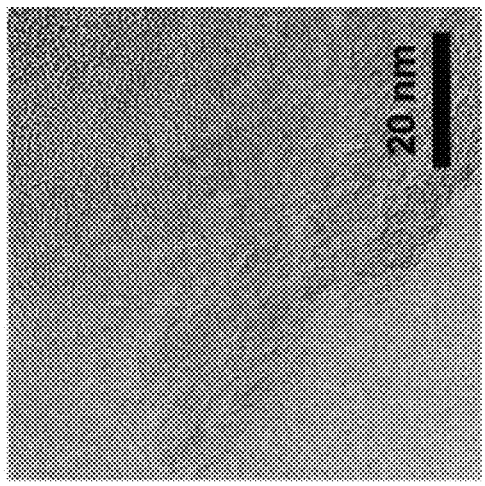
Figure 26A:
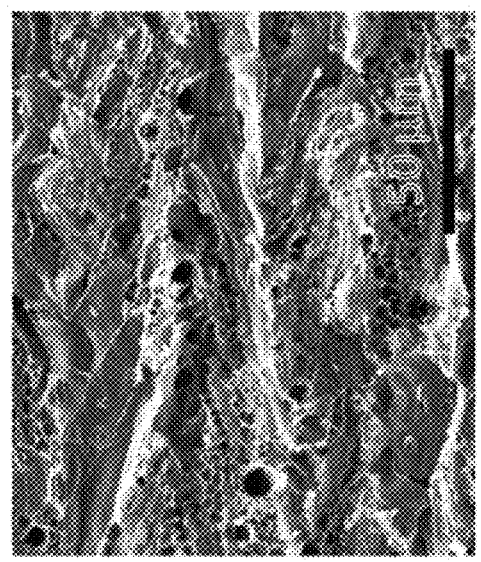

Interestingly, elemental S was also identified by the peak position of the S 2p peak (164.5 eV). The $SF_6$ molecules decomposed under laser irradiation into elemental S that is deposited on LIG surface while active F species functionalized the graphene structures. To further analyze the degree of F-functionalization throughout the entire LIG layer (~40 μm), an XPS depth profile was obtained for the LIG sample, and is shown in FIGS. 24A-24D. It is clearly observed that the F functional groups are mainly distributed on the surface of LIG, possibly due to the limited diffusion of the highly active F species into the porous structures of LIG. The abundance of $CF_2$ (689 eV) decreases much faster than the CF (687 eV) component, as shown in FIG. 24C. Different laser duty cycles were also applied to the LIG made with $SF_6$ in the chamber, and the acquired contact angles and F content are plotted in FIG. 25. Generally, higher laser duty cycles induce higher F content since more active F species are generated. A laser duty cycle of 4% is chosen as the optimal condition since it reaches a high contact angle (162°) but still maintains a relatively high C content of 86%.

Figure 27:
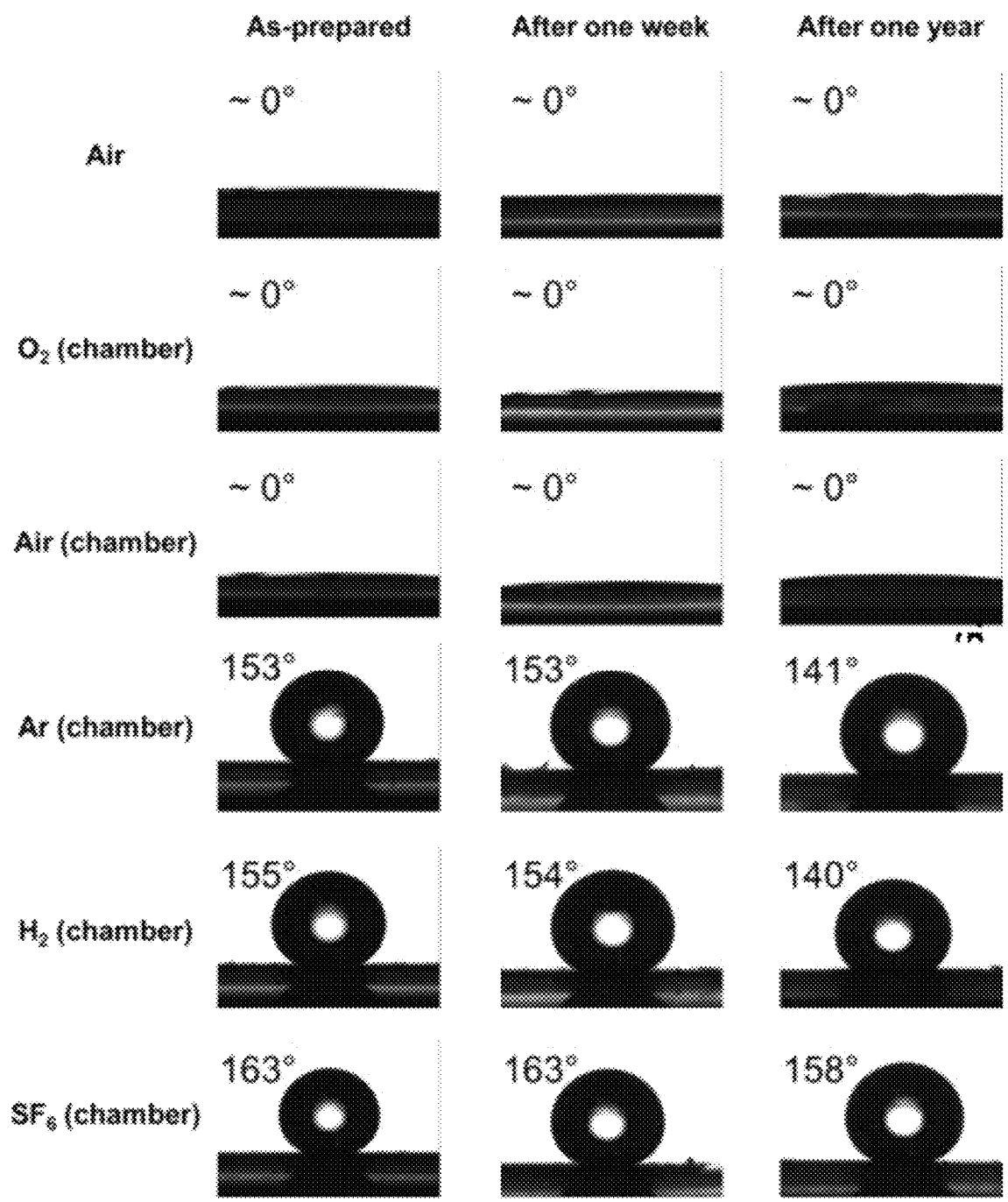
FIG. 27 shows stability of the superhydrophilic/superhydrophobic LIG samples. Contact angles are measured as prepared, after one week in ambient air, and after one year in ambient air.
Figure 29A:
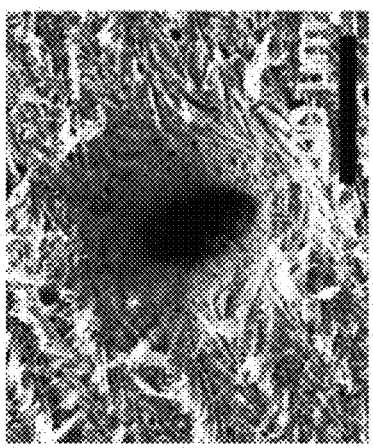
FIGS. 29A-29B are top-view SEM image of LIG filter.
Figure 29B:
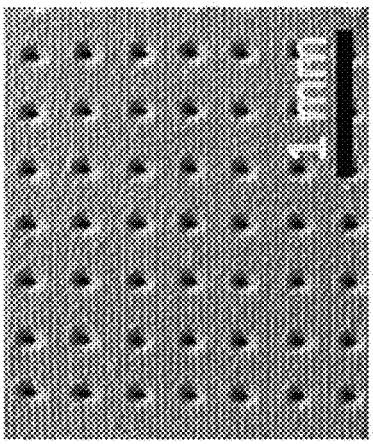
Figure 29C:
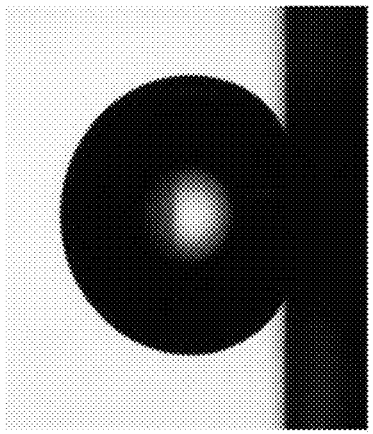
FIG. 29C is a water droplet on the surface of the LIG filter, the measured contact angle is 155°.
Figure 29D:
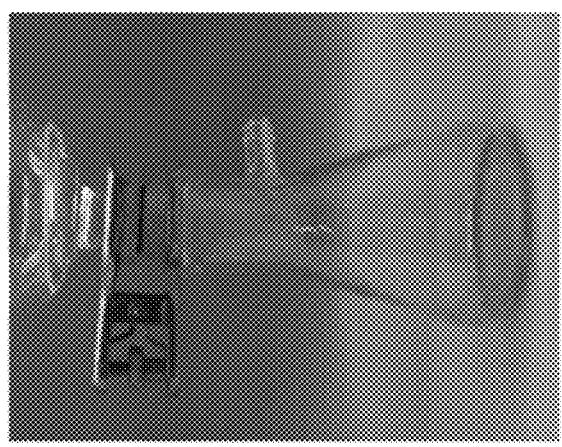
FIGS. 29D-29F are filtration of $CHCl_3/H_2O$ mixture with the LIG filter. A $CHCl_3$-soluble blue dye is used for oil phase visualization.
Figure 29E:
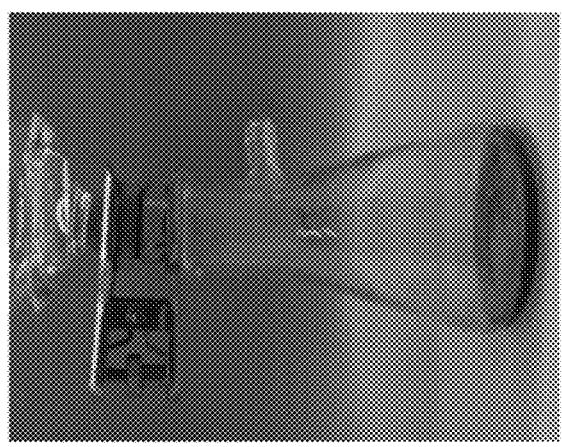
Figure 29F:
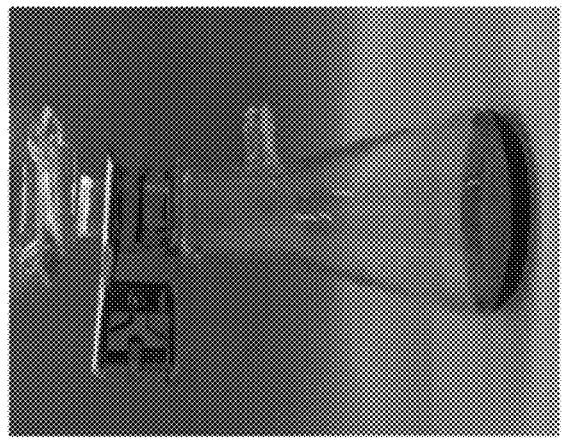
Figure 30A:
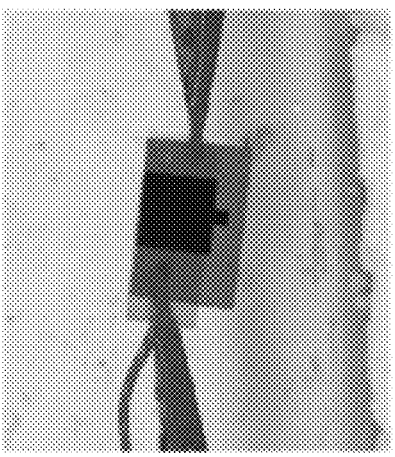
FIGS. 30A-30F show the anti-icing properties of LIG.
Figure 30B:
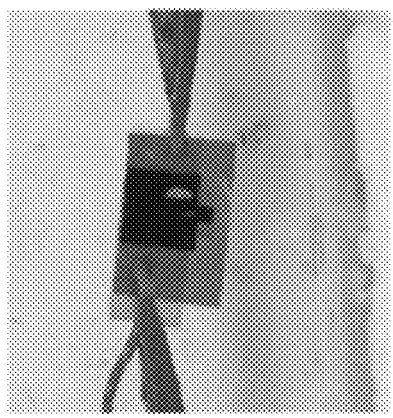
Figure 30C:
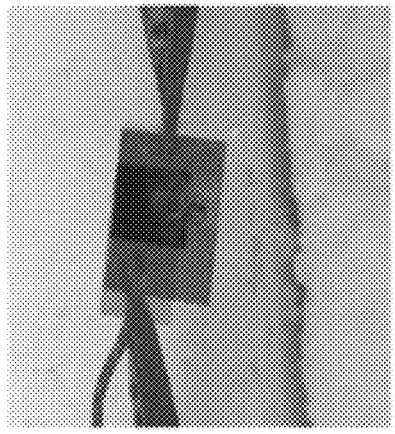
Figure 30D:
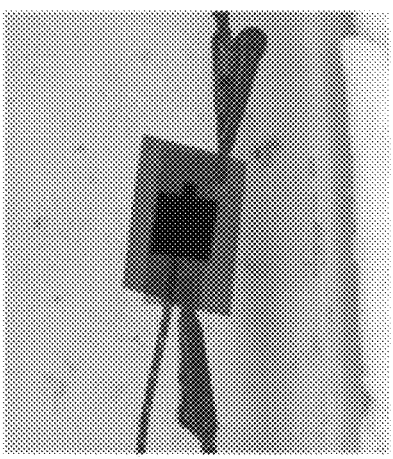
Figure 30E:
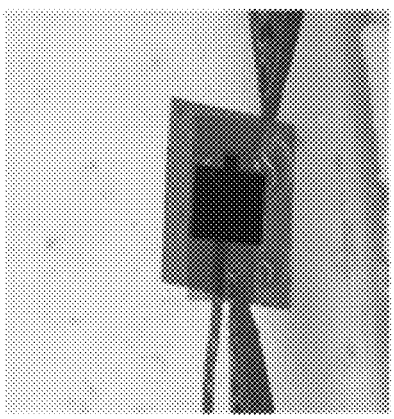
Figure 30F:
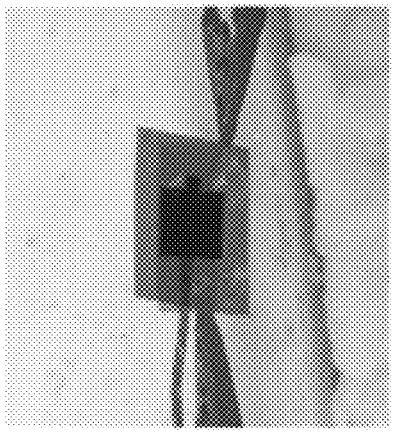

To evaluate the stability of various superhydrophilic or superhydrophobic LIG surfaces obtained under different fabrication conditions, the inventors of the present invention re-tested the contact angles of the LIG samples after being under ambient conditions for one week and one year, and the results are shown in FIG. 27. As shown, the superhydrophilicity was maintained after one year, while the superhydrophobicity remained unchanged after one week, with slight decreases in contact angles observed if kept in the air for extended periods of time.

Also, to evaluate the robustness of the superhydrophobic LIG, the inventors of the present invention performed different surface treatments for the LIG made with Ar in the chamber; the superhydrophobicity was maintained with: 1) blowing air at the surface for 1 min; 2) bending 100 times; 3) soaking in ethanol for 1 min; or 4) soaking in acetone for 1 min. However, the LIG tends to come off from the PI surface if sonicated in water for 1 min, and becomes superhydrophilic if treated with $O_2$ plasma for 10 s. This post $O_2$ plasma modification could make the patterning of two disparate surfaces (superhydrophobic next to superhydrophilic) via masking and exposure a highly desirable quality of this technique. In general, the superhydrophobic LIG samples has shown good stability and robustness, while the superhydrophobicity was lost with intense treatments such as sonication or surface oxidation, both of which are expected to affect the morphology or graphene-like nature of the LIG materials.

Another important parameter to evaluate towards hydrophobicity is the hysteresis between the advancing contact angle and receding contact angle. [Gao 2006]. FIGS. 28A-28F show the advancing and receding contact angles for three kind of superhydrophobic samples demonstrated: LIG made with Ar in the chamber shows the highest hysteresis of 12° in contrast to 4° and 5° for LIG made with $H_2$ and $SF_6$, respectively. This difference results from the lower O content for LIG made with $H_2$, and the F-functionalization for LIG made with $SF_6$.

While superhydrophobic structures and surfaces could have varied applications [Zhang 2008], two examples, water/oil separation and anti-icing, are demonstrated in FIGS. 29A-29F and FIGS. 30A-30F. For water/oil separation (FIGS. 29A-29F), a LIG filter is produced by first using a high laser power (a laser duty cycle of 10% at a rastering speed of 3 cm/s) to create ~100 μm holes in the PI sheets, and then using Ar in the chamber to afford a superhydrophobic surface on the porous substrate. Interestingly, despite the existence of the ~100 μm holes, the LIG filter still maintains a high contact angle of 155°, which allows $CHCl_3$ to pass through the filter while water is repelled. The video of the separation process was shown in a third video taken (available at top-level domain name www.youtube.com (at subdomain watch?v=D1vexX-ZjVA)).

For the anti-icing application (FIGS. 30A-30F), the comparison is made between superhydrophilic LIG made with air assist and superhydrophobic LIG made with Ar in the chamber. At −15 to −20° C., the water droplet (~0° C.) sticks on the surface of LIG made in air even though tilted at 45°, and ice consequentially forms. Conversely, LIG made with Ar in the chamber, being superhydrophobic, does not permit freezing to ensue. Ice forms only on the PI substrate, similar to the case of F-functionalized GNRs. [Wang 2016].

Figure 31A:
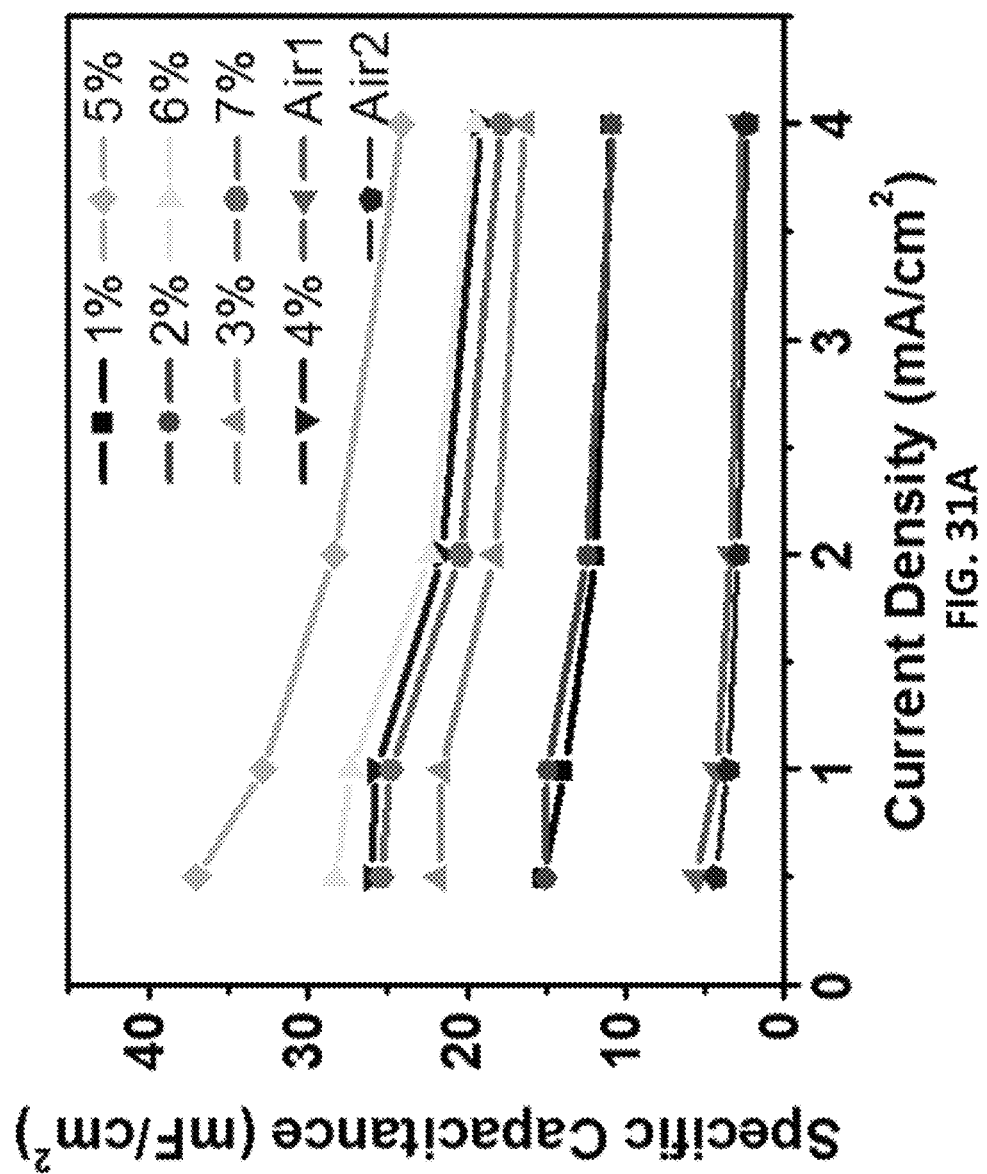
FIGS. 31A-31B show the specific capacitances of supercapacitors made from LIG samples made with $O_2$ in the chamber (different laser duty cycles) and with air (2% laser duty cycle). The X % in the label in FIG. 31A stands for the laser duty cycle of LIG samples made with $O_2$ in the chamber. "Air1" stands for air assist, "Air2" stands for air in the chamber.
Figure 31B:
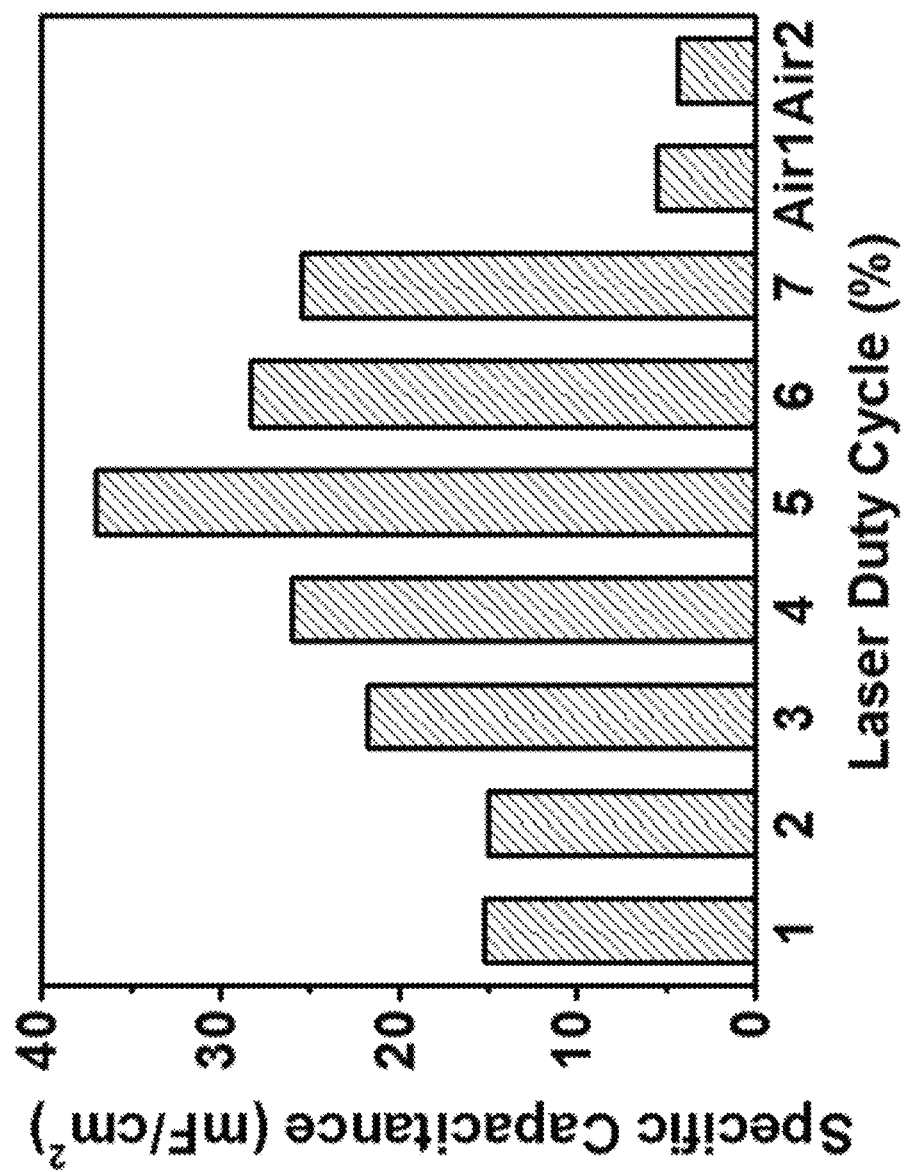

FIGS. 14A-14D show the performance of LIG microsupercapacitors fabricated with LIG made with air in the chamber compared to $O_2$ in the chamber. [Lin 2014; Peng I 2015; Peng II 2015]. LIG microsupercapacitors made with $O_2$ in the chamber has a significantly improved specific capacitance (3×), energy density, and power density when compared with the LIG sample made with air in chamber under the same laser duty cycle of 2%. This performance can be further improved by increasing the laser duty cycle to 5% with $O_2$ in the chamber where a specific capacitance of 37 mF/cm$^2$ was achieved (FIGS. 31A-31B). The increased performance should partially result from the enhanced hydrophilicity that provides better contact with the $H_2SO_4$/PVA electrolyte. [Li 2016].

Another important factor is the increased degree of defects and active sites when using $O_2$ in chamber, as observed in the Raman spectra in FIGS. 12A-12E. This is expected to improve the charge storage performance of graphene materials, as is described theoretically and experimentally. [Lin 2014]. In general, the enhancement in supercapacitor performance underscores the utility of the controlled atmosphere chamber for LIG preparation.

Accordingly, the inventors of the present invention have successfully demonstrated the fabrication of LIG under various gas atmospheres with a home-made controlled atmosphere chamber device. LIG samples with different surface morphologies and surface chemistries have been obtained, thus generating superhydrophilic or superhydrophobic LIG surfaces depending on the gas environment introduced. The as-produced LIG structures can be directly used for improved microsupercapacitors, oil/water separation, and anti-icing films, all afforded by the varied surface properties in the LIG. This laser fabrication method in controlled gas atmospheres will allow for further broad-based LIG materials development.

The flow rates of the gas can depend on the capability of the flow controller. In some embodiments, an adjustable flow rate was used between 0 and 1000 sccm. Any kind of gas mixtures can be used as soon as it is safe to do so, with examples including Ar/$H_2$, Ar/$SF_6$, $H_2$/$SF_6$, Ar/$NH_3$, $H_2$/$NH_3$, or even three- or more-component-mixtures. The ratio of the gas mixtures can be controlled by adjusting the flow rate of each individual gas. The pressure range can be between 0 to 2 bar due to safety concerns (ZnSe window can only withstand a certain pressure with certain thickness), yet higher pressure ranges can be achieved with a thicker ZnSe window. The material of the window is not limited to ZnSe, other materials (quartz, etc.) can be used as long as it does not block the laser at certain wavelengths (10.6 μm, 9.3 μm, 1.06 μm, etc.). The size of atmosphere chamber can also be adjusted depending on the application of interest. For instance, an atmosphere chamber of ~20 cm diameter (with a 12×12 cm ZnSe window) has been utilized in embodiments of the present invention. Precursors used in this atmosphere chamber include polyimide and other carbon precursors mentioned above, as well as other types of materials (such as metal, for example).

Further Details for Fabrication of LIG Samples Under Different Gas Atmospheres

Figure 32:
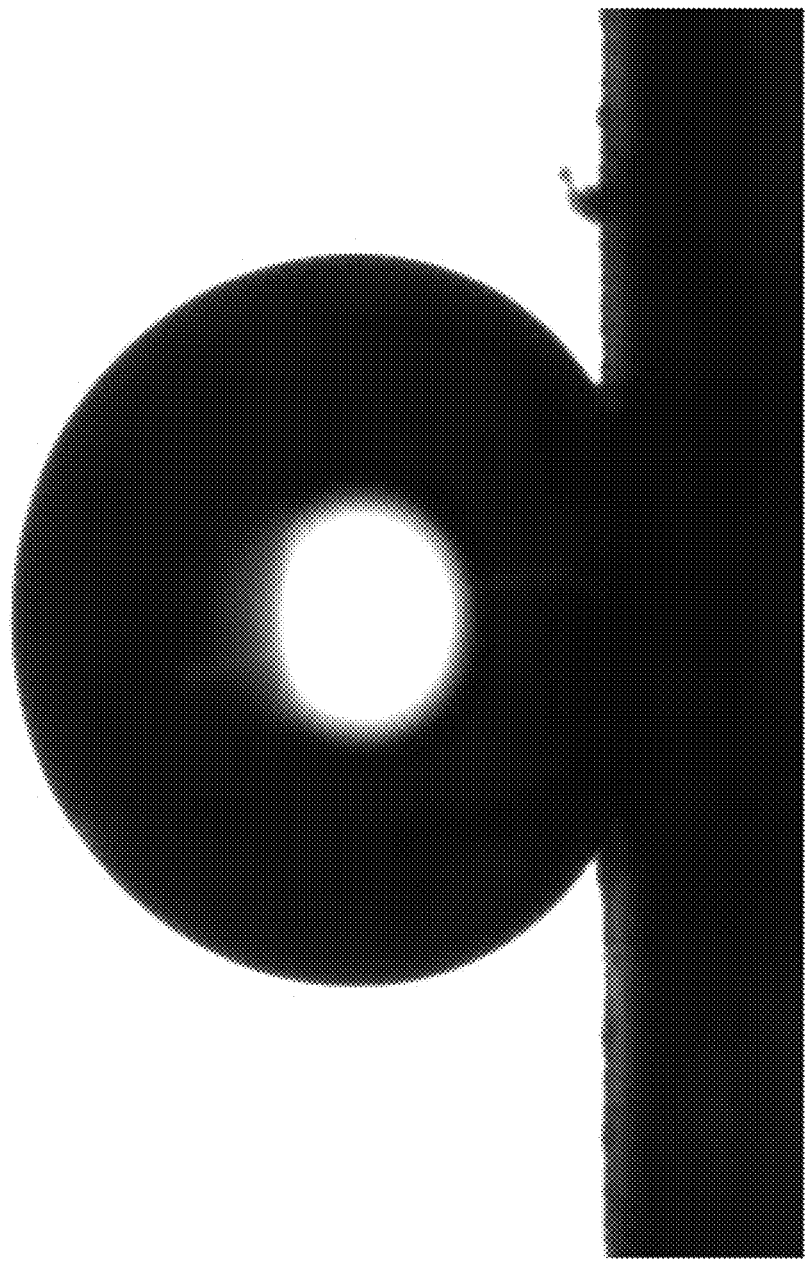
FIG. 32 shows the water droplet appearance on the LIG surface prepared with $N_2$ in the chamber using 2% laser duty cycle. The measured contact angle is 153°.

Fabrication of LIG in different gas atmospheres. Laser induction was conducted on commercial PI (Kapton®, thickness 127 μm, McMaster-Carr, catalog #2271K6) film with a XLS10MWH (Universal Laser Systems) laser platform, equipped with a 10.6 μm $CO_2$ pulsed laser (75 W) and a 9.3 μm $CO_2$ pulsed laser (50 W). The same image density of 1000 pulses/inch in both axes and a scan rate of 15 cm/s were used for all experiments. Typically, the laser duty cycle of 2% is used for the fabrication of LIG, but different laser duty cycles have been used for specific experiments. Laser duty cycle is the percentage of time that the laser is turned on at the rated power for each laser spot; the laser is turned off for the rest of the time. 2% laser duty cycle is also referred to as 2% laser power in the control software of the laser platform, and it can be understood as the average laser power over the duration of each laser spot. For LIG made with gas assist (air or 3% $H_2$/Ar mixture), a nozzle provided with the instrument was used to blow the selected gas towards the laser spot, while the general atmosphere within the laser platform was still air at ambient pressure, as shown in FIG. 10A. For LIG made with the controlled atmosphere chamber ($O_2$, air, Ar, $H_2$, or $SF_6$), a controlled atmosphere chamber was used to allow different gases to flow through the chamber at 1 atm while synthesizing the LIG. A ZnSe window (thickness 6 mm) is mounted on top of the chamber to allow the $CO_2$ laser to irradiate the PI film, as shown in FIG. 10B. The flow rates used were ~140 sccm for $O_2$, ~140 sccm for air, ~125 sccm for Ar, ~175 sccm for $H_2$, and ~70 sccm for $SF_6$, all at ambient pressure. Note that Ar can be replaced by $N_2$ as the inert gas, and FIG. 32 shows the superhydrophic LIG surface prepared with $N_2$ in the chamber. The LIG made with $SF_6$ in the chamber sample was prepared with the 9.3 μm $CO_2$ laser; all other samples were made with the 10.6 μm $CO_2$ laser.

Characterization. SEM images were taken with a FEI Quanta 400 ESEM. TEM characterizations were performed using a 200-kV JEOL 2100 Field Emission Gun TEM. Raman spectra were recorded with a Renishaw Raman RE01 scope with 514 nm laser. XPS was performed on a PHI Quantera SXM scanning X-ray microprobe with 200 μm beam size and 45° takeoff angle, and calibrated using C 1s at 284.5 eV.

Fabrication and electrochemical characterizations of LIG microsupercapacitors. LIG was patterned into interdigitated electrodes with a length of 4.1 mm, a width of 1 mm, and a spacing of ~300 μm between two neighboring microelectrodes. Colloidal silver paint was applied on the common areas of both electrodes for better electrical contact, and the electrodes were extended with conductive copper tape. A Kapton® PI tape was employed followed by an epoxy sealing to protect the common areas of the electrodes from electrolyte ($H_2SO_4$/PVA polymeric gel), which was later applied on to the active area of the microsupercapacitor devices and dried in a vacuum desiccator. The electrochemical performances of the microsupercapacitors were characterized by CV and galvanostatic charge-discharge experiments using an electrochemical station, and the specific capacitance, energy density, and power density were calculated as previously reported. [Lin 2014; Peng I 2015; Peng II 2015; Li 2015].

Utility and Variations

The present invention provides a process to tune the properties of LIG by changing the gas atmosphere of the LIG fabrication process. The superhydrophobic LIG obtained from this invention can be used for water repelling applications such as oil/water separation, anti-icing films, or other related areas. The LIG prepared with $O_2$ in chamber can be used as improved electrodes for high-performance supercapacitors or other related applications. Other areas of application are also possible depending on the gas atmosphere and properties of LIG.

Variations in this invention may include but are not limited to: different kinds of gases used in the fabrication process including mixed gases, differing pressures, use of a vacuum (reduced pressures from 1 atm to $10^{-8}$ Torr), higher pressures (>1 atm up to 375 atm), different gas pressure and flow rate, different substrates, different laser conditions, or any variations of the invention deemed logical extensions of the invention.

Further information regarding the present invention is set forth in the inventors paper Y. Li et al., "Laser-Induced Graphene in Controlled Atmospheres. From Superhydrophilic to Superhydrophobic Surfaces," *Adv. Mat.* 2017, 29(27), 1700496 and supporting information, which are hereby incorporated by reference in their entirety for all purposes.

Laser-Induced Graphene From Polysulfones

Graphene is formed on the surface of laser-irradiated aromatic polysulfones (the class of polymers having aryl-S($=O)_2$-aryl in the repeat unit). In particular, experimental results reported below indicate that the following three polymers produce LIG:

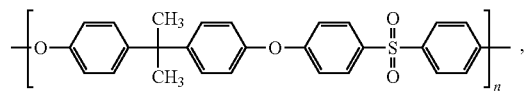

referred herein as "polysulfone" or "PSU;"

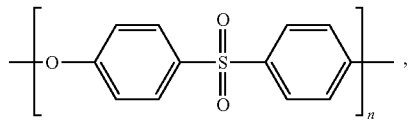

referred herein as "polyethersulfone" or "PES;" and

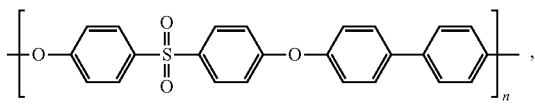

referred herein as "polyphenylsulfone" or "PPSU."

Hereinafter the term "aromatic polysulfone" refers to any polymer with the aryl-S($=O)_2$-aryl subunit, whereas the term "polysulfone" indicates specifically the polymer depicted above.

One aspect of the invention therefore relates to a process including irradiating aromatic polysulfone (e.g., polysulfone, polyethersulfone, or polyphenylsulfone, abbreviated PSU, PES, and PPSU respectively) with laser to form graphene on the surface of the polymer, and optionally separating the so-formed graphene from the polymer.

The PSU-LIG and PES-LIG and PPSU-LIG prepared by the foregoing process form another aspect of the invention. That is, the invention provides an aromatic polysulfone having graphene on its surface. More specifically, the LIG is sulfur-doped graphene. In the aromatic polysulfone starting material, sulfur is present solely in the form of —C—S($=O)_2$—C— functional groups. The laser-induced graphene fabrication method of the invention causes the incorporation of sulfur into the graphene, that is, the formation of —C—S—C— and/or C—S—H bonds. Therefore, a specific material afforded by the fabrication method of the invention is an aromatic polysulfone having sulfur-doped graphene on its surface.

Polysulfone, polyethersulfone, and polyphenylsulfone are highly used in numerous applications including medical, energy and water treatment and they are critical components of polymer membranes. It has been shown that LIG fabrication on PSU, PES, and PPSU results in conformal sulfur-doped porous graphene embedded in polymer dense films or porous substrates using reagent- and solvent-free methods in a single step. It has further been demonstrated that such materials are applicable as flexible electrodes with enhanced electro-catalytic hydrogen peroxide generation, as antifouling surfaces and as antimicrobial hybrid membrane-LIG porous filters. The properties and surface morphology of the conductive PSU-, PES-, and PPSU-LIG can be modulated using variable laser duty cycles. The LIG electrodes showed enhanced hydrogen peroxide generation compared to LIG made on polyimide, and showed exceptional biofilm resistance and potent antimicrobial killing effects when treated with *Pseudomonas aeruginosa* and mixed bacterial culture. The hybrid PES-LIG membrane-electrode ensured complete elimination of bacterial viability in the permeate (6 log reduction), in a flow-through filtration mode at a water flux of ~500 L m$^{-2}$ h$^{-1}$ (2.5 V) and at ~22000 L m$^{-2}$ h$^{-1}$ (20 V). Due to the widespread use of PSU, PES, and PPSU in modern society, these functional PSU-, PES-, and PPSU-LIG surfaces have great potential to be incorporated into biomedical, electronic, energy and environmental devices and technologies.

It has further been shown that LIG can be fabricated from PSU, PES and PPSU under ambient conditions, producing LIG layers doped with sulfur due to the inherent sulfur content in the polymers. The applicability was demonstrated as electrodes on dense polymer films as well as on prefabricated porous polymer membranes. It has also been shown that LIG derived from these polymers and that their incorporation into devices enhanced electrical, antibacterial and anti-biofilm activity. Moreover, since these materials are the backbone of the membrane filtration technology, we demonstrate a flow-through membrane device with active microbial killing. This is of significant importance for membrane technology due to the persistent fouling challenges inherent to membrane processes. Since sulfur doped graphene has already proven to be a superior electro-catalyst for oxygen reduction reactions used in fuel cells and batteries, this invention might facilitate added functionality in such devices, especially imparting biofilm resistance. These electrodes and membranes might also be effectively used for cathodes in microbial fuel cells, to address the challenge of biofilm formation and lower performance. Moreover, due to its high electrical and thermal conductivity and the versatility of the polymer substrate materials, incorporation of LIG into energy, medical, and environmental applications is now possible.

LIG Fabricated on PSU, PES, and PPSU Polymers

FIG. 34A illustrates PSU, PES and PPSU polymers (PSU-class polymers) sheets irradiated using a CO$_2$ laser (10.6 μm) in ambient atmosphere to produce conformal LIG fixed in the underlying polymer matrix. PSU-LIG, PES-LIG and PPSU-LIG laser induction was conducted on PSU, PES, and PPSU sheets (~100 μm thickness) made from commercial polymer pellets obtained from BASF (Ultrason, PSU (S 6010, 60 kD); PES (E 6020P, 75 kD); PPSU (P 3010, 48 kD)). For thin films of PSU and PES, the polymer pellets (2.5 g) were dissolved in dichloromethane (20 mL) and the solution was poured into a glass Petri dish (inner diameter 11.5 cm). To slow the evaporation of the dichloromethane, an inverted funnel was placed on top of the petri dish. For PPSU, the polymer pellets (2.5 g) were dissolved in DMF (20 mL) and the solution was poured into the glass Petri dish (inner diameter 11.5 cm). The solvent was evaporated under vacuum at 60° C. When the solvents were evaporated, the films were removed and measured to have an average thickness of 94.6±5.5 μm for PES, 102.5±4.2 μm for PSU, and 106.6±7.4 μm for PPSU. For the generation of LIG on the surfaces, a VLS 3.50 (Universal Laser Systems) laser platform, equipped with a 10.6 μm CO$_2$ pulse laser (50 W, 2.0 inch Lens Kit) was used. An image density of 70 PPI (pulses per inch) and a scan rate of 25% were used for all experiments with variable laser duty cycle (5.0 to 9.0%). For PES-LIG and PPSU-LIG the laser was focused, while for PSU-LIG, the laser was defocused by 0.4 cm, meaning that the PSU film was moved 0.4 cm closer to the cutting lens from a focused position. PSU-LIG, PES-LIG and PPSU-LIG were made in ambient conditions in the presence of air. The general atmosphere within the laser platform was still air (1 atm). A nozzle provided with the instrument was used to blow air towards the laser spot.

The importance of the synthesis of LIG on PSU-class polymers in ambient atmosphere lies in the widespread use of PSU-class polymers in biomedical, energy and water treatment technology, generating embedded graphene coatings inherently doped with sulfur. The conductive, inherently black LIG on the PSU-class polymers can be simply patterned in any shape on the flexible polymer films. See FIG. 34B. The laser spot focus was utilized to generate LIG on PSU films. In this case, LIG was formed when the substrate was brought closer to the cutting lens giving a defocused spot. In contrast, PES-LIG and PPSU-LIG were made with a focused laser spot on the substrate surface.

As shown in FIG. 34C, the X-ray diffraction (XRD) pattern of PSU-, PES- and PPSU-LIG showed peaks at 25.9° (2θ) for the 002 plane and a second peak at 42.9° (2θ), which corresponded to the 100 plane. The peak at 25.9° (2θ) gave an interlayer spacing (Ic) of 3.4 Å and indicated a high level of graphitization, and the peak at 42.9° (2θ) was associated with an in-plane structure. The peak at 25.9° (002) shows asymmetry and with tailing at smaller 2θ angles also points to an increased Ic. It was calculated that the crystalline sizes along the c axis (Lc) and domain size along the a axis (La) for all three LIG types using equations (1) and (2) and are shown in TABLE 2 (crystalline sizes of PSU class LIGs along c axis (Lc) and domain size in the a axis (La)). The highest Lc was found for PSU-LIG (6.4 nm), whereas La was highest for PPSU-LIG (7.8 nm).

$$Lc = \frac{0.89\lambda}{B_{1/2}(2\theta)\cos\theta} \qquad (1)$$

$$La = \frac{1.84\lambda}{B_{1/2}(2\theta)\cos\theta} \qquad (2)$$

TABLE 2

| Materials | Lc (nm) | La (nm) |
|---|---|---|
| PSU | 6.4 | 7.6 |
| PES | 4.2 | 7.2 |
| PPSU | 4.2 | 7.8 |

As shown in FIG. 34D, the Raman spectra of PSU-class LIG shows characteristic peaks for graphene at ~1,350 cm$^{-1}$ (D peak), ~1,580 cm$^{-1}$ (G peak) and ~2,700 cm$^{-1}$ (2D peak). The D peak induced by defects in sp$^2$ carbon bonds, the G peak is the first order allowed peak, whereas the 2D peak originates from second order zone-boundary phonons. The 2D peaks of PSU-, PES- and PPSU-LIG were fitted to only one Lorentzian peak centered at 2,700 cm$^{-1}$, similar to single layer graphene. Larger full widths at half maxima for PSU-LIG (~117 cm$^{-1}$), PES-LIG (~87 cm$^{-1}$) and PPSU-LIG (~94 cm$^{-1}$) were observed. A high degree of graphene formation is supported by the D/G intensity ratio for the PSU-class LIGs, and the 2D/G intensity ratio observed between 0.5-0.6 indicated good graphitization in the PSU-class of LIG. As shown in FIG. 34E, X-ray photoelectron spectroscopy (XPS) gives the material surface chemical composition information of the elements with electronic state and showed C1s, O1s and S2p peaks for the LIG at ~285.5 eV, ~534 eV and ~167 eV, respectively. This confirmed the sulfur content in the graphene. The ratio of the intensity of the C1s and O1s peaks (C/O of 13.21, 9.75 and 9.03) for PSU-, PES- and PPSU-LIG, respectively, indicated that PSU-LIG had significantly lower oxygen content compared to PES- and PPSU-LIG.

The SEM images at different resolutions show the highly porous foam-like structure for the PSU-class LIG. The morphology of the LIG is highly dependent on the fabrication conditions, but morphology of PSU-LIG (FIGS. 35A-35C) was notably different compared to PES-LIG (FIGS. 35E-35G) and PPSU-LIG (FIGS. 35I-35K). It was observed that the obtained PSU-LIG was less porous as compared to the PES- and PPSU-LIG. Cross-sectional SEM images supported this observation where PES- and PPSU-LIG show a highly porous structure compared to PSU-LIG (FIGS. 35C, 35G, and 35K). Fiber-type structures were seen with increased laser duty cycles for PES- and PPSU-LIG. Similarly, with a higher laser duty cycle, porosity of all LIG increases. Similar to LIG made from polyimide, TEM images for the PSU-class LIG shows wrinkles of graphene layers on the surfaces (FIGS. 35D, 35H, and 35L, and high resolution images of TEM show the graphene fringes and the characteristic d-spacing (0.34 nm).

Figure 36A:
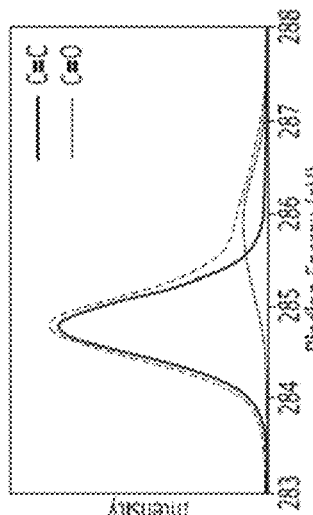
FIGS. 36A-36I are high-resolution XPS spectra de-convolution of PSU-, PES- and PPSU-LIG and the corresponding polymer substrate. C1s de-convolution for (FIG. 36A) PSU-LIG.
Figure 36B:
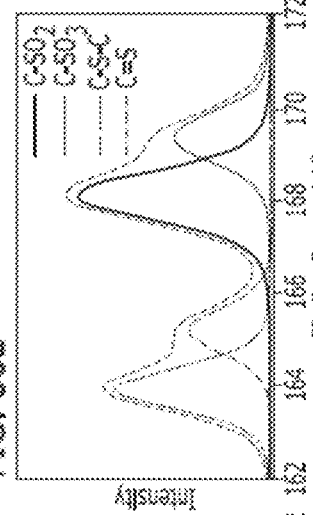
Figure 36C:
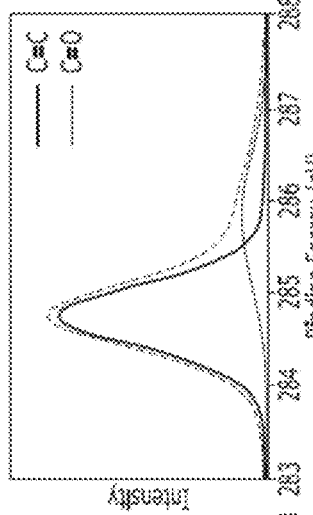
Figure 36D:
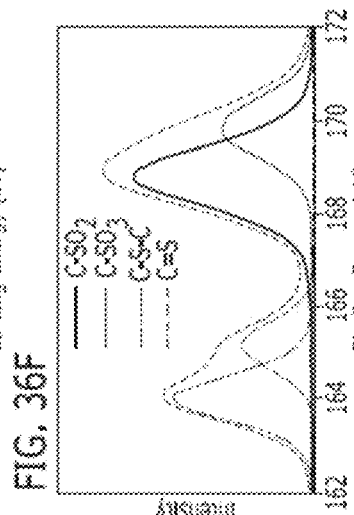
Figure 36E:
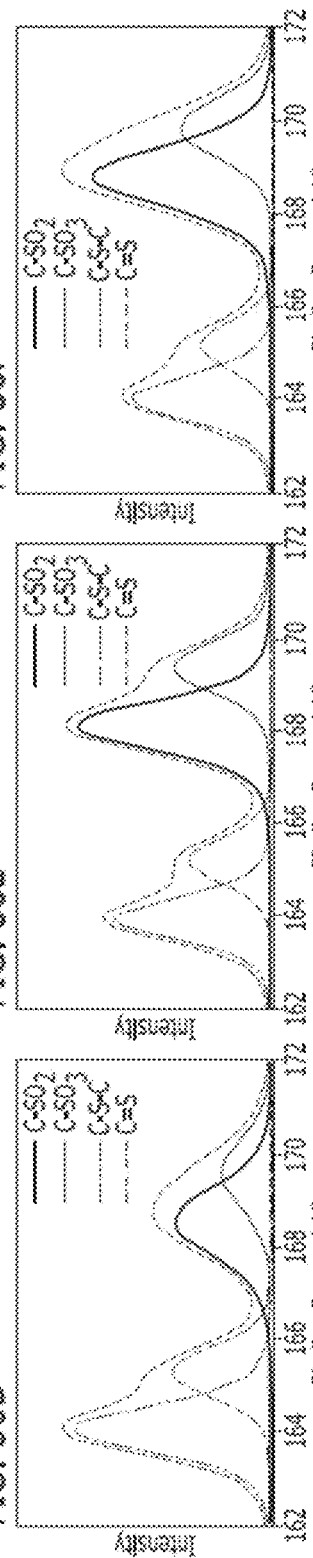
Figure 36F:
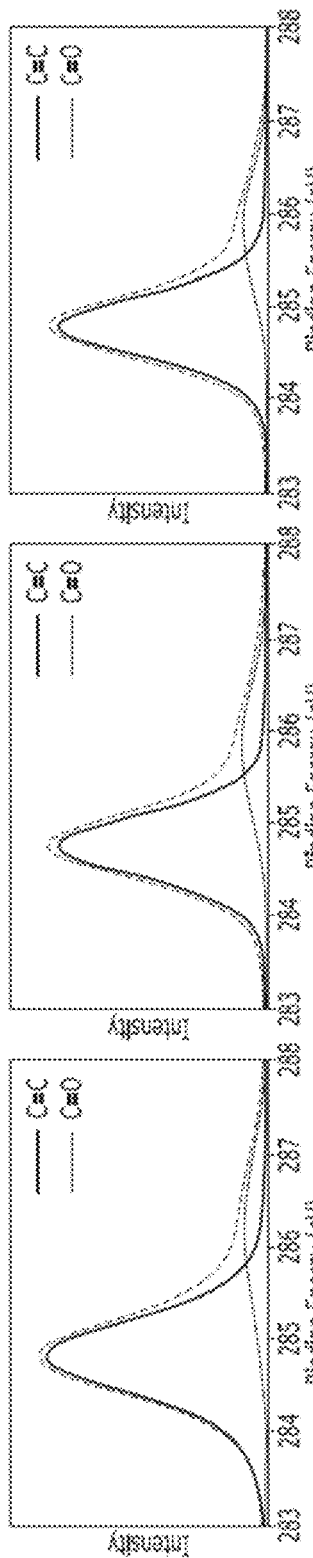
Figure 36G:
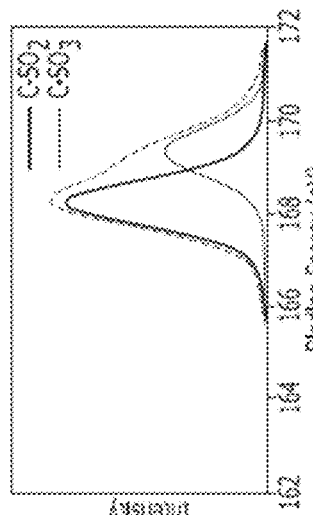
Figure 36H:
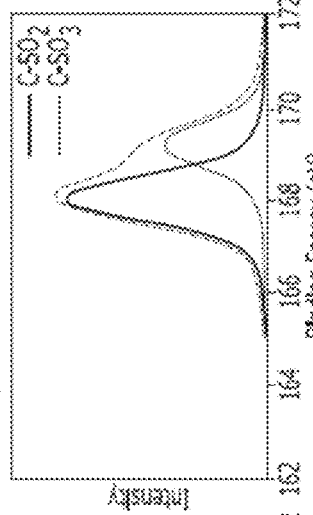
Figure 36I:
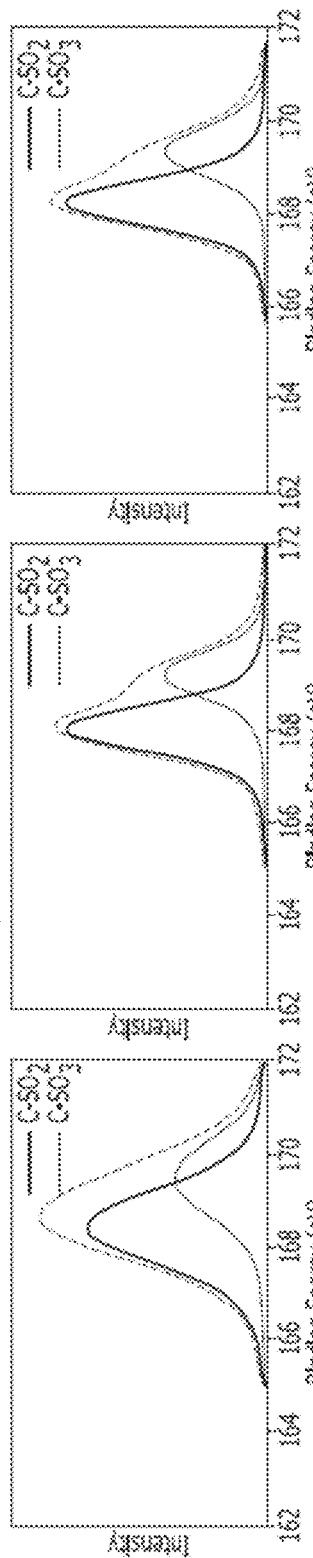

The sulfur content in the graphene material was confirmed using high-resolution XPS spectra and de-convolution of C1s and S2p showed the bonding type present on the surface See FIGS. 36A-36I. For each LIG type, the C 1s gave C=C and C—O at 284.8 eV and 285.8 eV respectively (FIGS. 36A-36C). The S2p spectra showed two kinds of bonding at ~164 eV and ~168 eV, which corresponds to C—S and C—SO$_x$, respectively (FIGS. 36D-36F). Whereas, S2p spectra for the polymer substrate only showed C—SO$_x$ bonding at ~168 eV (FIGS. 36G-36I). The insertion of sulfur in the graphene skeleton can be explained as C—S—S and —C=S bonding at 163.9 eV and 165.3 eV, respectively. The overall sulfur content measured for PSU-, PES-, and PPSU-LIG were 3.3, 1.6 and 2.6%, respectively.

Hydrogen Peroxide Generation

Figure 37A:
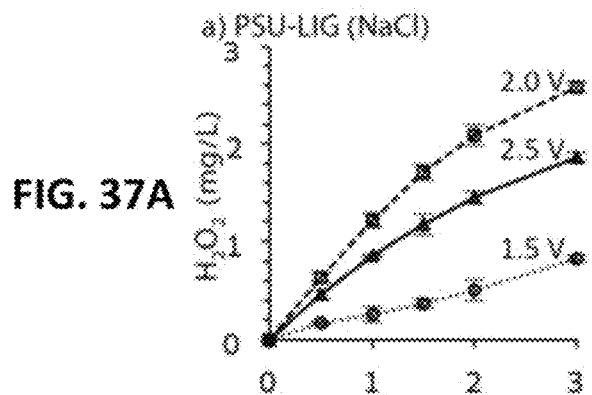
FIGS. 37A-37F show hydrogen peroxide generation at 1.5-2.5 V with different PSU-class LIG as electrodes. Using aqueous NaCl (0.05 M) (FIG. 37A) PSU-LIG.
Figure 37B:
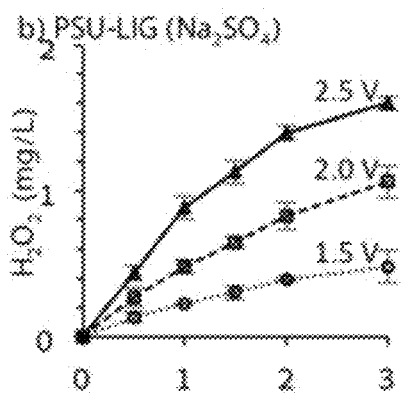
Figure 37C:
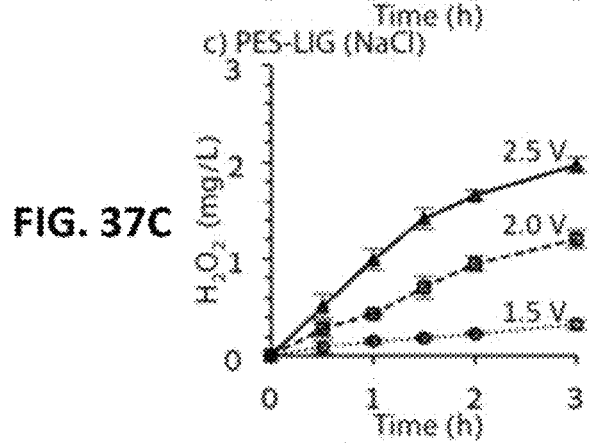
Figure 37D:
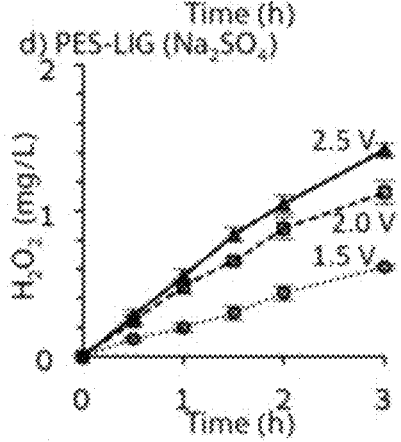
Figure 37E:
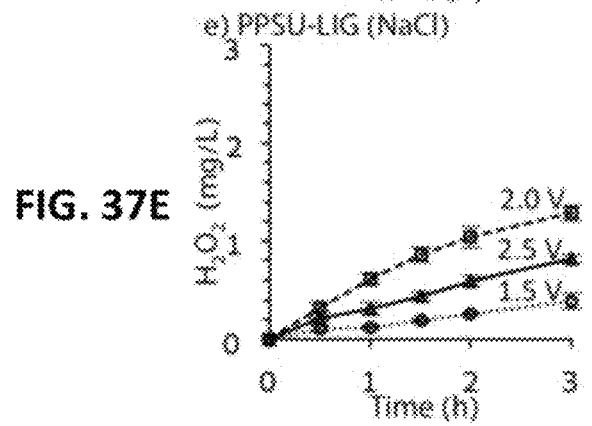
Figure 37F:
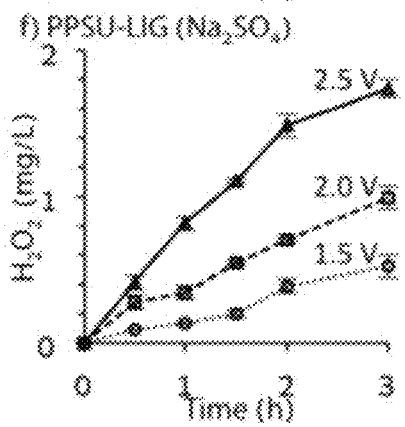

Hydrogen peroxide ($H_2O_2$) has wide interest in the energy and environmental technology in fuel cells, as a propellant in rocketry, and as a strong oxidizer and disinfectant. $H_2O_2$ generation was shown using PSU-class LIG at different voltages in 0.05 M NaCl and 0.05 M $Na_2SO_4$ as electrolytes See FIGS. 37A-37F. The highest amount of $H_2O_2$ was observed using electrodes made from PSU-LIG at 2.0 V (FIG. 37A) using aqueous NaCl as the electrolyte. This material contained the highest amount of sulfur compared to the LIG derived from PES and PPSU, which might be attributed to the differences in preparation method. The $H_2O_2$ generation in $Na_2SO_{4(aq)}$ was directly proportional to the voltage (FIGS. 37C-37E), whereas in $NaCl_{(aq)}$, we observed that the highest $H_2O_2$ generation was at 2.0 V with PSU- and PPSU-LIG and at 2.5 V for PES-LIG. In this case, active chlorine generation at higher voltages can rapidly react with $H_2O_2$ resulting in optimal conditions at a lower applied voltages. The enhanced $H_2O_2$ production as compared to LIG made from polyimide indicates that the sulfur-doped PSU-class LIG might be advantageous in many energy and environmental applications. Compared to graphite electrodes, $H_2O_2$ was not measured in either tested electrolyte in 3 h of measurement. The CV curves for the PSU-class LIG electrodes were recorded in 0.1 M $Na_2SO_4$ and were typical of a non-metal doped LIG sample.

LIG Inhibits Biofilm Growth

Figure 38:
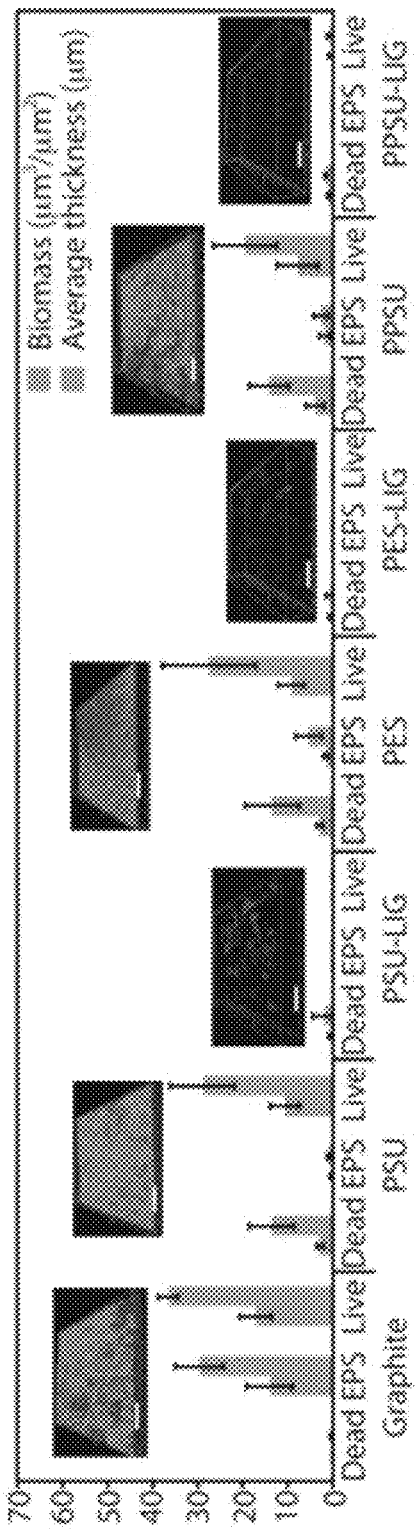
FIG. 38 reflects biofilm growth on graphite, polymer film substrates, and LIG showing average thickness and biomass. Representative IMARIS software images are shown above. These images show live and dead bacteria and extracellular polymeric substances (EPS). Scale bars: 100 μm.
Figure 39A:
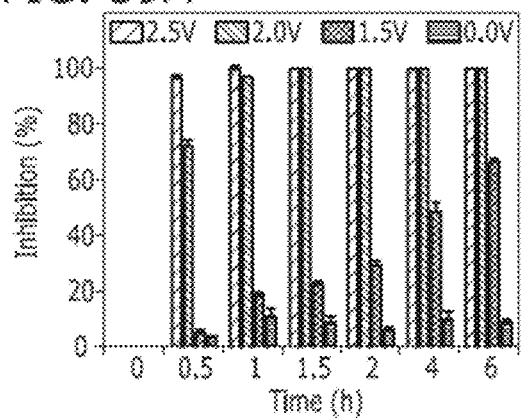
FIGS. 39A-39F show inhibition of *P. aeruginosa* (~$10^6$ CFU $mL^{-1}$) at different voltages (0-2.5 V) expressed as % inhibition or bacterial log reduction by different PSU-class LIG electrodes with (FIGS. 39A-39B) PSU-LIG.
Figure 39B:
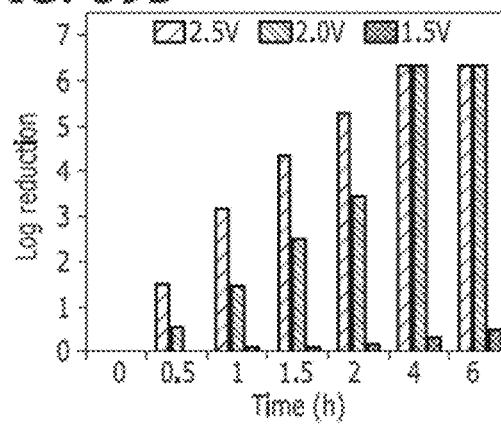
Figure 39C:
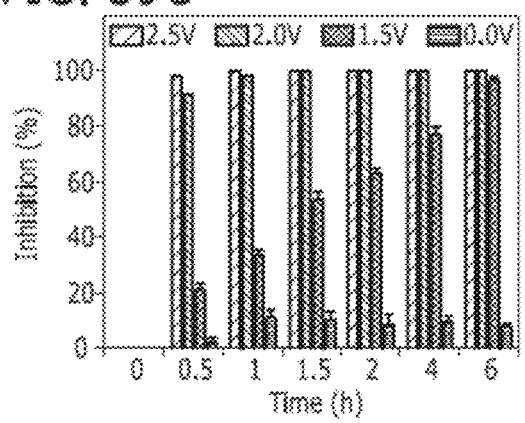
Figure 39D:
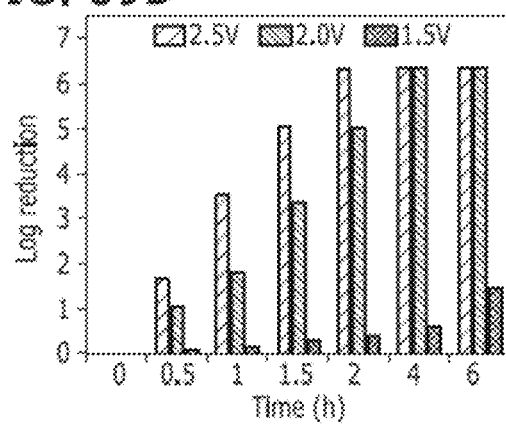
Figure 39E:
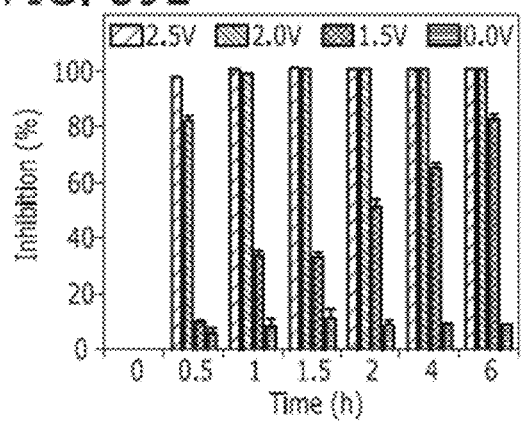
Figure 39F:
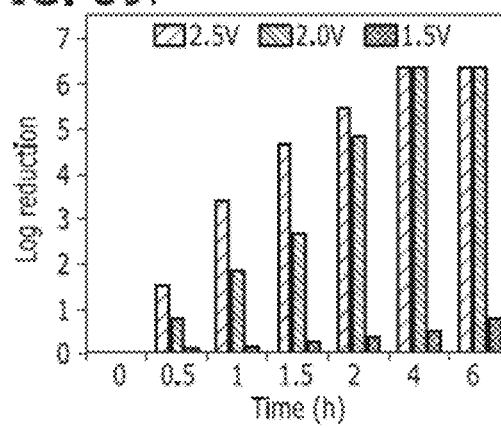

There is exceptional resistance of LIG made from polyimide to biofilm formation. The susceptibility for biofilm formation was investigated on each LIG type (see FIG. 38) and observed extremely bio-film resistant surfaces, similar to polyimide LIG. Experiments were compared to graphite and PSU-class polymer substrates upon which thick biofilm including live and dead bacteria and extracellular polymeric substances (EPS) were observed. Three-dimensional (3D) visualization of the biofilm was imaged with IMARIS-Bitplane software, and represents the averaged quantitative values of biofilm observed. More specifically in FIG. 38, mostly EPS and live biomass were found on the control graphite surface, whereas on the polymer substrates mostly dead and live biomass was observed. The highest biomass ~31 $\mu m^3/\mu m^2$ was observed with the graphite control. LIG surfaces showed exceptionally low amounts of biomass. Since the PSU-class of polymers is one of the most popular synthetic polymer materials used for the fabrication of membranes and used for multiple membrane applications including gas and aqueous separation processes, porous LIG on PSU membranes can tailor the surface properties including fouling-resistance, superhydrophilicity or superhydrophobicity and electrical conductivity.

Important factors for aqueous applications of PSU-class membranes that govern biofilm formation on the surfaces include water wettability and surface charge. The water wettability of the LIG as measured by water contact angle analysis was significantly more hydrophilic (PSU-LIG 44.0°±1.8; PES-LIG 47.5°±1.5 and PPSU-LIG 39.0°±2.1) compared to the polymer substrate (PSU 74.5°±1.9, PES 69.3°±1.2, and PPSU 68.1°±2.9), or graphite (61.3°±6.6). The zeta potentials were determined and we found that all the surfaces were negatively charged. The zeta potential at ~pH 7.4 was between −65 mV to −102 mV for all polymer substrate and LIG surfaces, which were less than the graphite surface (−117 mV). Taken together, the mechanism for low biofilm formation on LIG surfaces was most likely similar to LIG made on polyimide, which was explained as a combination of physical, chemical and biological properties of the LIG surfaces. However, the presently described LIG has similar complex textures to PI-LIG including extremely rough surfaces of variable porosity at the micron-size level, including foam- and fiber-like textures, yet with differing chemical compositions, which might indicate that texture is also an important factor in the mechanism of action. Highly hydrophilic surfaces can absorb less organic matter reducing biofouling. Moreover, the negative surface charge of many bacteria e.g. *P. aeruginosa* (−23.3 mV) might lead to electrostatic repulsion with negatively charged surfaces, although the vulnerability of highly negatively charged surfaces to organic fouling might lead to adverse outcomes.

Antibacterial Action of PSU Class Electrodes

The PSU-class LIG samples were configured as electrodes and were used to decontaminate *P. aeruginosa* $10^6$ CFU/mL) contaminated solutions at voltages ranging from 1.5 to 2.5 V (FIGS. 39A-39F). The PES-LIG electrodes eliminated bacterial viability in the solution the fastest, where a 6 log bacterial removal was seen within 2 hours at 2.5 V, followed by PPSU-LIG and PSU-LIG. The killing efficiency was directly related to the applied voltage, and the lowest voltage tested (1.5 V) gave 66-97% bacteria killing in 6 h operation. The mechanism of bacteria inactivation is mostly likely a combined electrical and chemical effects. In the present case, the electrical effects might dominate since we observed highest $H_2O_2$ generation with PSU-LIG at 2.0 V, but more effective bacterial killing was observed at 2.5 V.

Compared to polyimide LIG which gave only a 3.5 bacterial log reduction after 9 h operation at 2.5 V, the sulfur-doped PSU-class LIG was more effective, since in all cases more than 6 bacterial log reduction was observed within 4 h. Similarly, at 2.0 V with polyimide LIG only ~1 log reduction was observed, compared to a 6 log reduction within 4 h for PSU-class LIG. Similar highly effective bacterial deactivation was seen using a mixed bacterial culture obtained from real secondary treated wastewater investigated at 2.5 V. Such enhancements in activity highlights that LIG can be further tailored by using PSU-class polymer sources that provide variability in the heteroatomic composition of the graphene, and might lead to enhanced properties.

LIG on PES Membranes

LIG was directly fabricated on different commercial and self-made PES membranes, which were characterized using Raman, SEM and XPS. FIG. 40A illustrates LIG fabricated on the porous membrane substrate (PES UP150), including a photograph of the circular membrane coupon. The LIG on the porous substrate shows a similar large porous structure compared to LIG made on dense films (FIG. 40B), and the D, G and 2D Raman peaks at ~1,350 cm$^{1}$, ~1,580 cm$^{-1}$ and ~2,700 cm$^{-1}$, respectively (FIG. 40C), confirmed the graphitization of the surface of the UP150 membrane. XPS of UP150-LIG confirmed the sulfur content (C—S bonding) in the graphene skeleton, which was not present in the UP150 membrane substrate. The mixed bacterial culture was passed through the LIG as fabricated on a series of commercial and self-made PES membranes (FIG. 40D) and it was found that the highest bacterial removal rate (~96%) was with LIG on the self-made membrane PES-1.

The LIG made on the porous PES membranes were extremely resistant towards biofilm formation using the mixed bacterial culture as demonstrated with the UP150-LIG filter (FIG. 40E). Similar to the dense film substrates, the porous control UP150 PES membrane showed large amounts of biomass compared to the UP150-LIG, which showed nearly a biofilm-free surface. To demonstrate a porous electrode LIG-filter, carbon threads were attached to the LIG-membranes and placed one membrane on top of another for a stacked membrane flow-through system design (FIG. 40F). In this configuration all LIG-membranes showed 6 bacteria log reductions in the permeate at 2.5 V at flow rates of ~500 L m$^{-2}$ h$^{-1}$ with mixed bacterial culture (FIG. 40G). The UP150-LIG filters were also tested at ultrahigh flow rates (~22000 L m$^{-2}$ h$^{-1}$) and bacterial removal depended on the applied voltage. Complete bacterial inhibition (6 bacterial log reductions) could be achieved when the voltage was set at 20 V (FIG. 7g). Using samples of characterized real secondary treated wastewater 90-99.9% inhibition of bacteria was achieved at 10-20 V at a rate of ~500 L m$^{-2}$ h$^{-1}$.

Fabrication of PSU and PES Laser-Induced Graphene (LIG)

For PSU-LIG and PES-LIG, laser induction was conducted on PSU and PES sheets (~100 μm thickness) made from commercial polymer pellets (Ultrason, BASF, PSU (6010, 60 kD), and PES (6020P, 75 kD)). To make the thin sheets, the polymer pellets (2.5 g) were dissolved in dichloromethane (20 ml). The solution was poured into a glass Petri dish (inner diameter 11.5 cm). To control the evaporation of the dichloromethane, a funnel was placed on top of the Petri dish upside down. When the solvent was completely evaporated, the film was removed and measured to have an average thickness of 85±17 micrometers for PES, and 92±16 micrometers for PSU.

AVLS 3.50 (Universal Laser Systems) laser platform, equipped with a 10.6 μm $CO_2$ pulse laser (50 W) was used. The same image density of 70 PPI (pulses per inch) and scan rate of 25% were used for all experiments with variable laser power (5.0 to 9.0%). PSU-LIG and PES-LIG made in ambient environment in presence of air, the general atmosphere within the laser platform was still air (1 atm).

The PSU and PES LIG samples were characterized using SEM images, Raman, contact angle, and XPS. The SEM images showed different morphologies using different laser powers. For example, PSU made using 5% or 6% laser power (50 W) gave smoother surfaces in comparison to PSU-LIG made with 7-9% laser power. PSU-LIG made with 7% laser power was observed to have an intermediate roughness with larger surface pores. 8%, and 9% PSU-LIG were the roughest, and unique round spherical structures were present at the surface.

For PES-LIG however, the morphology was yet very different than that obtained for PSU-LIG. PES-LIG gave in general a finer roughness. Within the PES-LIG samples made at different powers (5%-9%), different morphology was observed. For example, PES-LIG made with 5% contained a surface of many ridges and large pores, whereas a finer roughness was observed for PES-LIG 6%-9%. PES-LIG 6%-8% gave similar morphology, and PES-LIG 9% gave slightly rougher coral-like structures. PES-LIG were observed by SEM images to all be very highly porous. Differences were more easily seen in high resolution SEM. Especially PSU-LIG 5% was different and gave larger globular-like structure than PSU 6%-9%, which were more highly porous. High resolution SEM for PES-LIG all showed very highly porous structures. Cross-sectional images also show difference in PSU-LIG 8%, and PES-LIG 8%, and show that PES-LIG 8% was more porous, and gave a thicker layer (ca. 150-200 micrometers) than PSU-LIG 8% (ca. 100 micrometers).

For both samples PSU-LIG 8% and PES-LIG 8%, a strong fluorescence was observed when excited by the laser (433, and 620 nm) present in the CLSM microscope.

Characterization of the presence of graphene was performed with Raman spectroscopy. Three major peaks were observed that are characteristic of graphene: the D peak at ~1350 cm$^{-1}$ induced by defects or bent sp$^2$-carbon bonds, the first order allowed G peak at ~1580 cm$^{-1}$, and the 2D peak at ~2700 cm$^{-1}$.

The contact angle measurement showed that the hydrophilicity of the PSU-LIG and PES-LIG was similar, more hydrophilic than the substrates PSU or PES, or a graphite sheet as controls.

XPS further characterized the atomic composition of the surfaces. C, O, S and N were recorded, and certain trends were observed. For example, for PES-LIG made with lower laser powers gave less sulfur incorporation to the LIG. For example, only 2.7% S was observed for 5% PES-LIG compared with 6.1% S observed in 8% PES-LIG. However, less S (3.2%) was seen at the highest laser power used (9%). The S2p peak incorporated 2 distinct signals appearing at ~169 eV and ~164 eV. This indicated more than one form of sulfur in the surface layer. The PES-LIG (8%) had a larger signal ratio (~164 eV/~169 eV), than the PES-LIG made at lower laser powers. For 9% PES-LIG however, there was mainly the signal at ~164 eV. For PSU-LIG, there was no clear trend in the sulfur composition, however, PSU-LIG 6% gave the highest amount of incorporated sulfur at 4.6%. Also, similarly to PES-LIG, PSU-LIG gave a new sulfur signal at 164 eV.

PES-LIG with Improved Quality—Defocusing

PES sheets were prepared as described above. XLS10MWH (Universal Laser Systems) laser platform, equipped with a 10.6 µm $CO_2$ pulse laser (75 W) was used. The same image density of 1000 PPI (pulses per inch) and scan rate of 10% (15 cm/s) were used for all experiments with laser power (10%). The sample was maintained in ambient environment in presence of air, the general atmosphere within the laser platform was still air (1 atm).

Samples were placed above the focal plane. Focal distance of the lens in the apparatus was 2.0" inches, and samples were offset from the focal plane by up to about 1.27 mm (about 50 mils). (It should be noted that the samples could also be offset below the focal plane).

Sheet square resistance was measured using a Keithely 195A four-point probe.

A sharp decrease in square resistance was found with defocusing of up to 30 mils (1.5% of the laser focal length), further increasing beyond about 40 mils (greater than 2% of laser the focal length). The laser focal length will vary depending upon the optics used for the laser. Increasing the defocusing will increase the effective beam size and result in more overlapping lases.

The Raman spectra of these materials were consistent with the sheet resistance. The material obtained with the 30 mil defocus showing the best D/G ratios as well as the most intense 2D peak, correlating with the quality of the LIG.

PES-LIG with Improved Quality—Multiple Exposures

PES sheets were prepared as described above. XLS10MWH (Universal Laser Systems) laser platform, equipped with a 10.6 µm $CO_2$ pulse laser (75 W) was used. The same image density of 1000 PPI (pulses per inch) and scan rate of 10% (15 cm/s) were used for all experiments with laser power (10%). The sample was maintained about 30 mils above the laser lens focal plane (i.e., about 1.5% of the focal length), in ambient environment in presence of air, the general atmosphere within the laser platform was still air (1 atm).

Rastering was repeated several times, exposing the same portions of PES film to multiple pulses. Sheet square resistance was measured as above.

A further decrease in sheet square resistance was observed in samples with double and triple exposure. A thrice-lased sheet showed extraordinary 1.5 Ohm/sq resistance, indicating a highly conductive surface. Further exposures provided no improvement and increased the resistance.

Raman spectra have also confirmed that the LIG with the best observed sheet resistance showed the highest-quality Raman spectrum in terms of the peak ratios evidencing higher quality graphene.

PSU-LIG with Improved Quality—Defocusing

PSU sheets were prepared as described above. XLS10MWH (Universal Laser Systems) laser platform, equipped with a 10.6 µm $CO_2$ pulse laser (75 W) was used. The same image density of 1000 PPI (pulses per inch) and scan rate of 10% (15 cm/s) were used for all experiments with laser power (8%). The sample was maintained in ambient environment in presence of air, the general atmosphere within the laser platform was still air (1 atm).

Samples were placed above the focal plane. Focal distance of the lens in the apparatus was 2.0 inches, and samples were offset from the focal plane by up to about 1.27 mm (about 50 mils).

Sheet square resistance was measured as above.

A highly sharp decrease in square resistance was found with defocusing of up to 30 mils (1.5% of laser focal length) (from about 2300 Ohm/sq to about 5 Ohm/sq), further increasing with defocusing rising beyond about 40 mils (greater than 2% of laser the focal length).

Biofilm Growth Assay of PSU-LIG and PES-LIG (Laser-Induced Graphene Fabricated on PSU and PES)

The antibiofouling and antibiofilm properties of PSU-LIG and PES-LIG were observed in a flow cell test. The setup for this test included nutrient media, a pump, and a flow cell chamber, which contained the samples attached to a glass slide.

The control polymer (PSU or PES) and LIG samples were attached to glass slide with double sided tape and were placed inside the flow cell. In general, the samples were inoculated by flowing 50 ml bacteria culture through the flow cell at 2.5 ml/min, followed by up to 48 hours of nutrient media. Different experiments were conducted with *Pseudomonas aeruginosa* PO1.

*Pseudomonas aeruginosa* PO1 was cultured. A 50 ml culture of these bacteria in LB broth with an $OD_{600\,nm}$ of 0.1 was flowed into the chamber at 2.0 ml/min and out. This was followed by continuous flux of 2.0 ml/min of LB media containing carbenicillin 150 mg/L for 48 hours. Carbenicillin was used to inhibit the growth of any interfering bacterial species.

Staining of the bacteria was performed with a live/dead kit (Invitrogen) by adding 1.5 µPropidium iodide—to stain dead bacterial cells, 1.5 µl Syto 9—to stain live bacterial cells, and 100 µl fluorescent Concanavalin A, a carbohydrate binding protein (lectin) that adheres to EPS (Extracellular polymeric substances) secreted by bacteria, to 897 µl of 0.1 M NaCl. The samples were stained by adding 2-3 drops of the staining mixture onto the surface, and afterward they were washed with 0.1 M NaCl, and covered under aluminum foil (to prevent any interaction with light from the environment) and imaged using CLSM (Confocal Laser Scanning Microscopy). The biofilm was imaged using Z scanning. Multiple areas of the sample were observed, and the results were averaged. The average biomass and biofilm thickness was quantified using MATLAB, with a pre-written program for biofilm image quantification called COMSTAT. IMARIS software was used to visualize and process the CLSM images to reconstruct a 3-D image from multiple microscopy images from a z-scan. Live bacteria, dead bacteria and EPS are colored green, red, and grey in the images.

*P. aeruginosa* Biomass & Biofilm Thickness on PSU, PES, Graphite Sheet, PSU-LIG, and PES-LIG The testing was conducted with 5 samples—control polysulfone (PSU), control polyethersulfone (PES), control graphite paper, PSU-LIG (polysulfone-laser-induced graphene), and PES-LIG (polyethersulfone-laser-induced graphene). It was observed that the controls, which do not have LIG, have high density of dead cells, EPS, and live bacterial cells. Whereas, PSU-LIG and PES-LIG were almost void of live and dead cells, and EPS.

CLSM images show that PSU and PES polymers have more bacterial contents when compared with PSU-LIG and PES-LIG samples.

$H_2O_2$ Generation by PSU-LIG and PES-LIG Electrodes Using 50 W Laser, 8% Laser Power in Air, Using a DC Voltage of 1.5, 2.0 and 2.5 V PSU and PES-Laser-induced graphene for $H_2O_2$ Generation: Polysulfone and polyethersulfone (thickness: ±100 μm) polymer sheets were prepared form polymer pellets (Ultrason, BASF, PSU (6010, 60 kD), and PES (6020P, 75 kD)) as described above. Laser scribing on polymer sheets was conducted with a VLS3.50 (Universal Laser Systems) laser platform, equipped with a 10.6 μm $CO_2$ pulse laser (50 W). The same image density of 70 PPI (pulses per inch) and scan rate of 25% were used for electrodes with 8.0% laser power. PSU-LIG and PES-LIG made in ambient environment in presence of air, the general atmosphere within the laser platform was still air (1 atm). Wires were glued onto the surfaces using commercially available conductive carbon based glue.

PSU and PES-LIG electrodes: PSU and PES sheets were used for the PSU-LIG and PES-LIG fabricated electrodes. PSU-LIG and PES-LIG was directly written using the computer controlled $CO_2$ laser applied on these PSU and PES films. These conducting PSU-LIG and PES-LIG coatings were used as the electrodes. For the tests, wires were attached to the electrodes by conductive glue. These electrodes were extended with electrical wires and then connected to an electrochemical workstation.

Current and voltage characteristics for the LIG electrodes were characterized by using a testing setup. In this setup, a direct current (DC) power supply with variable voltage was used. The LIG containing surface was partly immersed in 100 ml of 0.05 M NaCl solution in a beaker keeping the wires and conductive glue exposed to the air. The voltage was turned on and varied from 0-2.5 V, and the current and voltage were measured by using multi-meters. Either PSU-LIG or PES-LIG electrodes were used for the cathode and anode.

Generation of hydrogen peroxide by LIG spacers: Evaluation of hydrogen peroxide generation by LIG was done in the same setup described in the methods above. Hydrogen peroxide concentration was measured by the DMP colorimetric method. DMP method is a spectrophotometric method using copper(II) ion and 2,9-dimethyl-1,10-phenanthroline (DMP). A complex $Cu(DMP)_2^+$ formed (bright yellow complex) with maximal absorbance at 454 nm and is stable under ordinary light. The blank solution without $H_2O_2$ has a different color, and differences of the absorbance between the sample and blank solutions are approximately proportional to $H_2O_2$ concentration. The DMP was purchased from Sigma-Aldrich (Israel). For an experiment, fresh aqueous NaCl solution (0.05M) was added to the beaker. 1.5 V was applied with LIG coated surfaces fabricated with PSU-LIG and PES-LIG. The $H_2O_2$ generation was measured from 1.0 ml samples taken from the solution. In both cases, the concentration increased with time. Maximum $H_2O_2$ concentration with "PSU-LIG" was 2.57 mg/L after 3 hours of the experiment at 2.0 V, whereas with "PES-LIG," 1.99 mg/L $H_2O_2$ was measured after 3 hours of operation at 2.0 V.

Antibacterial effect of PSU-LIG and PES-LIG electrodes: The antibacterial effect of the electrodes was measured by addition of a bacterial culture of *P. aeruginosa* at ultra-high bacterial load (~$10^7$ CFU/ml) or at high bacterial load (~$10^6$ CFU/ml) in the setup described above. The bacteria were grown in liquid media LB as described above. The culture was grown overnight with shaking at 30° C., and the bacteria was pelleted by centrifugation at 4,000 rpm and washed with sterile PBS (2×) and then the bacteria was suspended in sterile PBS. The bacteria were added to an aqueous solution of NaCl (0.05 M, 100 ml) containing the LIG electrode at ultra-high bacterial load (~$10^7$ CFU/ml) or at high bacterial load (~$10^6$ CFU/ml). An electrical potential (1.5, 2.0, and 2.5V) was applied and the CFU were monitored over time using spread plate method. Colonies were counted after 24 hours of incubation at 30° C.

High bacterial loading and ultra high bacterial loading tests: The change in the microbial population and percentage killing was measured. A seven log bacterial reduction was seen with the ultra-high bacterial loading experiment after 6-hour operation at 2.5V and 2.0 V, whereas ~2 log reduction was seen at 1.5 V with both PSU-LIG and PES-LIG. In general it was observed that the PES electrodes have higher killing rate as compared to PSU-LIG. $H_2O_2$ bulk concentration was also monitored during the testing. In all cases, the testing run at 2.0 V showed the highest amount of $H_2O_2$ generated.

For high loading bacterial analysis, after 6 hours of operation, 6 log reduction of microbial populations were seen by PSU-LIG, and PES-LIG electrodes.

Preparation of PES-LIG on a Porous Ultrafiltration or Microfiltration Membrane

LIG-PES membrane made from a commercial membrane (Nadir MP005, Microdyn Nadir) with a VLS 3.50 (Universal Laser Systems) laser platform, equipped with a 10.6 μm $CO_2$ pulse laser (50 W). The same image density of 70 PPI (pulses per inch) and scan rate of 39% was used for all tests with 5% laser power. LIG-PES membrane was made in ambient environment in presence of air, the general atmosphere within the laser platform was still air (1 atm).

A uniform black conductive LIG membrane coating was observed across the irradiated part of the membrane. The Raman characterization for the LIG-PES membranes showed similar 2D, G, and D peaks to the PES-LIG.

Fabrication of PSU, PES, and PPSU Laser-Induced Graphene (LIG) from PSU, PES, and PPSU Films For thin films of PSU and PES, the polymer pellets (2.5 g) were dissolved in dichloromethane (20 mL) and the solution was poured into a glass Petri dish (inner diameter 11.5 cm). To slow the evaporation of the dichloromethane, an inverted funnel was placed on top of the petri dish. For PPSU, the polymer pellets (2.5 g) were dissolved in DMF (20 mL) and the solution was poured into the glass Petri dish (inner diameter 11.5 cm). The solvent was evaporated under vacuum at 60° C. When the solvents were completely evaporated, the films were removed and measured to have an average thickness of 94.6±5.5 μm for PES, 102.5±4.2 μm for PSU, and 106.6±7.4 μm for PPSU.

For the generation of LIG on the surfaces, a VLS 3.50 (Universal Laser Systems) laser platform, equipped with a 10.6 μm $CO_2$ pulse laser (50 W) was used. An image density of 70 PPI (pulses per inch) and a scan rate of 25% were used for all tests with variable laser duty cycle: For PES-LIG and PPSU-LIG the Laser was focused (5% laser duty cycle), while for PSU-LIG, the laser was defocused by 0.4 cm with an 8% laser duty cycle, meaning that the PSU film was moved 0.4 cm closer to the cutting lens from a focused position. PSU-LIG, PES-LIG and PPSU-LIG were made in ambient conditions in the presence of air. The general atmosphere within the laser platform was still air (1 atm). A nozzle provided with the instrument was used to blow air towards the laser spot.

The LIG on polysulfone (PSU), polyethersulfone (PES), and polyphenylsulfone (PPSU) films were transparent and flexible. XRD and Raman spectroscopy indicated that the LIG was successfully made, and XPS indicated that the elemental composition of the LIG layer was carbon, oxygen and sulfur. Scanning electron microscopy showed the surface structure and compared the LIG made from PSU, PES, and PPSU, cross sections, and TEM. Morphological differences were observed: LIG made from PES and PPSU contained more long needle-like structures, while LIG made from PSU had a more globular-like appearance. The XPS deconvolution shows that new sulfur bond types were present in the LIG with new peaks at ~164 eV compared to the substrate aromatic polysulfone material.

The hydrogen peroxide generation of these electrodes was tested as before. The hydrogen peroxide generation was more efficient than LIG electrodes made from polyimide for example. PSU-LIG gave the highest amount of hydrogen peroxide of ~2.6 mg/L after 3 hours of operation at 2.0 V, using an aqueous NaCl (0.05 M) solution. Using an aqueous solution of $Na_2SO_4$ (0.05 M), PPSU-LIG gave the most $H_2O_2$ production at ~1.8 mg/L after 3 hours.

The biofilm inhibition of the surfaces was tested as in the above examples using *P. aeruginosa*, and similarly as above, all LIG surfaces showed almost complete inhibition of biofilm growth.

The surfaces as electrodes were tested similarly to the examples above for the ability of the LIG electrode surfaces to eliminate bacterial viability in solutions using voltages of 1.5-2.5 V. In these cases, the most effective voltage used was 2.5 V, and the bacterial solutions were effectively decontaminated within 2-4 hours of operation. These surfaces were more effective than that of the LIG made from polyimide in that it killed the bacteria in a shorted time period.

Preparation of LIG on Porous Ultrafiltration or Microfiltration Membranes, and Performance Testing as a Filter and in a Stacked Filter-Electrode Configuration PES ultrafiltration (UF) membranes were made using common phase inversion techniques as known in the art. Briefly, the membranes were made by casting a 16% w/w PES solution in NMP on glass and named as PES1 membrane or on a nonwoven polypropylene support named as PES2 membrane with the casting knife adjusted to a layer thickness of 150 μm, followed by immersion in a water coagulation bath (20° C.). Membranes were kept in DDW water for at least 24 h to complete the phase inversion process. The PES UF membranes were then air-dried and LIG was achieved on the surface using the same laser (50 W) with settings 0.1% laser duty cycle (70 PPI image density and 25% scan rate).

Membranes and LIG-membranes were characterized by ATR-FTIR, SEM, and contact angle before and after laser modification. Membranes were soaked in DDW water for at least 4 h and then used for different applications. Using the same settings, LIG was also made on commercial membranes from Microdyn-Nadir: UH050, UH004, MP005 and UP150 and these were also used for filtration as LIG-coated filters.

The LIG filters were tested for the ability to filter bacterial solutions. A mixed culture of bacteria taken from the secondary treated wastewater aeration pond near Sde Boker (Israel) and was grown in LB. The bacterial concentration was adjusted to $10^6$ CFU/mL and 10 mL was vacuum filtered through the filter at 0.5 Bar. Bacteria quantification was performed with the plate count method for the feed solution and the permeate. The bacterial removal was highest using LIG filter type PES1 and PES2, which removed between 70-95% of the bacteria.

To demonstrate again the antibiofilm ability of the LIG as made on a polymer filter, the LIG coated UP150 filter was subjected to biofilm growth condition as reported above. The mixed bacterial culture was used. The LIG-UP150 coated filter had almost no biofilm growth, compared to thick growth on the uncoated UP150 membrane filter.

A graphite wire was attached to the LIG surface of the LIG coated membranes circular coupons (46 mm diameter) using a carbon-based glue. An epoxy glue was used to strengthen and protect the connection. Two of these membranes were stacked and assembled in a 500 mL vacuum filtration apparatus, and connected to a direct current (DC) power source with the bottom membrane as cathode and the top as anode. Using a vacuum pump to regulate the flow, the mixed bacterial culture suspension (~$10^6$ CFU $mL^{-1}$ in 0.9% NaCl solution) and were added and 15 mL of contaminated water was passed through the filtration unit at a rate of 1500 LMH. The experiments were done at room temperature at 2.5 V. Bacteria were quantified using the plate count method for the feed solution and the permeate. In all cases a 6 log removal of bacteria was observed (complete decontamination). Using the UP150-LIG membrane stacked filters at an ultra-high flow rate of 22000 LMH, ~6 log removal was observed at 20V.

Additional Usages

The PSU class polymers are the most highly used material in membrane fabrication due to mechanical and compressive strength, thermal stability, and chemical inertness over the entire pH range enabling widespread use in most separation applications. Moreover, these polymers are prevalent in many other aspects of society including microelectronic devices, thin film technologies, fuel cells, and biomaterials. The methods of the present invention directly generate conformal sulfur-doped LIG on this PSU-polymer class in a single step, fundamentally a solvent- and reagent-free technology. Biofouling of surfaces is especially challenging in membrane technology in which LIG coatings could be game changing. The electrochemical and antifouling properties of the flexible sulfur-doped LIG might also be effectively used for in-situ decontamination and degradation of emerging pollutants in water and wastewater, for fouling resistant cathodes in microbial fuel cells, or as porous flow-through electrodes for capacitive deionization: broadly applicable in the energy, biomedical, and environmental fields.

PSU-LIG and PES-LIG and PPSU-LIG can be used to fabricate electrodes as both cathode and anode.

The voltage applied across the electrodes for production of chemical species may be in the range between 0.05V to 20V, preferably between 1.5 V to 2.5 V, inclusive.

The amount of chemical species may be controlled by adjusting the voltage or by alternatively turning on and off the voltage. The in-situ generation of $H_2O_2$ and other bacterial toxic species and the ability to control their amount provides precisely enough antimicrobial components to eliminate or minimize the formation of viable microorganisms, biofouling or biofilm growth. The ability to control the amount of chemical species also limits degradation of possible nearby membrane or other materials. Adjusting the voltage on these surfaces while in aqueous solutions that contain microorganisms in effectively kills the organisms and can be considered an "active" form or antimicrobial action. For example, electrodes consisting of PSU-LIG or PES-LIG or PPSU-LIG at voltages between 1-5 V, preferably between 1.5-2.5 V placed in solution containing bacteria, for example $10^6$-$10^7$ CFU, reduce bacteria population between 2-7 log reduction.

The PSU-LIG and PES-LIG and PPSU-LIG exhibits antibiofilm properties. This prevents fouling of surfaces, biofilm growth and bacterial attachment on the surfaces. Bacterial survival after contacting the LIG component is generally below 85%, and preferably is below 0.1%. Therefore, in another aspect the present invention is directed to methods of preventing or reducing or minimizing fouling, biofilm growth and/or bacterial attachment on elements of water treatment systems.

Direct 3D Printing of Graphene Materials from Carbon Precursors

In further embodiments, the present invention relates to direct 3D printing of graphene materials from carbon precursors. The present invention includes a metal-free method by which a 3D graphene object can be printed via the exposure of one or more carbon precursors to laser irradiation. Single exposures of a laser can be employed, but, preferably, multiple exposures can be used.

Method of the present invention include lasing a mixture (preferrably powdered) of the following:
  A. One or more graphitizable thermoplastic polymer (PPS, PEI, PEEK, PES, PPO, or similar);
  B. Optionally, An additional non-thermoplastic carbon precursor for laser-induced graphene (activated carbon, themoset polymer, or other source of carbon);
  C. Optionally, additives to modify the properties of the 3D graphene (can be powder or liquid.

The use of an appropriate thermoplastic polymer is sufficient to obtain a 3D graphene structure. For example, polyphenylene sulfide (PPS), polyetherimide (PEI), polyethersuflone (PES) or polyether ether-ketone (PEEK) powder can be used. The thermoplastic polymer powder is exposed to laser irradiation and the particles of the polymer are fused. For instance, this can be performed in two ways. First, the polymer powders may be fused by selective laser sintering at lower laser powers to first melt the polymer powders into a solid structure without converting to graphene. Following this step, additional exposure(s) to the laser at higher power would then convert the structure into graphene. Alternatively, a higher powered laser exposure can be applied to fuse and convert the polymer into graphene in one step. A scheme of this fabrication process is shown in FIG. 41 (which is an embodiment of a simple implementation of 3D printing of graphene using a thermoplastic polymer powder (polyphenylene sulfide)).

Figure 41:
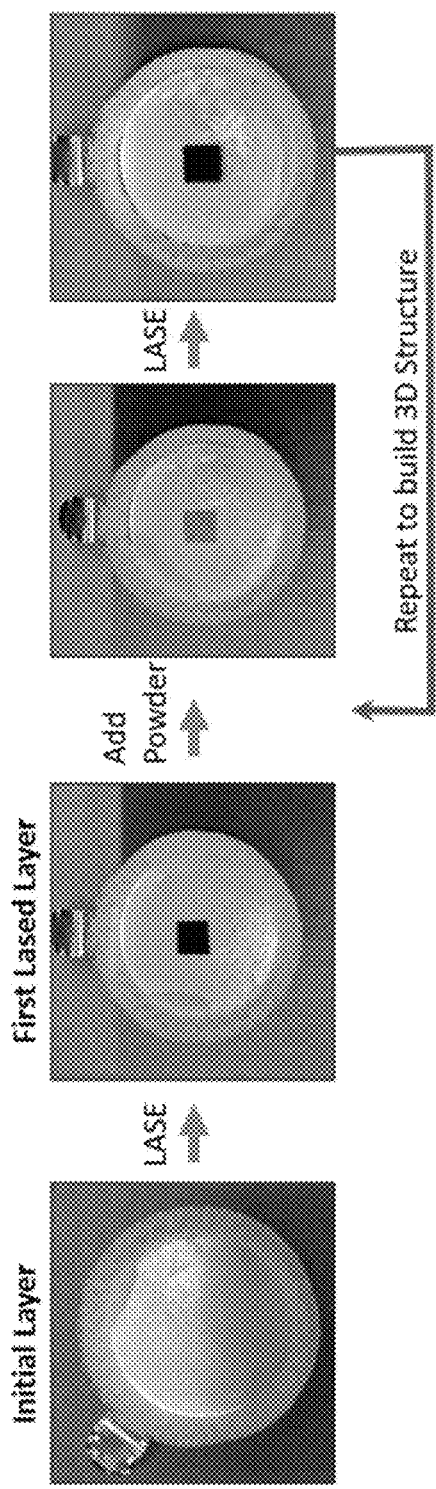
FIG. 41 is an embodiment of a simple implementation of 3D printing of graphene using a thermoplastic polymer powder (polyphenylene sulfide). In this case, all cross sections are squares resulting in a cuboid 3D structure.

In the implementation shown in FIG. 41, an initial layer of thermoplastic polymer powder is added onto a surface. A computer-controlled laser beam is then scanned across the powder with the laser beam turned on only within boundaries of pattern. The pattern includes a cross-section of the larger 3D structure that is to be printed. Additional powder can then be applied by sprinkling, smearing, or shaking either manually or by using an automated powder dispending mechanism. After application of the new layer of powder, the laser is then scanned within the boundaries of the next cross section of the larger 3D object to be printed. Repeating this process for subsequent layers results in a 3D structure consisting of laser-induced graphene materials.

The choice of the mechanism for dispensing and dispersing the powder of the surface of the working area for the laser exposure may vary depending on the mechanical properties of the powder mixture. Namely, if the mixture is free-flowing and suitable for 3D printing, all standard methods for dispensing powders will be viable whereas if the material clumps together a mechanism for sprinkling the powder will be required.

Figure 33:
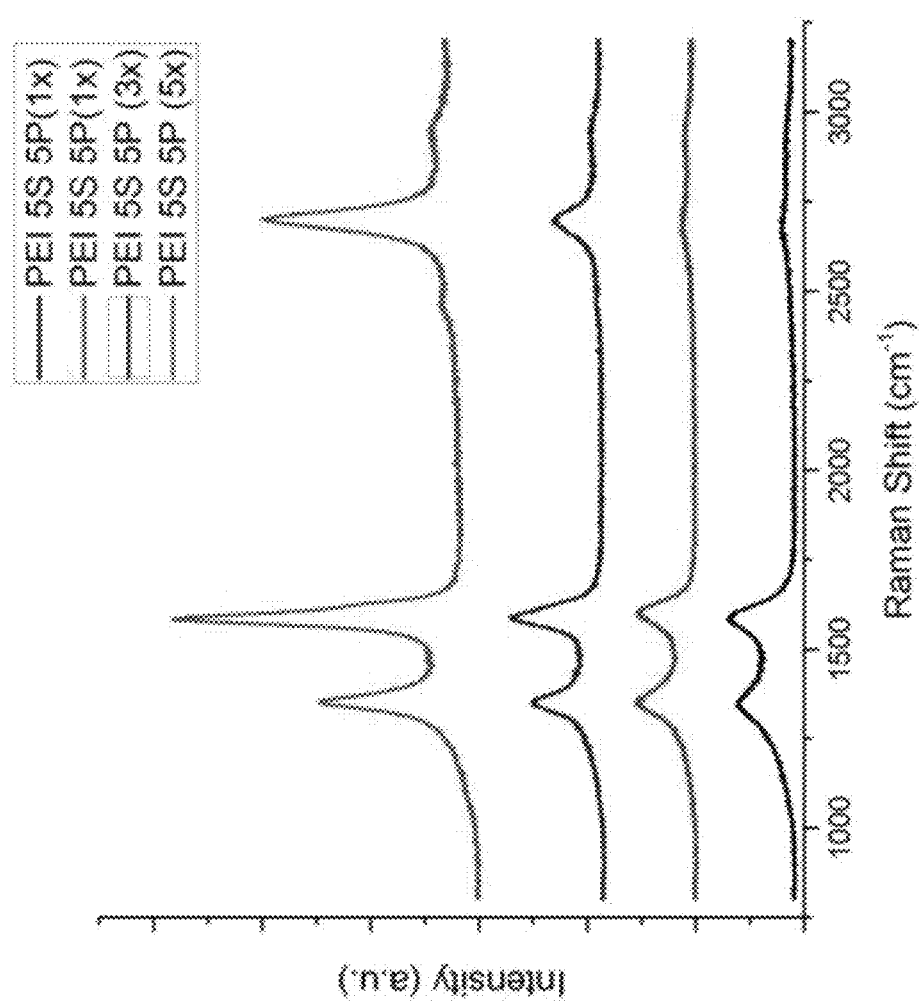
FIG. 33 shows the Raman spectrum of polyetherimide lased with a 10.6 The increased graphene composition with multiple laser exposures (noted by the number of lases then x in the inset) is evident from the increase in the G peak in the Raman spectrum at −1580 $cm^{-1}$.

Raman characterization of the obtained 3D structure confirms that the material has been converted into LIG. As previously discussed, the number of exposures to laser irradiation does impact the quality of the material obtained with an optimal number of laser exposures that may vary depending on the precursor material. See FIG. 33 (which shows that repeated lasing of the polyetherimide carbon precursor results in higher quality graphene as evidenced by the increase of the 2D peak with the number of lases as well as a better D to G peak ratio).

Figure 42A:
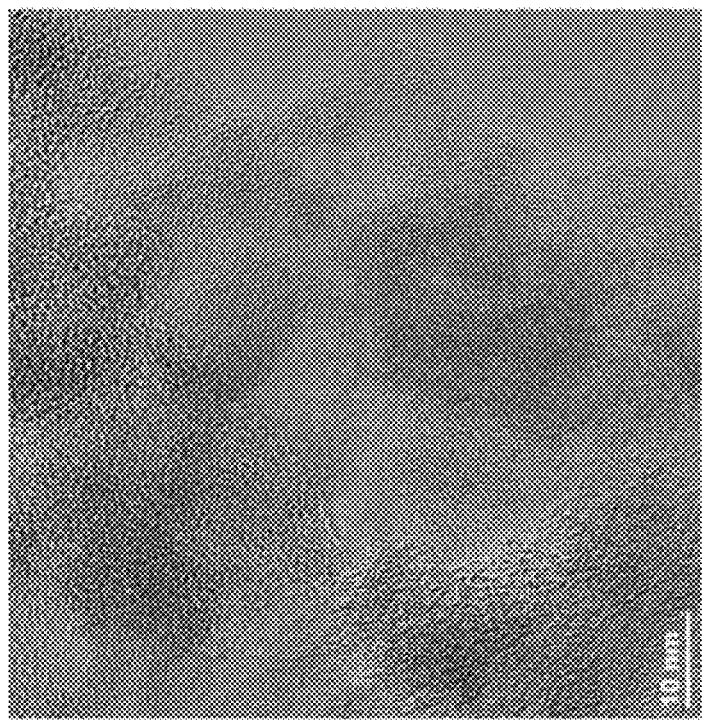
FIG. 42A is TEM image of activated carbon.
Figure 42B:
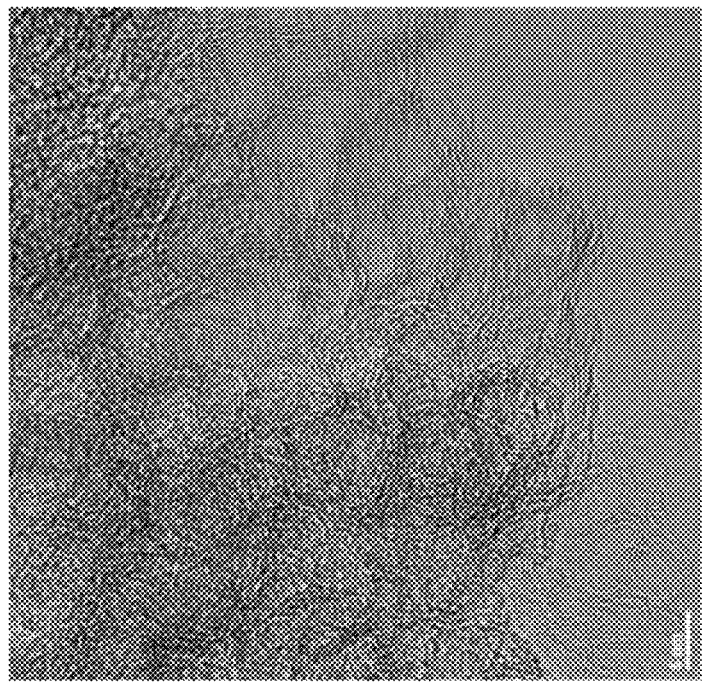
FIG. 42B is TEM image of laser-induced graphene obtained from activated carbon.

While the use of a thermoplastic polymer alone is sufficient to obtain a 3D graphene structure, a preferred embodiment includes the use of a mixture of a thermoplastic polymer material with a non-polymeric carbon source such as activated carbon, activated charcoal, biochar or similar materials. Non-thermoplastic polymer materials such as polyimide, polybenzimidazole, phenolic resins, lignin, or similar materials can also be used. Using such a mixture, a material with higher conductivity, specific surface area, robustness, and other beneficial properties can be obtained as compared with the use of a single polymer precursor. Activated carbon readily forms 3D graphene as shown in the TEM images below (FIGS. 42A-42B) and has a high surface area. However, activated carbon does not adhere together well during 3D printing precluding its use as a singular material in 3D printing.

A specific example of this implementation of the 3D printing of LIG is as follows. 5 grams of polyphenylene sulfide powder with average molecular weight ~10,000 (PPS) was mechanically mixed together with an equal amount 100-mesh Darco activated carbon (AC). A 3D structure was then obtained using the method described in FIG. 41 using a Universal Laser Systems laser cutter (Model XLS10MWH). The $CO_2$ laser (10.6 micrometer wavelength) was used in the raster mode with a 1000 DPI pulse density. The power used was 5% power (~3.7 W) and the speed was 5% of the maximum speed of the XLS10MWH laser cutter system.

Figure 43:
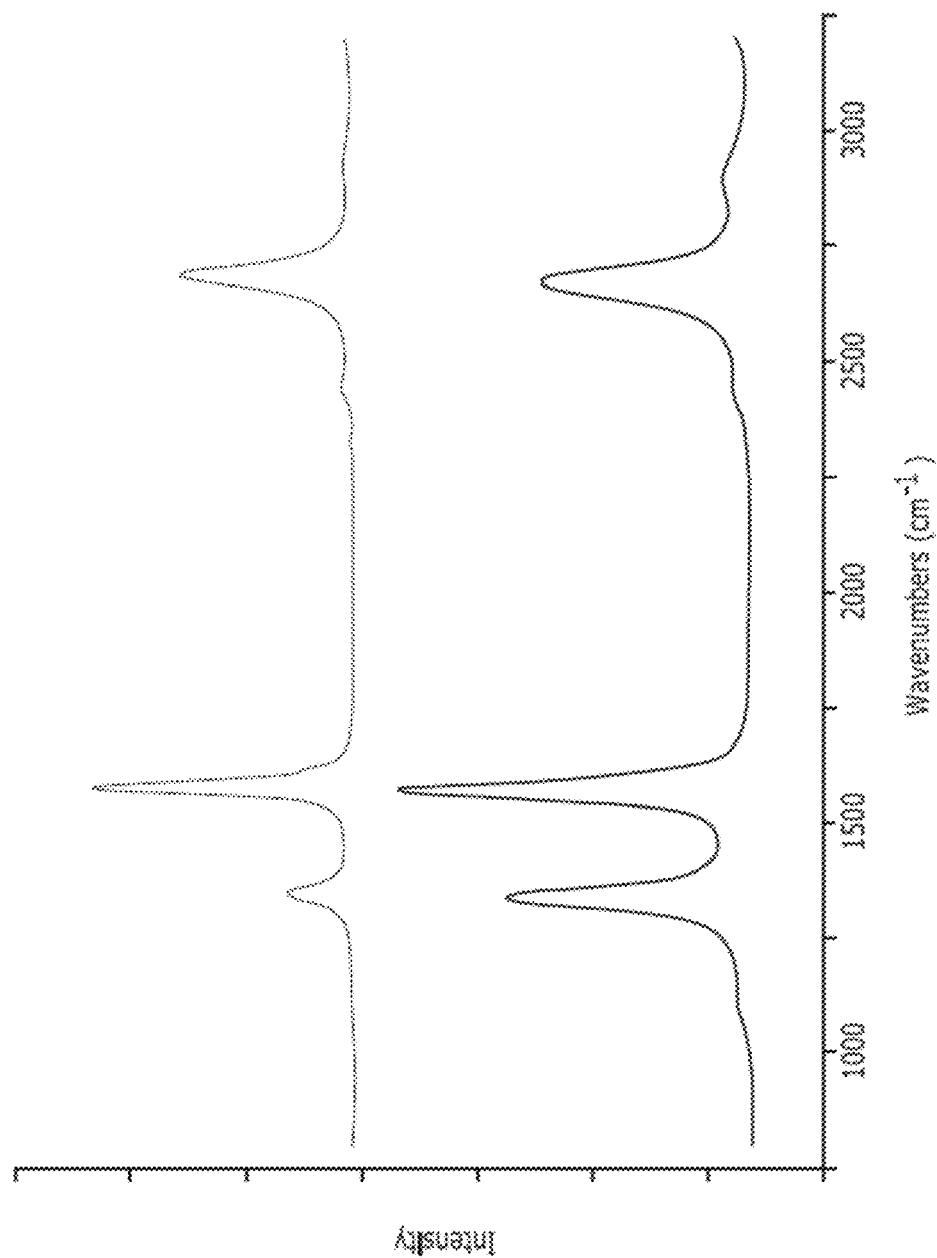
FIG. 43 is a Raman spectra of a polyphenlyene sulfide-activated carbon (PPS-AC) mixture that has been printed into a 3D structure by exposure to 10.6 micrometer $CO_2$ laser at 5% laser power 5% speed.

The sheet resistance messurement of a few layers of the printed material was measured using a 4-point probe. The measurements showed that the material was extremely conductive with a sheet resistance of <5 Ohms/square. Raman spectra of FIG. 43 shows that the material is converted to laser-induced graphene which is consistent with the high conductivity of the 3D printed material.

This method of forming laser-induced graphene could be performed in ambient atmosphere, which was unlike many previous methods that require a controlled atmosphere.

This mixture allows for a one-step process for obtaining 3D graphene structures without requiring time-consuming thermal treatment in a CVD furnace or an acid etch to remove metal catalysts.

FIG. 44A is a photograph of a 5 mm³ 3D graphene monolith printed from PPS-AC using a powder bed printing method. The bulk conductivity was 20 S/m. FIG. 44B is an SEM image of a corner of the cube shown in FIG. 44A at 50× magnification (scale bar is 1 mm). FIG. 44C is an SEM image of the surface of the cube shown in FIG. 44A (scale bar is 50 µm).

Figure 45A:
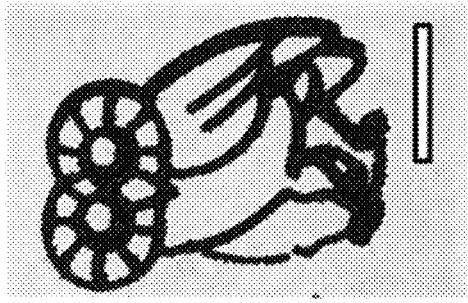
FIGS. 45A-45C are photographs of freestanding graphene objects printed using a 50/50 mixture of polyphenylene sulfide and activated carbon with features less than 1 mm in width (scale bar is 1 cm).
Figure 45B:
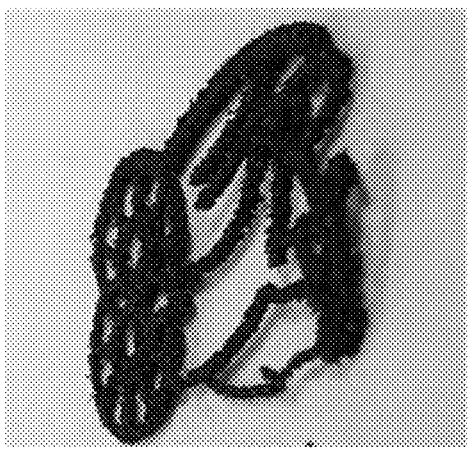
Figure 45C:
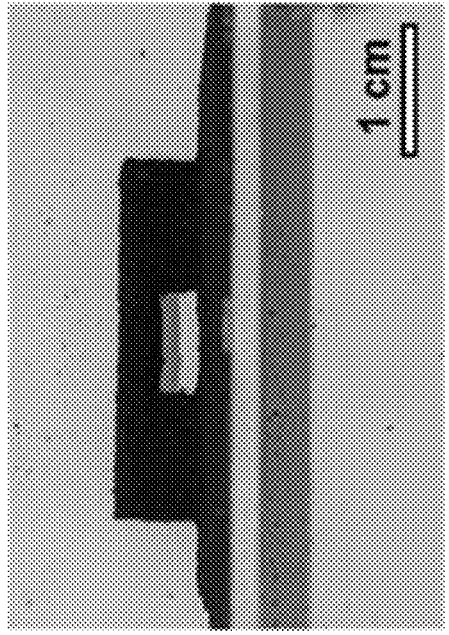
Figure 45D:
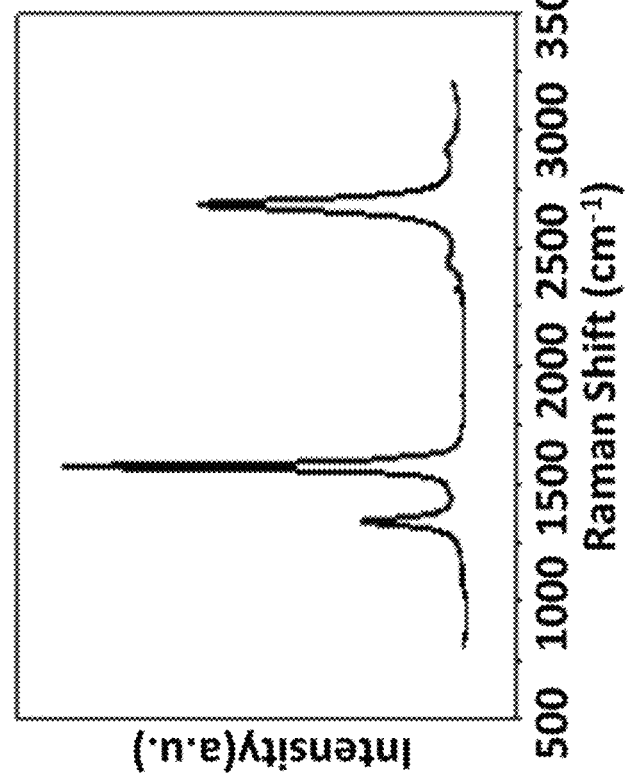
FIG. 45D is a Raman spectra of a PPS-AC graphene object.

FIGS. 45A-45C are photographs of freestanding graphene objects printed using a 50/50 mixture of polyphenylene sulfide and activated carbon with features less than 1 mm in width (scale bar is 1 cm). FIG. 45D is a Raman spectra of a PPS-AC graphene object.

Figure 46A:
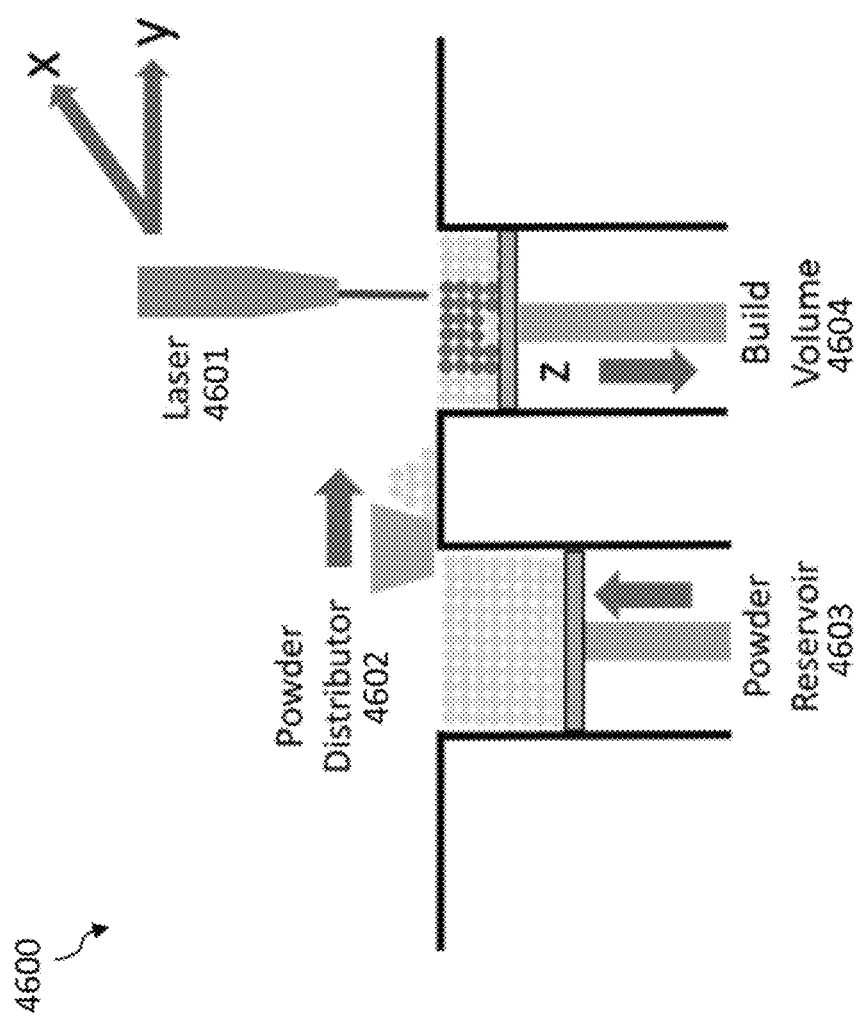
FIG. 46A is a schematic of 3D printing box.
Figure 46B:
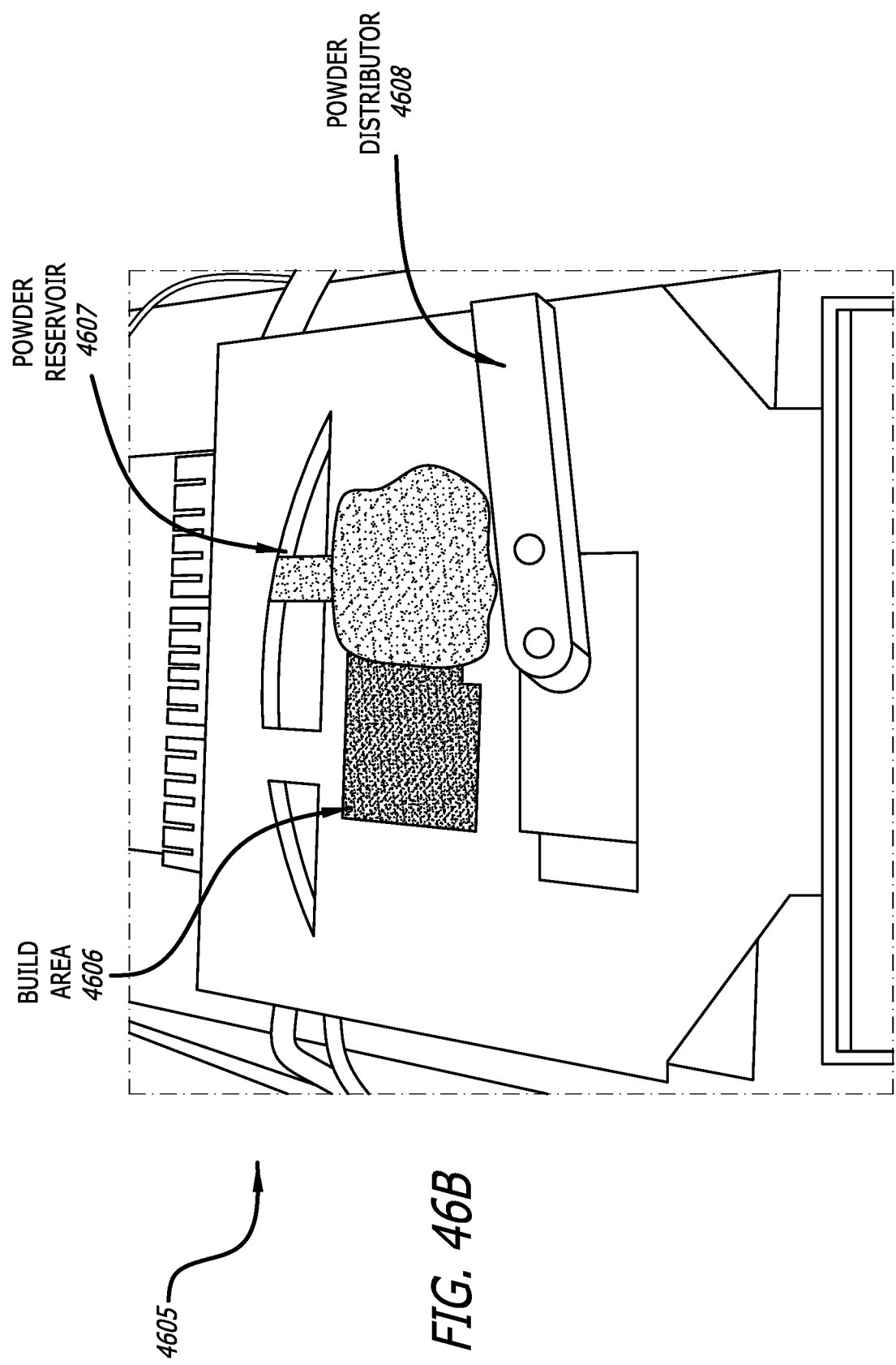
FIG. 46B is a photograph of a powder bed box.

FIG. 46A is a schematic of 3D printing box 4600. The printing box 4600 includes a laser 4601 that can move in the x and y direction. Building in the z direction is performed by adjusting the build volume (or build area) 4604. Printing box 4600 further includes a powder reservoir 4603 containing powder that is distributed by powder distributor 4602. As the build volume 4604 is adjusted, the powder is distributed by the powder distributor on top of the previously lasered powdered (for further utilization of the laser 4601). FIG. 46B is a photograph of a powder bed box 4605, which shows the build area 4606, the powder reservoir 4607, and the powder distributor 4608.

Figure 47A:
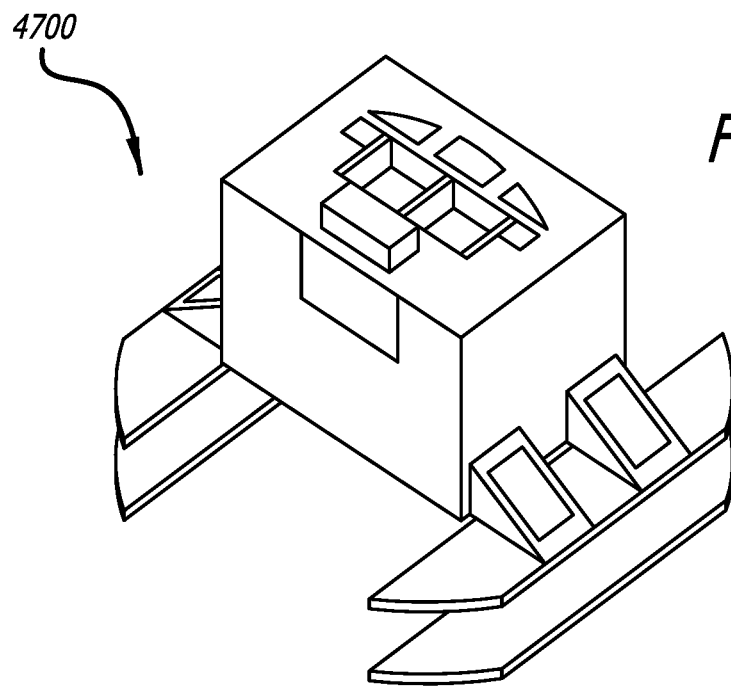
FIGS. 47A-47B are schematics of a 3D printing box in a controlled atmosphere chamber.
Figure 47B:
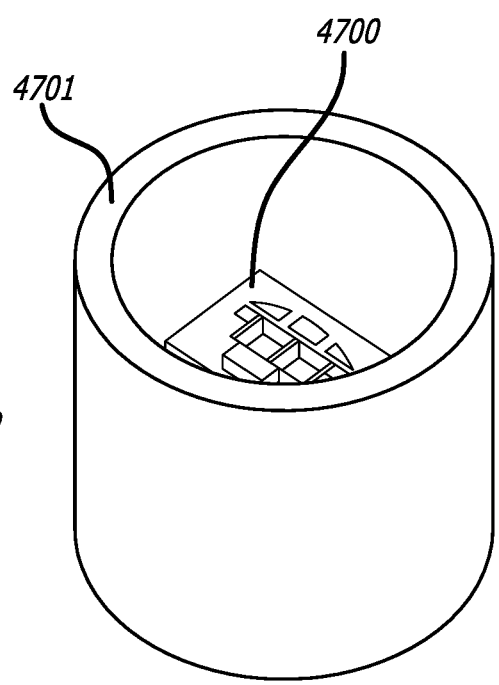
Figure 47C:
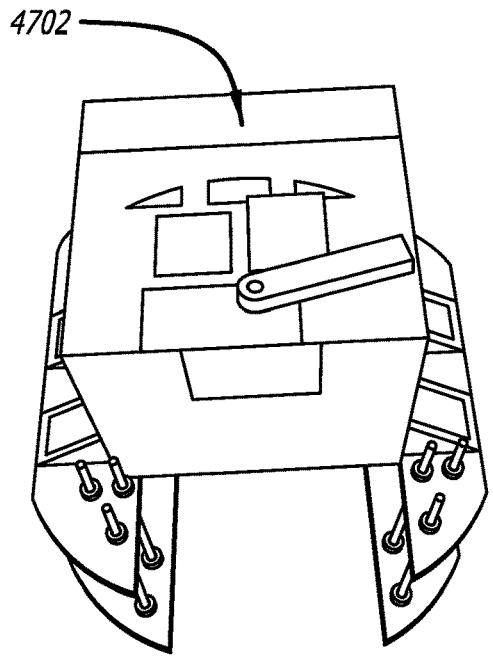
FIGS. 47C-47E are photographs of a 3D printing box in a controlled atmosphere chamber with a ZnSe window.
Figure 47D:
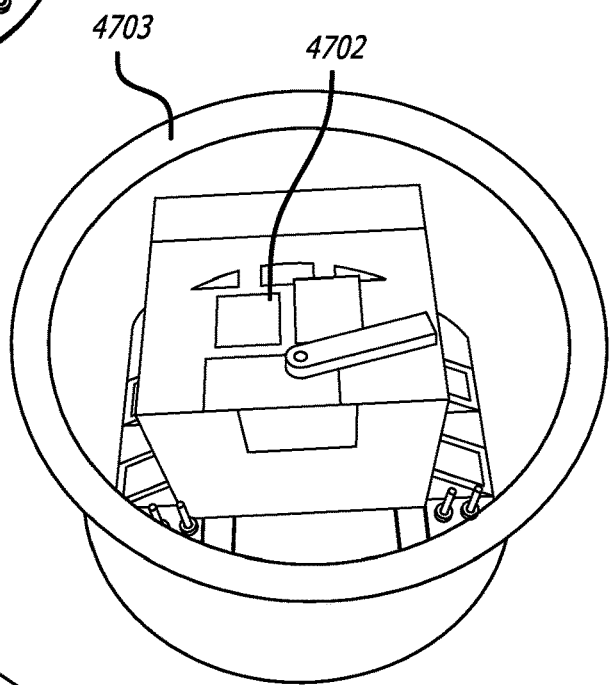
Figure 47E:
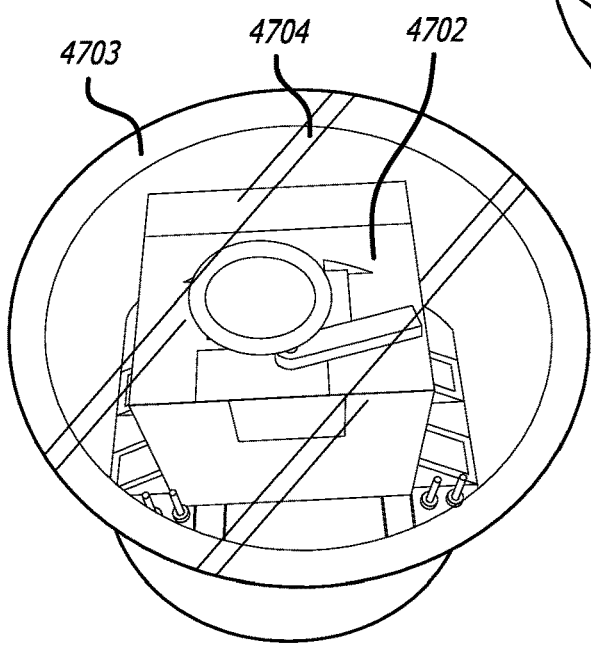

FIG. 47A is a schematic of a 3D printing box 4700. FIG. 47B is a schematic of 3D printing box 4700 in a controlled atmosphere chamber 4701. FIG. 47C is a photograph of a 3D printing box 4702. FIG. 47D is a photograph of 3D printing box 4702 in a controlled atmosphere chamber 4703. FIG. 47E is a photograph of 3D printing box 4702 in controlled atmosphere chamber 4703 with a ZnSe window 4704.

Utility and Variations

Graphene, a 2D single-layer of carbon, has attracted intense interest due to its large specific surface area, high electrical and thermal conductivities and superior mechanical strength. It has been used in various applications, such as in electrodes for supercapacitors and lithium ion batteries, transparent conducting films, and photocatalysis. However, in energy storage device and mechanical related applications, individual 2D graphene nanosheets need to be integrated into 3D macroscopic structure, as 2D graphene often does not meet the mass and volume requirements.

Free-standing 3D printed frameworks containing laser-induced graphene would have applications in supercapacitors, lithium ion batteries, lithium ion capacitors, catalysts for water splitting into $H_2$ and $O_2$, water-oil separation, water/gas purification, sensors and mechanical dampeners. The 3D printing method using a mixture of carbon precursors would allow a structure with high specific surface area, good crystallization, a mechanically robust structure, and good electrical conductivity to be obtained.

The method of the present invention is unique in that the process involves the direct conversion of carbon precursors into laser-induced graphene by multiple exposure to laser irradiation. This removes the necessity of a prolonged etching period (multiple days) that previous methods using metal catalysts required. No additional thermal treatments or drying steps are required since this procedure is a one-step process for obtaining a 3D-graphene structure. The material will also be free of any metal contamination. Results also show that this method yields an object that is more robust mechanically than the previous methods.

Moreover, there are significant advantages for use of a mixture of thermoplastic and non-thermoplastic carbon precursors in the methods of the present invention. Exclusive use of thermoplastic polymers, such as polyphenylene sulfide (PPS), polyetherimide (PEI), or similar thermoplastic polymers, can successfully result in the formation of a laser-induced graphene containing 3D structure. However, there are drawbacks to this approach, including the fact that such a mixture tends to deform when exposed to the laser. This can cause a large reduction in print accuracy and resolution. Potential reasons for these issues are the volume change of the polymer as it is being converted into graphene (some material is ablated) as well flowing of the material as it melts. One can program this into the laser movement so that a final structure to the desired size could be made.

Non-thermoplastic carbon precursors, such as activated carbon, have minimal volume and shape change compared with the thermoplastic polymers but do not sinter together. This means that a 3D-printed object including solely these types of materials tend to have very poor mechanical robustness often falling apart spontaneously.

By mixing the two materials, it is possible to achieve the advantages of both. In this case, the thermoplastic polymer serves as a binder that will melt during the laser sintering process. Additional lases as described in the multiple lase method then convert both the thermoplastic material and the non-thermoplastic material into laser-induced graphene.

Potential advantages also include:
A. Increased surface area from activated carbon or other non-thermoplastic precursor.
B. Reduced volume change during lasing (less deformation of printed object).
C. Mixture is more free flowing (more suitable for 3D powder printing).
D. Enhanced conductivity of the resulting structure (from activated carbon).
E. Higher resolution and print accuracy.

Further variations also include:

Controlled atmosphere—From a scalability standpoint, operation in ambient atmosphere would be the most advantageous. Preparation of material in a controlled atmosphere, such as an inert or reactive atmosphere, may be utilized to alter the functionalization of the graphene materials. For example, preparation in a reducing atmosphere such as $H_2$ would lower the amount of oxygen containing functional groups and potentially make the surface of the material more hydrophobic. Controlled atmospheres may be used to tune the hydrophilicity of the surface. Oxygen, $SF_6$, nitrogen, argon, and other gasses may be employed instead of ambient atmosphere.

Additives—Various metal additives such as Ni, Cu, Ni—Cu alloys, Ru, Ag, Fe, or Co, for example, could be added to give the 3D printed structure new properties such as catalytic activity for various reactions. These could be added as salts prior to lasing, or electrochemically adsorbed after lasing. Other additives such as melamine, ammonia, boranes, phosphenes, and phosphides (alone or in combination) could be added to obtain doped 3D graphene structures.

Liquid precursor materials—While using a powdered system, laser sintering appears to be the most facile method of obtaining a 3D graphene structure. Conversely, one could use other 3D printing methods in conjunction with multiple lasings to obtain similar results. For example, a slurry containing a thermoplastic polymer, a solvent, and optionally the non-thermoplastic polymer could be printed using a slurry method of 3D printing followed by exposure to a laser. Alternatively, an extrusion method could be employed wherein a filament of the thermoplastic material containing the optional non-thermoplastic precursor is melted and extruded. The material extruded could then be lased. If the thermoplastic material is soluble in solvents, a solution of the thermoplastic material could be sprayed over particles of the non-thermoplastic material. Certain polyimides especially fluorinated polyimides would be suitable for such an application.

REFERENCES

M. J. Allen, et al., *Chem. Rev.* 2009, 110, 132 ("Allen 2009").
A. Bagri et al., *Nature Chemistry* 2010, 2, 581 ("Bagri 2010").
A. A. Balandin et al., *Nano Lett.* 2008, 8, 902 ("Balandin 2008").
B. Bhushan et al., *Philos. Trans. R. Soc., A* 2010, 368, 4713 ("Bhushan 2010").
B. Bhushan et al., *Philos. Trans. R. Soc., A* 2009, 367, 1631 ("Bhushan 2009").
K. I. Bolotin et al., *Solid State Commun.* 2008, 146, 351 ("Bolotin 2008").
F. Chu, *IEEE Trans. Electr. Insul.* 1986, 5, 693 ("Chu 1986").
L. Dai et al., *Small* 2012, 8, 1130 ("Dai 2012").
X. Dong et al., *Chemical Communications* 2012, 48, 10660 ("Dong 2012").
X. Fan, et al., *Chem. Soc. Rev.* 2015, 44, 3023 ("Fan 2015").
C. Feng et al., *ACS Appl. Mater. Interfaces* 2016, 8, 9977 ("Feng 2016").
A. Ferrari et al., *Phys. Rev. Lett.* 2006, 97, 187401 ("Ferrari 2006").
A. C. Ferrari, et al., *Physical Review B,* 2003, 67, 155306 1-20 ("Ferrari 2003").
L. Gao et al., *Langmuir* 2006, 22, 6234 ("Gao 2006").
A. K. Geim, *Science* 2009, 324, 1530 ("Geim 2009").
A. K. Geim et al., *Nat. Mater.* 2007, 6, 183 ("Geim 2007").
V. Georgakilas et al., *Chem. Rev.* 2012, 112, 6156 ("Georgakilas 2012").
A. Hirsch et al., *Acc. Chem. Res.* 2012, 46, 87 ("Hirsch 2012").
C. Hontoria-Lucas et al., *Carbon* 1995, 33, 1585 ("Hontoria-Lucas 1995").
H. Hu, Z. Zhao et al., *Environ. Sci. Technol. Lett.* 2014, 1, 214 ("Hu 2014").
D. K. James et al., *Acc. Chem. Res.* 2012, 46, 2307 ("James 2012").
Kandola, B. K. et al., *Polymer Degradation and Stability,* 1996, 54, 289-303 ("Kandola 1996").
C. Lee et al., *Science* 2008, 321, 385 ("Lee 2008").
Y. Lee et al., *Adv. Mater.* 2007, 19, 2330 ("Lee 2007").
L. Li et al., *Carbon* 2016, 105, 260 ("Li 2016").
L. Li et al., *Adv. Mater.* 2015, 28, 838 ("Li 2014").
R. Li et al., *J. Mater. Chem. A* 2014, 2, 3057 ("Li 2014").
J. Lin et al., *Nat. Commun.* 2014, 5, 5714 ("Lin 2014").
Y. Lin et al., *ACS Appl. Mater. Interfaces* 2011, 3, 2200 ("Lin 2011").
Y.-M. Lin et al., *Science* 2010, 327, 662 ("Lin 2010").
J. Liu et al., *J. Mater. Chem.* 2012, 22, 12435 ("Liu 2012").
Q. Ma et al., *Small* 2016, 12, 2186 ("Ma 2016").
D. C. Marcano et al., *ACS Nano* 2010, 4, 4806 ("Marcano 2010").
C. Mattevi et al., *J. Mater. Chem.* 2011, 21, 3324 ("Mattevi 2011").
K. D. D. Nguyen et al., W.-S. Kuo, *Energy Environ. Sci.* 2012, 5, 7908 ("Nguyen 2012").
Novoselov et al., *Nature* 2012, 490, 192 ("Novoselov 2012").
C. K. N. Patel, *Physical Review A,* 1964, 136 (5A), 1187-1193 ("Patal 1964").
Z. Peng et al., *ACS Appl. Mater. Interfaces* 2015, 7, 3414 ("Peng I 2015").
Z. Peng et al., *ACS Nano* 2015, 9, 5868 ("Peng II 2015").
M. Pimenta et al., *Phys. Chem. Chem. Phys.* 2007, 9, 1276 ("Pimenta 2007").
R. Rahimi et al., *ACS Appl. Mater. Interfaces,* 2015, 7(8), 4465-4470 ("Rahimi 2015").
F. Raimondi et al., *J. Appl. Phys.,* 2000, 88(6), 3659-3666 ("Raimondi 2000").
J. Rafiee et al., *Adv. Mater.* 2010, 22, 2151 ("Rafiee 2010").
R. Romero Aburto et al., *ACS Nano* 2015, 9, 7009 ("Romero 2015").
E. Singh et al., *Small* 2013, 9, 75 ("Singh 2013").
R. Srinivasan et al., *J. Appl. Phys.,* 1995, 78, 4881-4887 ("Srinivasan 1995").
R. Srinivasan, et al., *Synthetic Metals,* 1994, 66, 301-307 ("Srinivasan 1994").
W.-T. Tsai, *J. Fluorine Chem.* 2007, 128, 1345 ("Tsai 2007").
T. Wang et al., *ACS Appl. Mater. Interfaces* 2016, 8, 14169 ("Wang 2016").
S. Wang et al., *Langmuir* 2009, 25, 11078 ("Wang 2009").
X. Wang et al., *Chem. Soc. Rev.* 2014, 43, 7067 ("Wang 2014").
R. Ye et al., *ACS Nano* 2015, 9, 9244 ("Ye 2015").
D.-a. Zha et al., *Carbon* 2011, 49, 5166 ("Zha 2011").
J. Zhang et al., *ACS Appl Mater Interfaces* 2017, 9(32), 26840-26847 ("Zhang 2017")
W. Zhang et al., *Desalination* 1989, 72, 263 ("Zhang 1989").
X. Zhang et al., *J. Mater. Chem.* 2008, 18, 621 ("Zhang 2008").
F.-G. Zhao et al., *J. Mater. Chem. A* 2014, 2, 8782 ("Zhao 2014").

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

What is claimed is:

1. A method comprising irradiating a material comprising an aromatic polysulfone with a laser to form laser-induced graphene on the surface of the material comprising the aromatic polysulfone, wherein the laser-induced graphene is a porous graphene foam structure.

2. The method of claim 1, wherein the aromatic polysulfone is selected from a group consisting of polysulfone, polyethersulfone, and polyphenylsulfone.

3. The method of claim 1 further comprising a step of separating the laser-induced graphene from the material.

4. A method of treating a surface prone to the formation of biofilm, wherein the method comprises
   (a) applying a carbon precursor onto the surface to form a carbon precursor-coated surface; and (b) laser-irradiating the carbon precursors-coated surface to form graphene thereon the surface, wherein the graphene is laser-induced graphene and the laser-induced graphene is a porous graphene foam structure.

5. A method of utilizing laser-induced graphene, wherein the method comprises:
   (i) obtaining the laser-induced graphene, wherein the laser-induced graphene is a porous graphene foam structure; and
   (ii) incorporating the laser-induced graphene into n a process selected from a group consisting of
      (a) coating the inside of a pipe with the laser-induced graphene,
      (b) degrading organic or inorganic pollutants with the laser-induced graphene,
      (c) making a membrane water treatment equipment component, wherein the membrane water treatment equipment component comprises the laser-induced graphene,
      (d) making a medical apparatus component, wherein the medical apparatus component comprises the laser-induced graphene, and
      (e) combinations thereof.

6. The method of claim 5, wherein the process comprises the degrading the organic or inorganic pollutants in which the process comprises oxidizing organic contaminants by applying electrical voltage to the laser-induced graphene.

7. The method of claim 5, wherein
   (i) the process comprises making the membrane water treatment equipment component, and
   (ii) the membrane water treatment equipment component is selected from a group consisting of a membrane spacer operable for adsorption of pollutants, laser-induced graphene attached to a substrate, laser-induced graphene separated from a substrate, and laser-induced graphene attached to a membrane of the membrane water treatment equipment.

8. The method of claim 5, wherein
   (i) the process comprises making the medical apparatus component, and
   (ii) the medical apparatus component is a blood dialysis apparatus component.

9. The method of claim 8, wherein the blood dialysis apparatus component is a blood dialysis apparatus membrane that comprises the laser-induced graphene.

10. A method of fabricating a membrane for a separation application, wherein the method comprises:
    (a) selecting a membrane having a carbon precursor layer; and
    (b) generating laser-induced graphene on the carbon precursor layer of the membrane to form a laser-induced graphene-coated separation membrane, wherein the laser-induced graphene is a porous graphene foam structure.

11. The method of claim 10, wherein the separation application is selected from a group consisting of oil/water separation, liquid separations, gas separations, and liquid/gas separations.

12. The method of claim 10, wherein the membrane is a polymer membrane.

13. The method of claim 10, wherein the carbon precursor is an aromatic polysulfone.

14. The method of claim 13, wherein the aromatic polysulfone is selected from a group consisting of polysulfone, polyethersulfone, and polyphenylsulfone.

* * * * *